(12) United States Patent
Geer

(10) Patent No.: US 7,421,805 B2
(45) Date of Patent: Sep. 9, 2008

(54) INTEGRAL SPINE STRUCTURE FOR FOOTWEAR

(75) Inventor: Kenton D. Geer, Red Wing, MN (US)

(73) Assignee: Red Wing Shoe Company, Inc., Red Wing, MN (US)

( * ) Notice: Subject to any disclaimer, the term of this patent is extended or adjusted under 35 U.S.C. 154(b) by 551 days.

(21) Appl. No.: 10/893,114

(22) Filed: Jul. 16, 2004

(65) Prior Publication Data
US 2005/0034328 A1 Feb. 17, 2005

Related U.S. Application Data

(60) Provisional application No. 60/488,476, filed on Jul. 17, 2003.

(51) Int. Cl.
*A43B 13/00* (2006.01)
*A43B 23/00* (2006.01)

(52) U.S. Cl. .............................. 36/25 R; 36/107; 36/88; 36/31; 36/102; 36/27

(58) Field of Classification Search ...................... 36/27, 36/28, 32 R, 30 A, 37–38, 35 R, 59 R, 107–108, 36/114
See application file for complete search history.

(56) References Cited

U.S. PATENT DOCUMENTS

| D33,605 S | 11/1900 | Slater |
| 673,869 A | 5/1901 | Hampel et al. |
| 2,126,077 A | 8/1938 | Youngberg |
| 2,478,664 A | 8/1949 | Morrow et al. |
| 3,718,996 A | 3/1973 | Austin |
| 4,059,910 A | 11/1977 | Bryden et al. |
| 4,255,825 A | 3/1981 | Rigon |
| 4,476,638 A | 10/1984 | Quacquarini et al. |
| 4,506,460 A | 3/1985 | Rudy |
| 4,910,882 A | 3/1990 | Göller |
| 4,922,631 A | 5/1990 | Anderié |
| 5,046,267 A | 9/1991 | Kilgore et al. |
| 5,070,629 A | 12/1991 | Graham et al. |
| 5,185,943 A | 2/1993 | Tong et al. |
| D334,276 S | 3/1993 | Feller et al. |

(Continued)

FOREIGN PATENT DOCUMENTS

DE    39 18 522 A1    12/1990

(Continued)

*Primary Examiner*—Jila M Mohandesi
(74) *Attorney, Agent, or Firm*—Merchant & Gould P.C.

(57) ABSTRACT

A support structure for footwear includes a longitudinally extending member to which a plurality of laterally extending supports members are secured at spaced apart locations along a length of the longitudinal member. The support structure may extend along the entire length of a footwear or may be specifically designed for the forefoot, midfoot, or hindfoot areas of a footwear. The support structure may be combined with plate-like structures or may include a plurality of longitudinally extending members. The lateral supports may extend in a generally horizontal plane or may extend in an upward or downward direction out of the horizontal plane. Furthermore, the longitudinal and lateral members may be made of different materials, or each may be made of a plurality of different materials to provide the desired characteristics of the support structure at a given location in the footwear. Different portions of the longitudinal member may be more or less flexible than the lateral supports.

34 Claims, 48 Drawing Sheets

U.S. PATENT DOCUMENTS

| | | |
|---|---|---|
| 5,720,118 A | 2/1998 | Mayer et al. |
| D410,965 S | 6/1999 | Schuette et al. |
| 5,915,820 A | 6/1999 | Kraeuter et al. |
| 5,987,782 A | 11/1999 | Bramani |
| 6,038,790 A * | 3/2000 | Pyle et al. ............... 36/30 R |
| 6,138,385 A | 10/2000 | Jungkind et al. |
| D433,213 S | 11/2000 | Schuette et al. |
| 6,216,365 B1 * | 4/2001 | Cohen ....................... 36/44 |
| 6,389,713 B1 | 5/2002 | Kita |
| 6,497,058 B2 | 12/2002 | Dietrich et al. |
| D471,698 S | 3/2003 | Brown |
| D476,143 S | 6/2003 | McDowell |
| 2003/0029059 A1 | 2/2003 | Favreau et al. |
| 2004/0064974 A1 | 4/2004 | Schuster |

FOREIGN PATENT DOCUMENTS

| | | |
|---|---|---|
| EP | 0 278 094 A2 | 8/1988 |
| EP | 0 998 861 A2 | 5/2000 |
| EP | 1 369 049 A1 | 12/2003 |
| JP | 2-46802 | 2/1990 |
| JP | 2001-299404 A | 10/2001 |

* cited by examiner

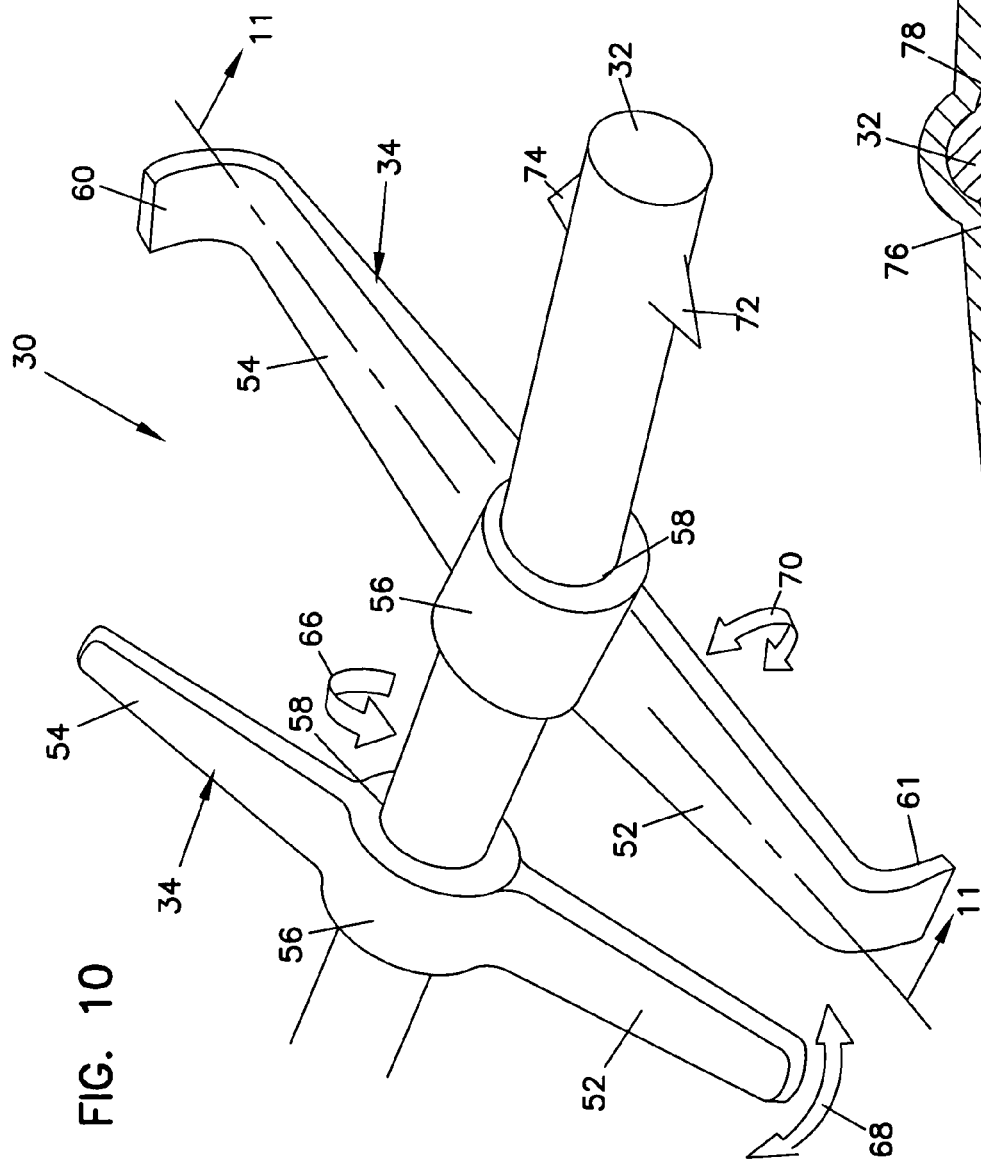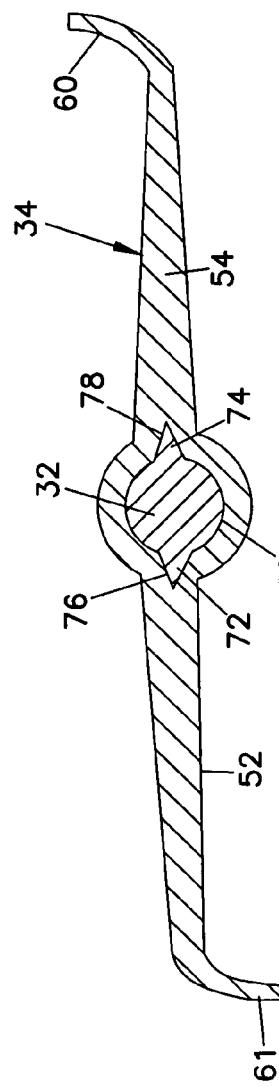

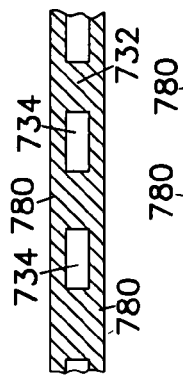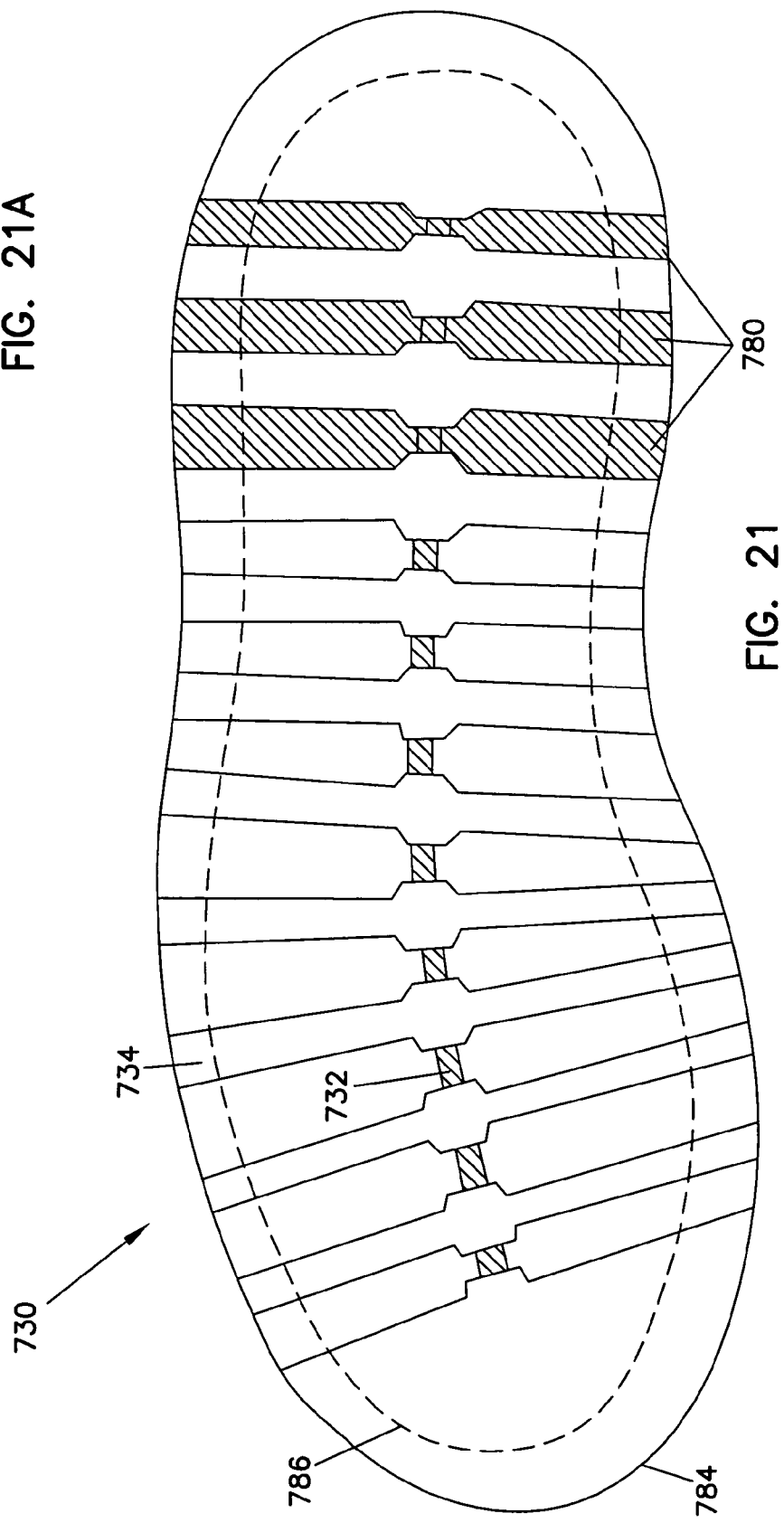

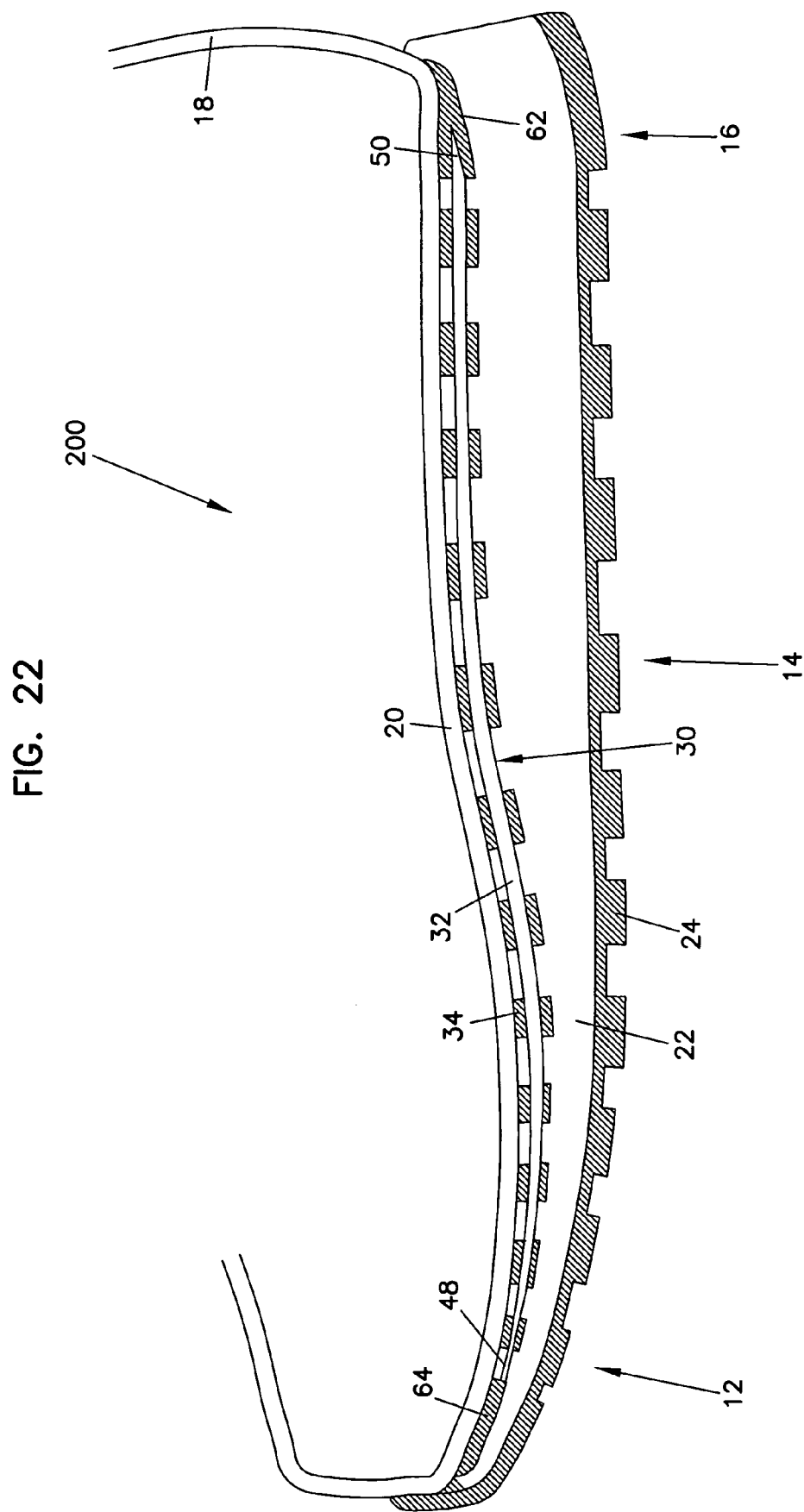

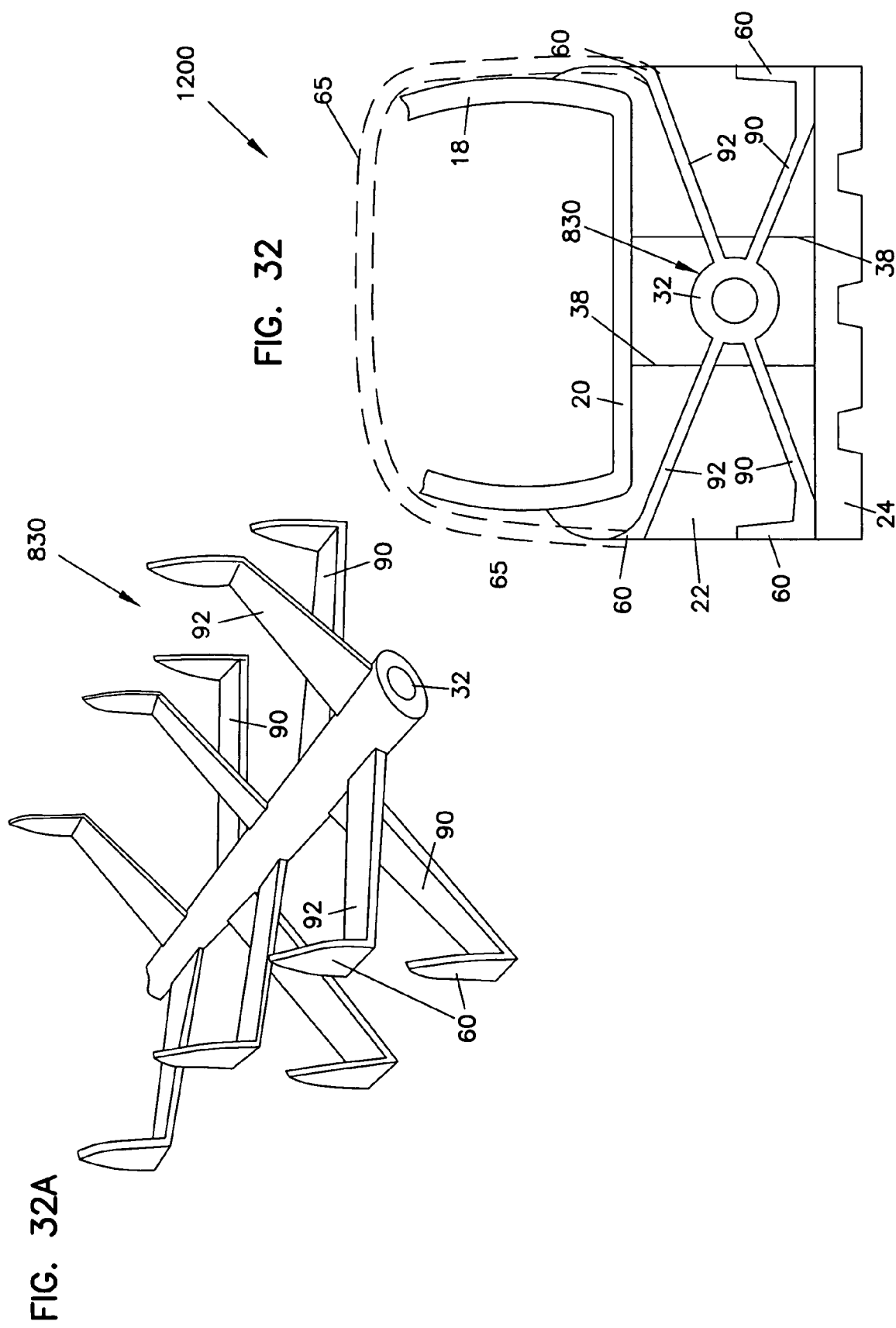

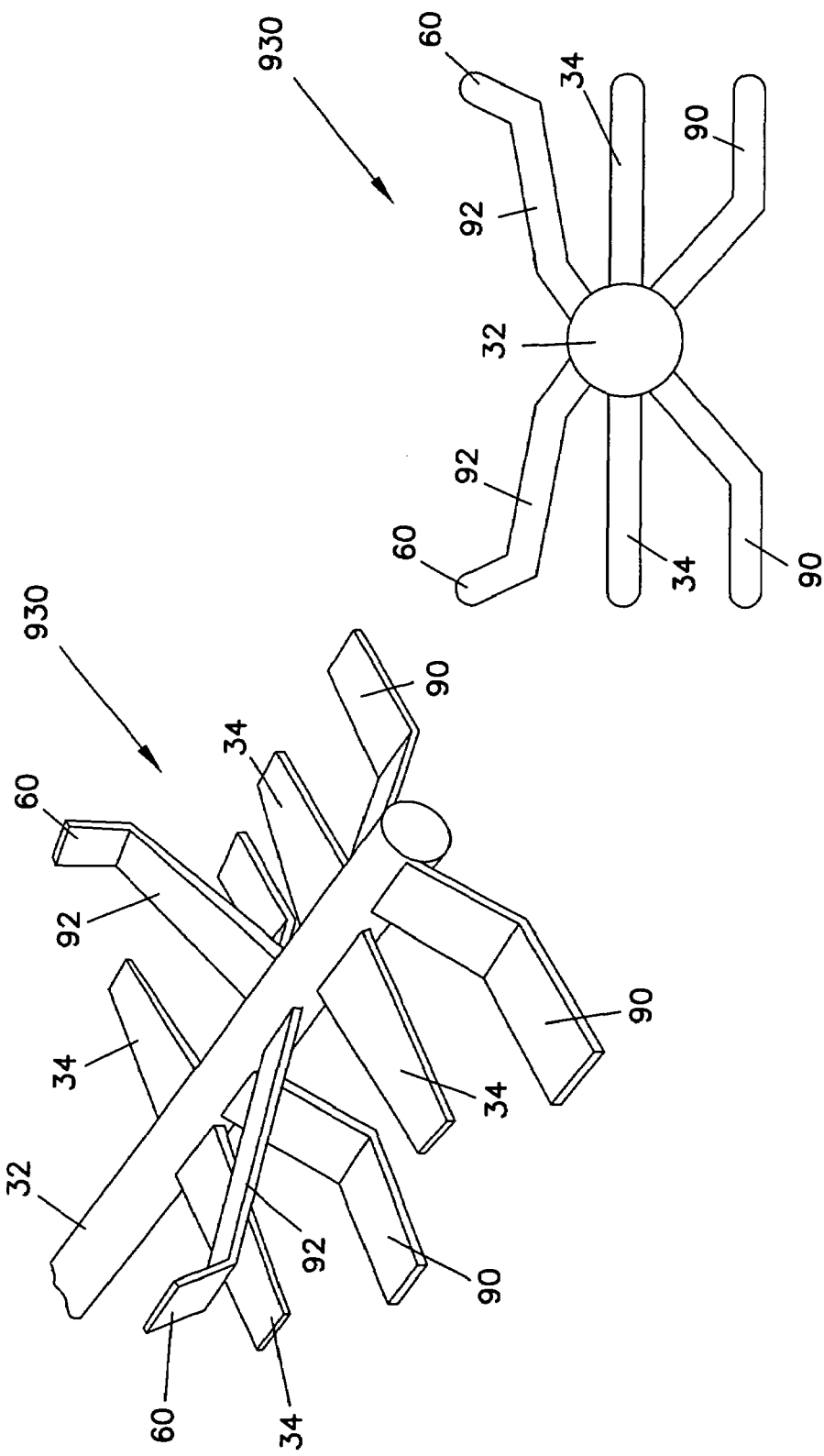

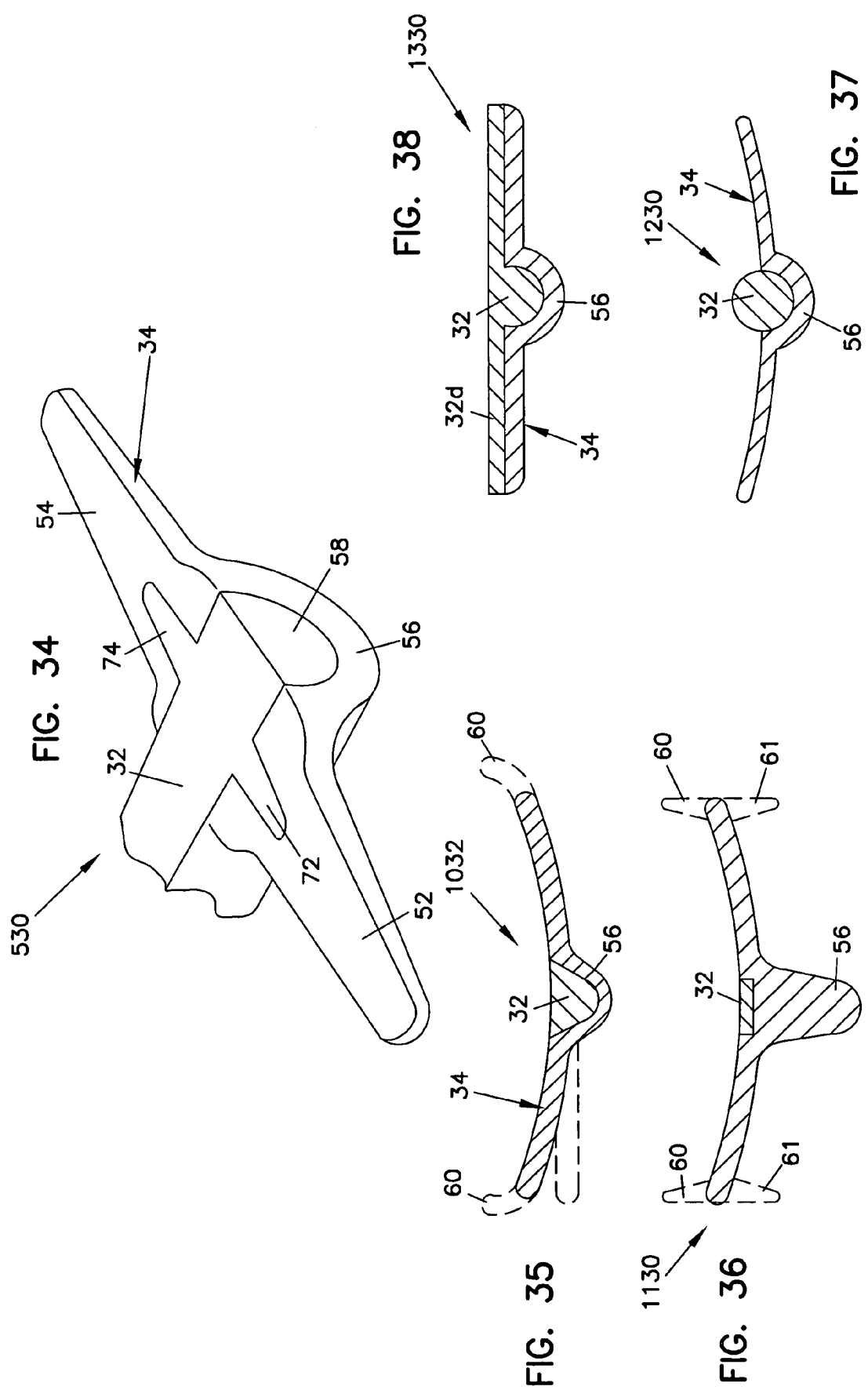

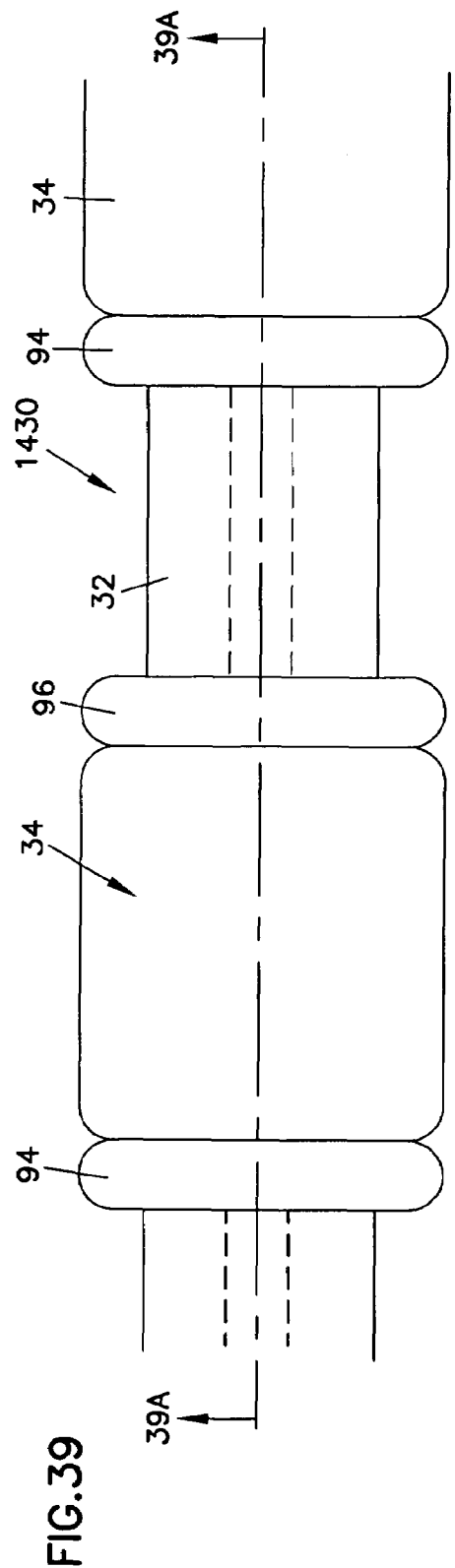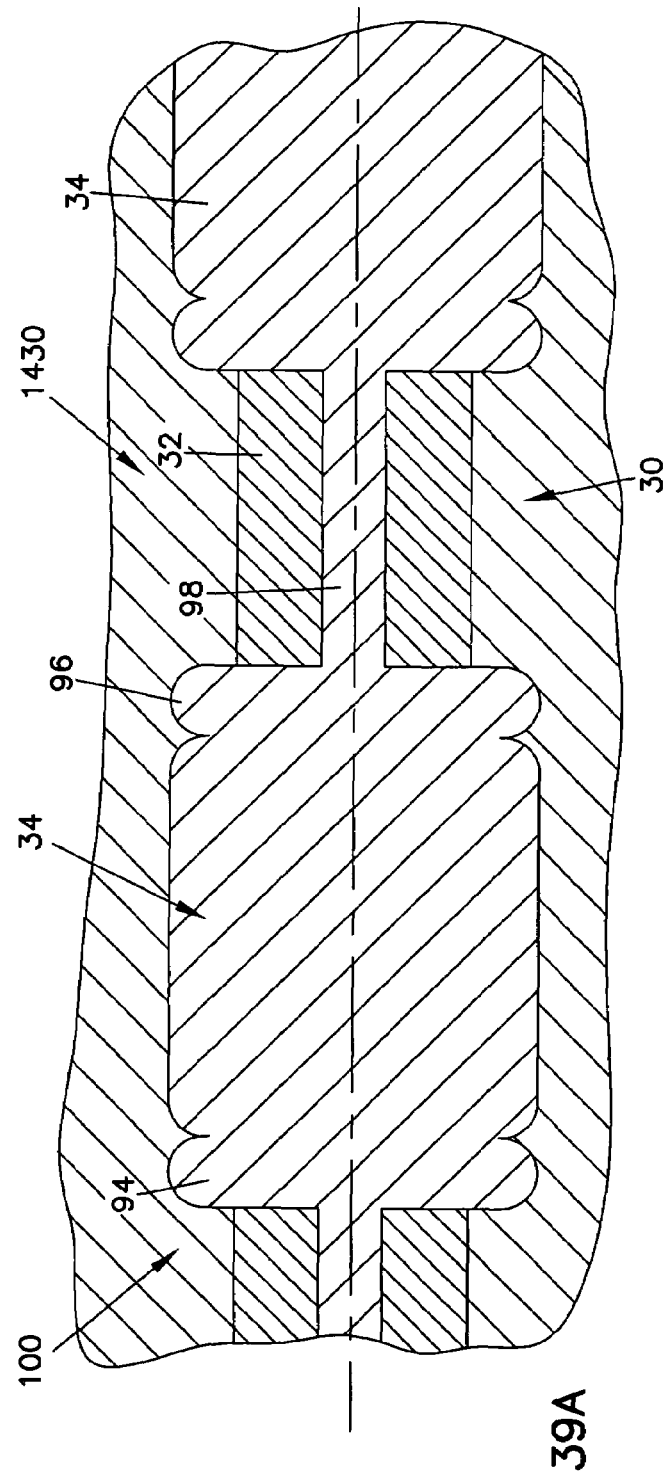
FIG. 39
FIG. 39A

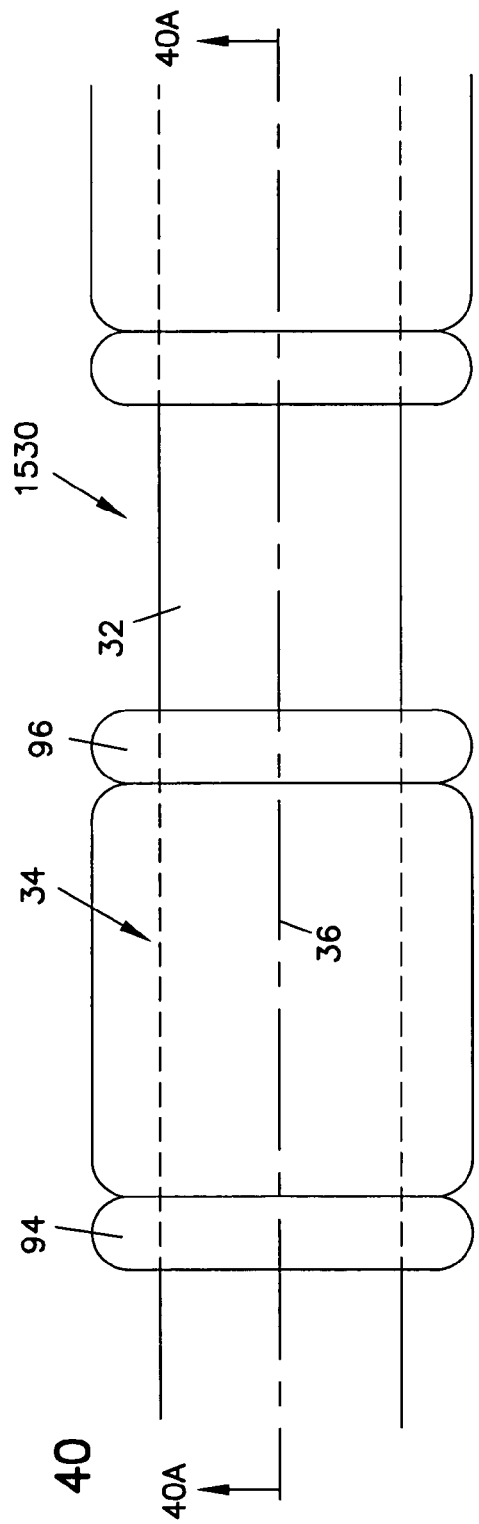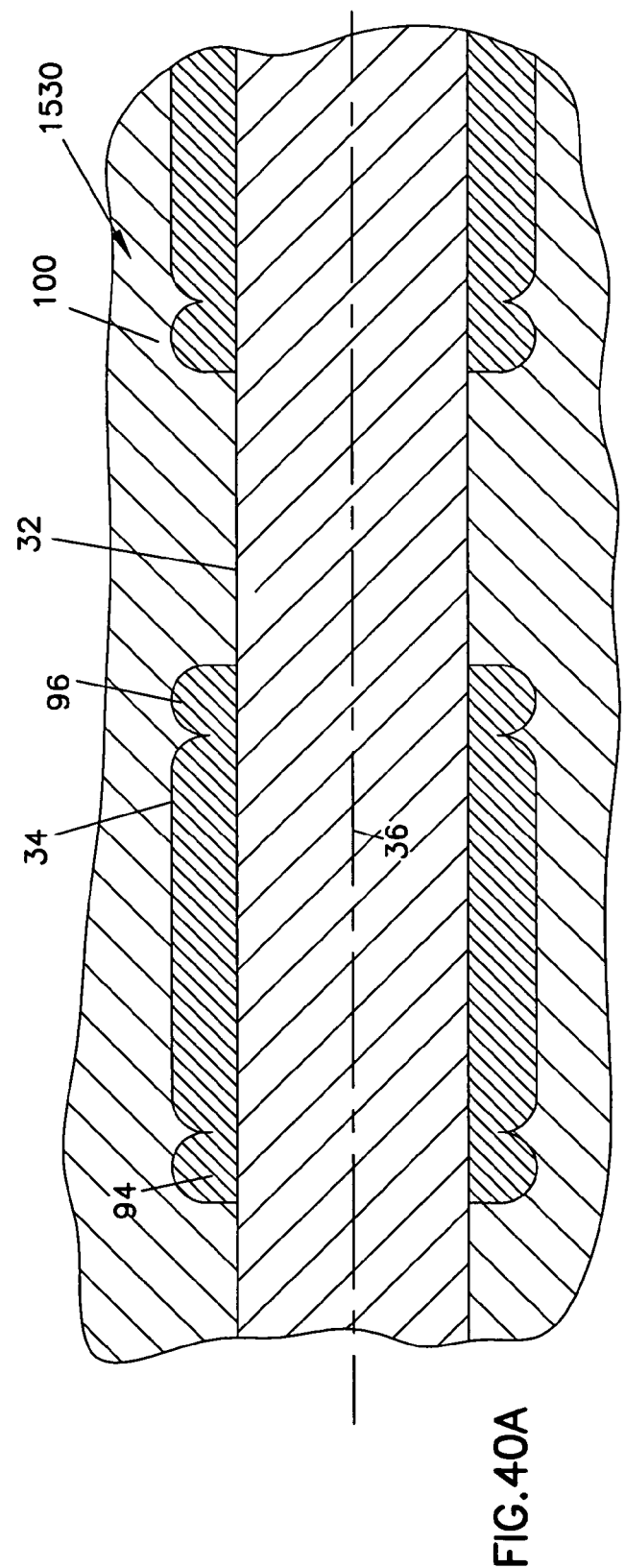

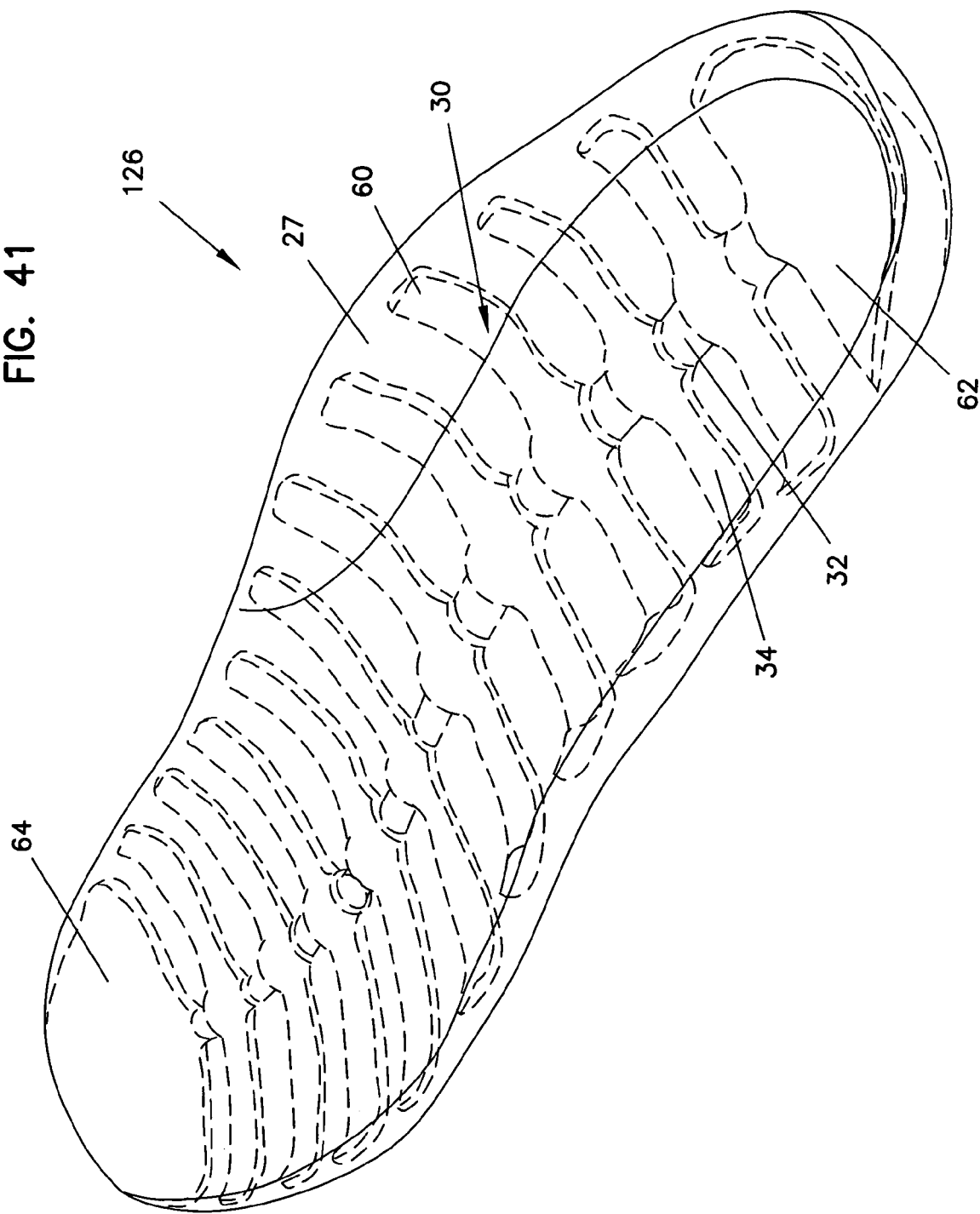

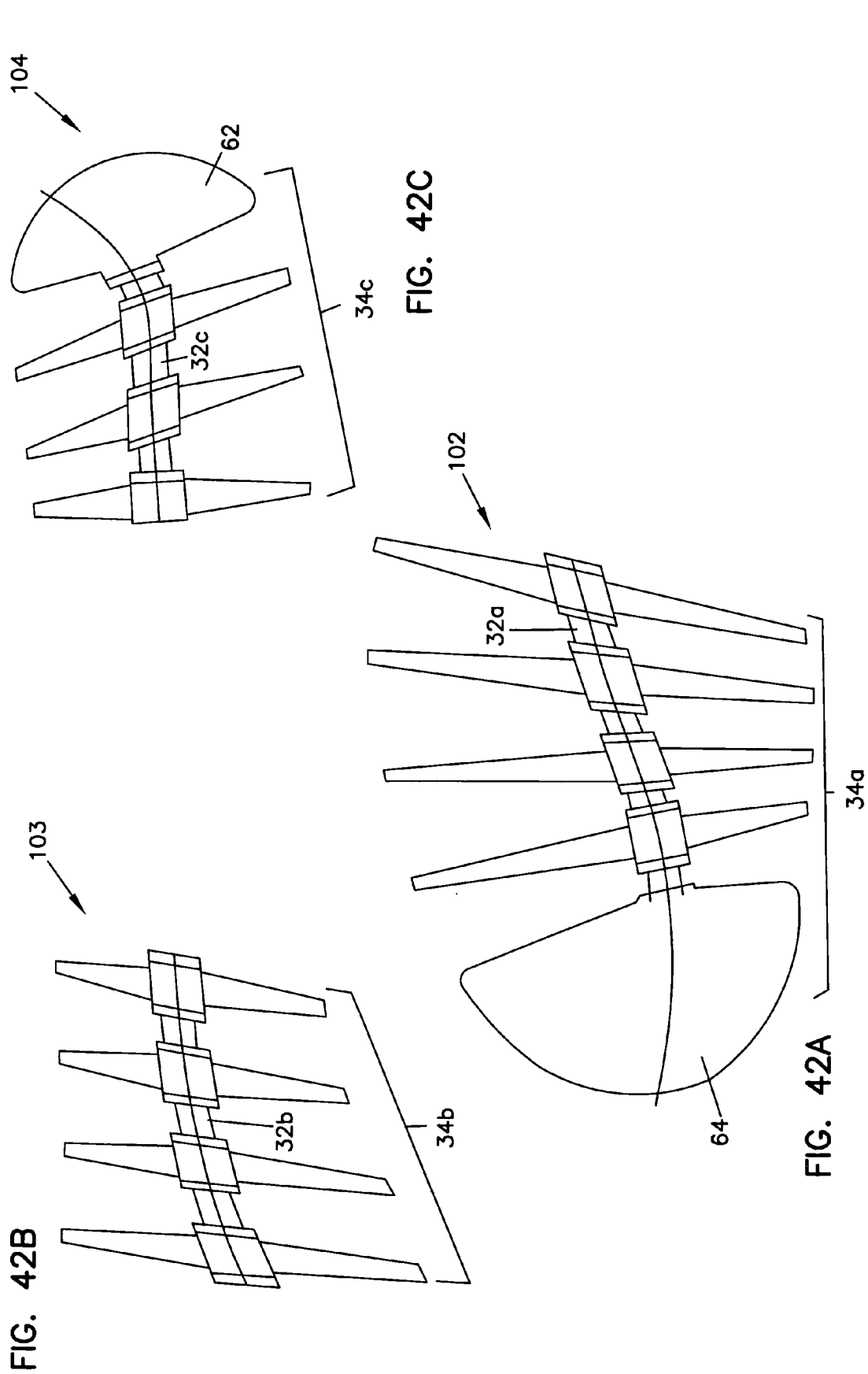

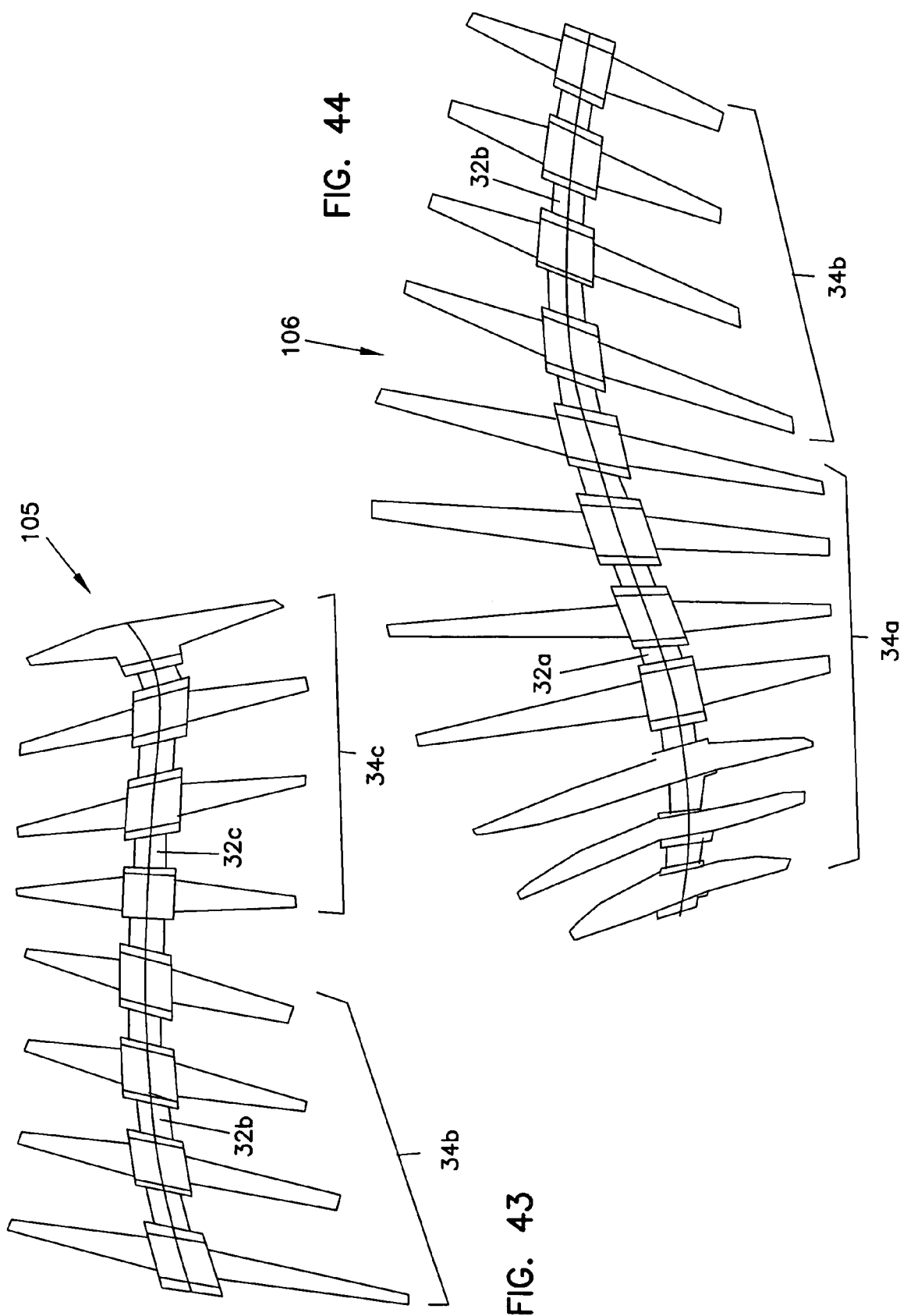

FIG. 50
FIG. 49
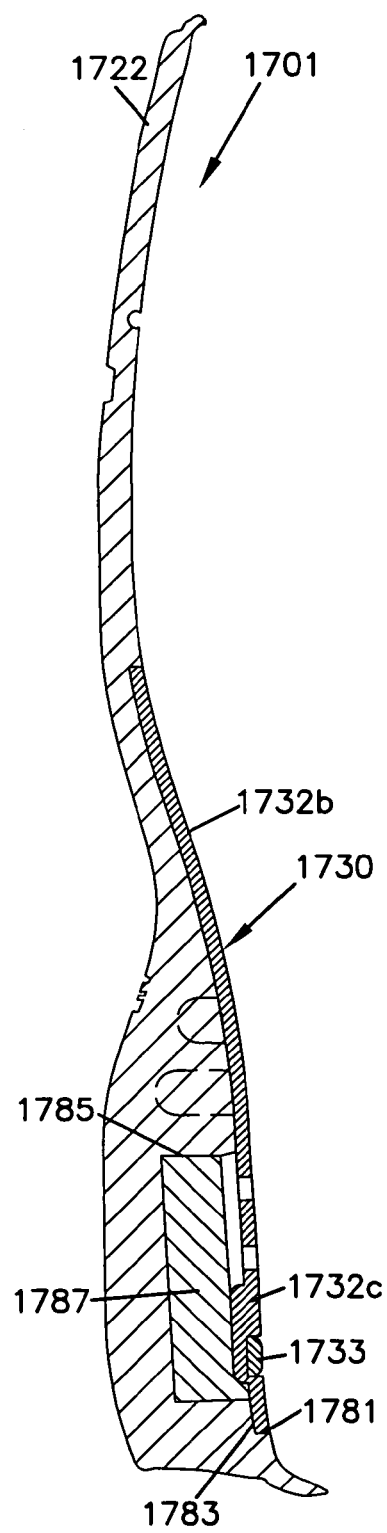
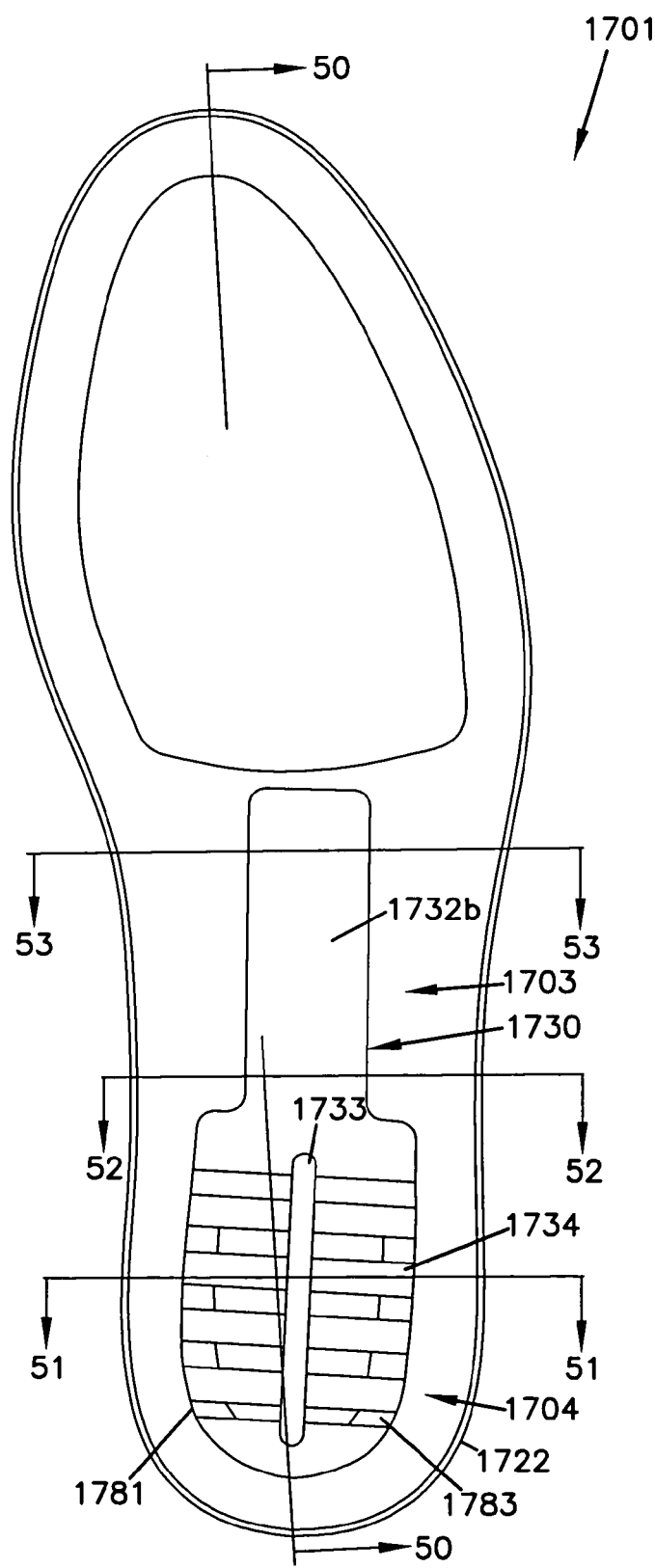

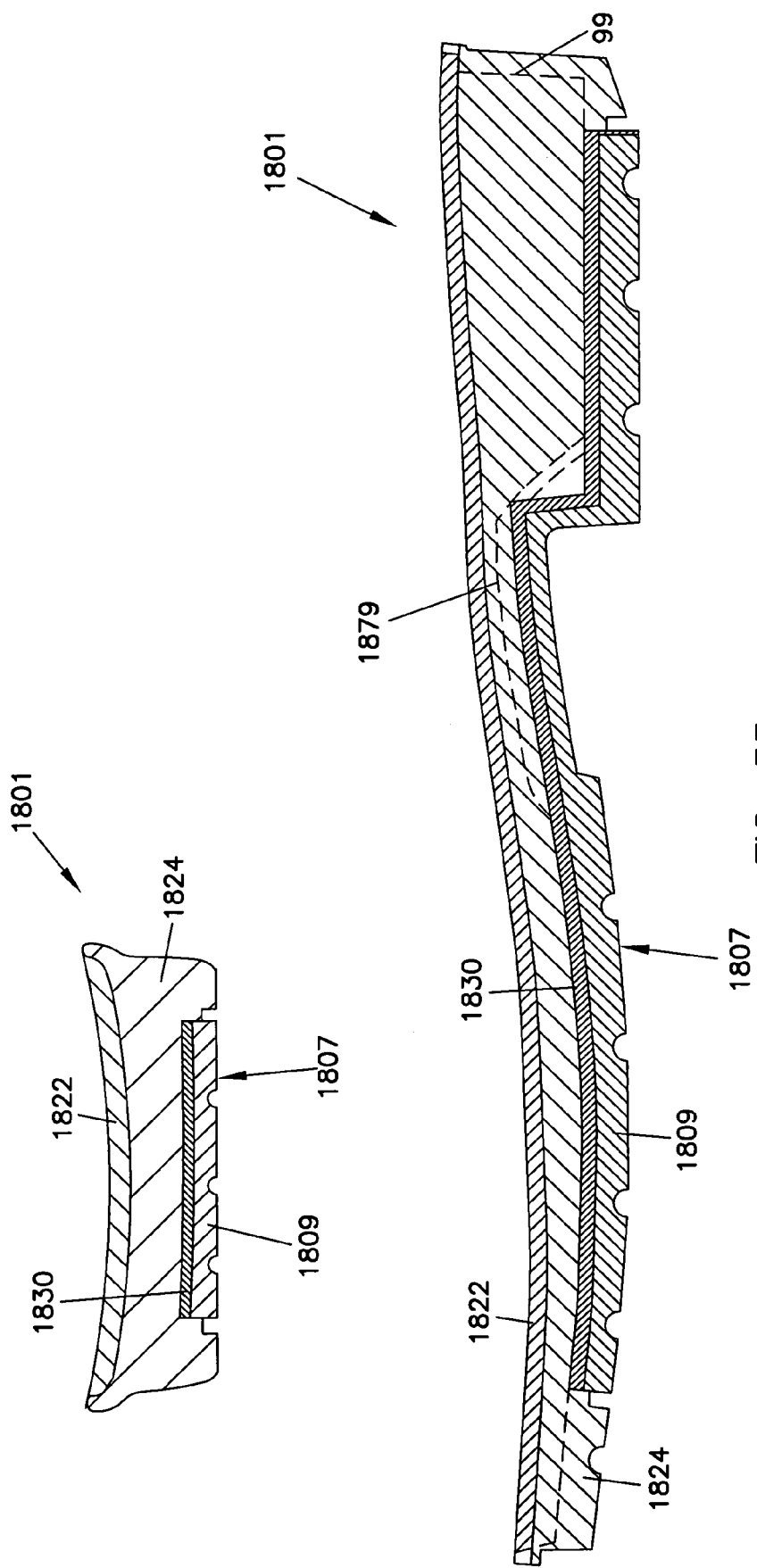

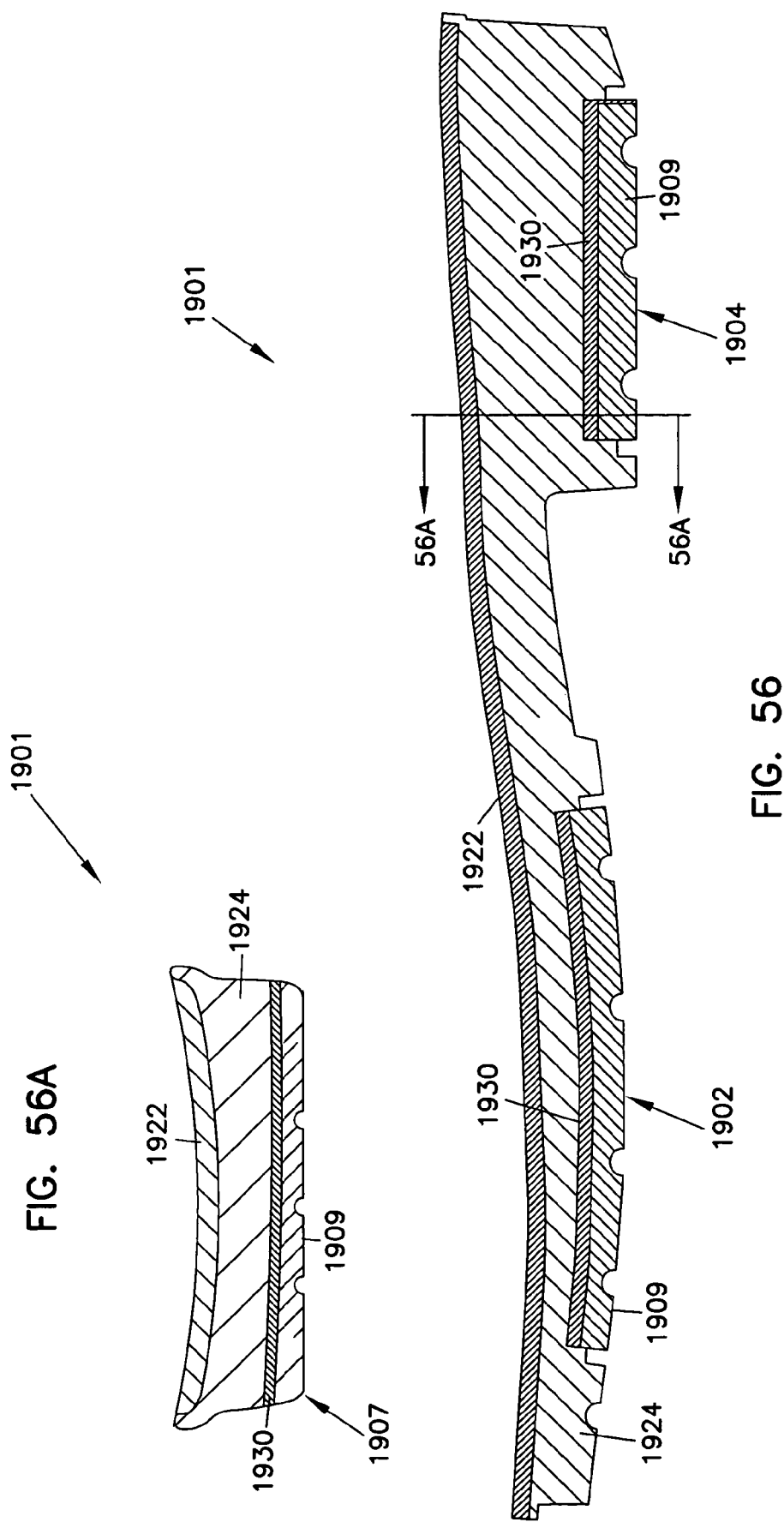

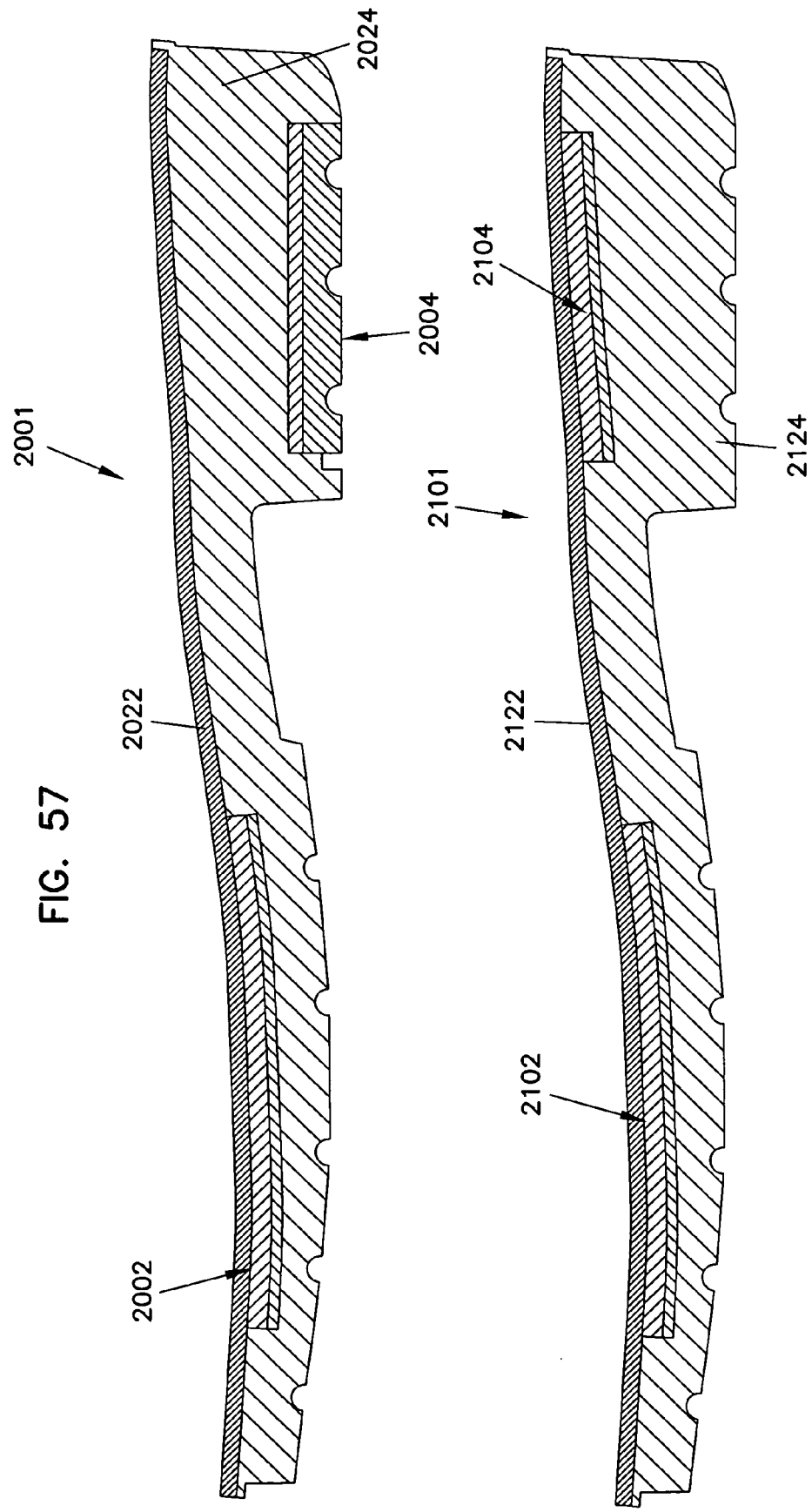

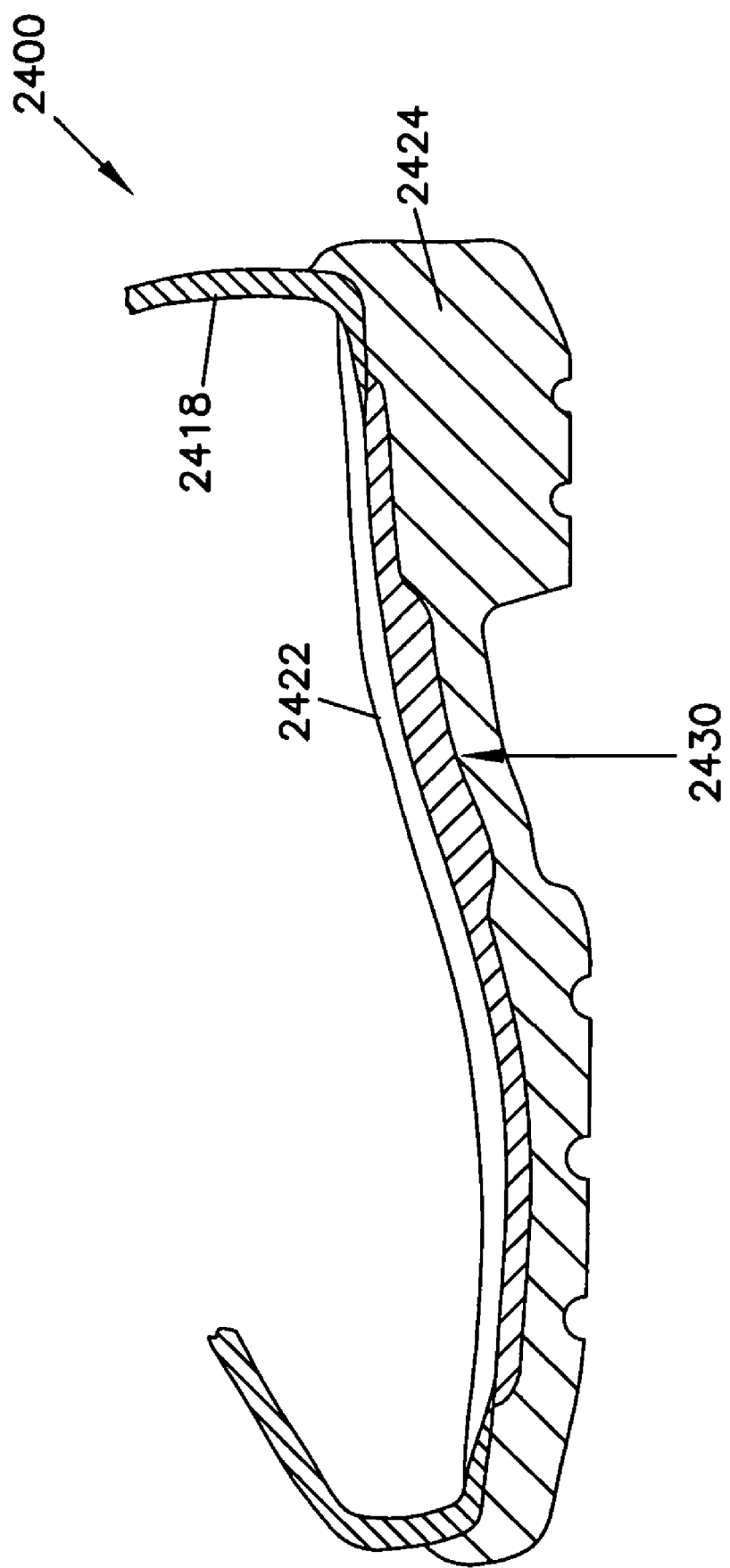

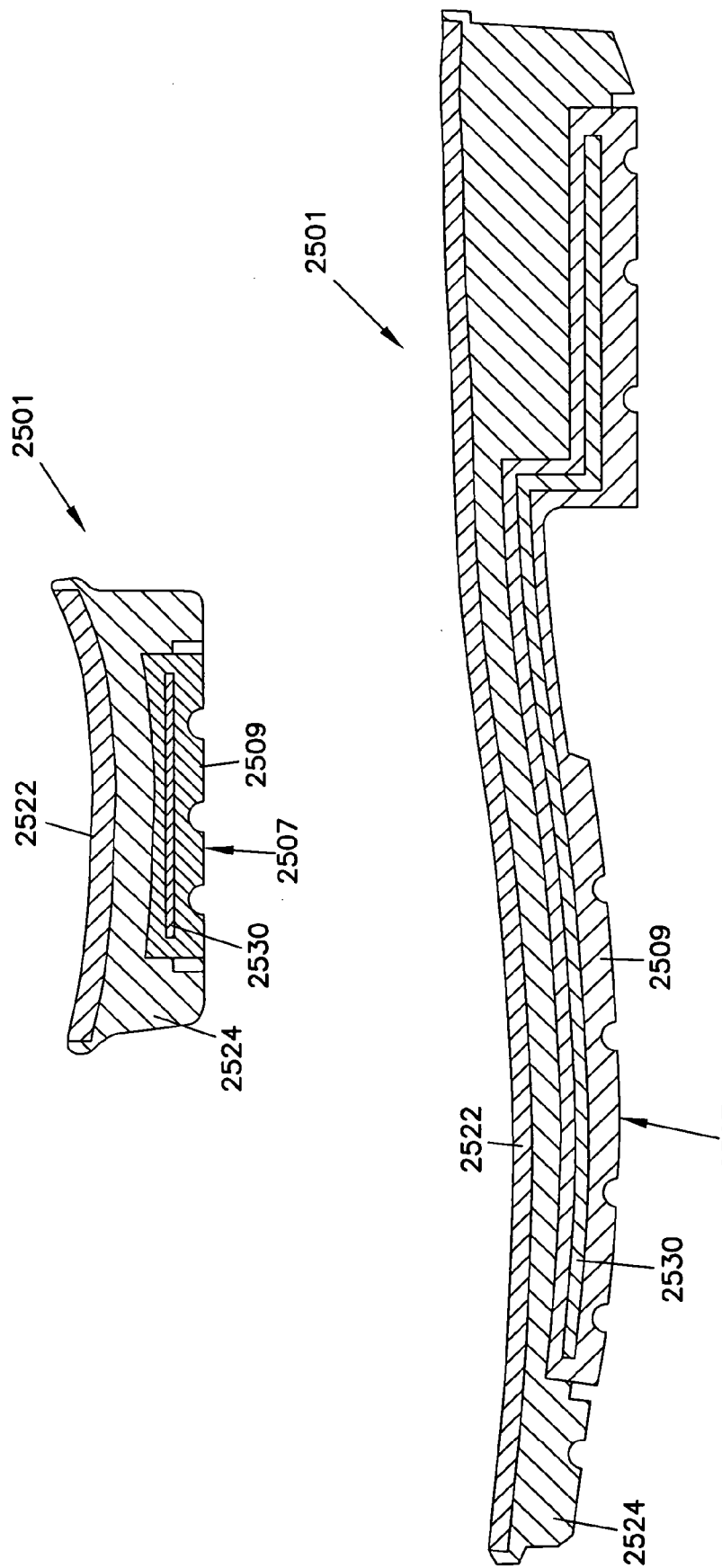

INTEGRAL SPINE STRUCTURE FOR FOOTWEAR

CROSS REFERENCE TO RELATED APPLICATIONS

This application claims priority to U.S. Provisional Application Ser. No. 60/488,476 filed on Jul. 17, 2003, and entitled INTEGRAL SPINE STRUCTURE FOR FOOTWEAR, the disclosure of which is incorporated herein by reference in its entirety.

BACKGROUND OF THE INVENTION

1. Technical Field

The present invention generally relates to footwear, and more specifically relates to structures for supporting a footwear.

2. Related Art

A common objective for most types of footwear designs is to address at least one of the following three biomechanical issues: shock attenuation, stability, and support. Shock attenuation involves the absorption of shock, shock diffusion and pressure distribution. The ability of a footwear to attenuate shock forces can greatly reduce the pain and discomfort to a user of the footwear for any given application. Shock absorption may be addressed by the type of materials that are used in the footwear. Various types of materials have excellent shock absorption properties, especially for the thin layers that are typically required for a footwear. Shock diffusion relates to dampening of shock forces to reduce how much of the shock force is transferred to the user. Again, the type of material as well as the structure of the footwear may significantly affect shock diffusion by a footwear. Pressure distribution relates to the distribution or spreading out of a point force or pressure point such as, for example, a heel strike pressure point at the heel of a footwear when walking or running. Pressure distribution is often accomplished using a plate-like structure wherein the amount of pressure distribution is controlled by the type and thickness of the plate material.

The stability of a footwear is a another important biomechanical issue and may be controlled by the material properties and structure of various features of a footwear. For example, a footwear with a very thick sole that raises an individual's center of gravity beyond a natural position may provide a very unstable scenario. Further, some types of materials used in footwear are very flexible and if used alone without any other support features may create an unstable footwear. Some types of material that do not allow flexibility may effect the natural motion of the foot and further create instability.

The support provided by a footwear is also important. A common objective for a footwear is to obstruct as little as possible the natural movements of the foot while supporting the foot where it is necessary for a given footwear application. In some applications such as sports like soccer and tennis, lateral support is extremely important, while arch support and support along the longitudinal axis of the footwear may be a greater consideration for applications such as running and walking. Other applications that require standing for long periods of time may require the type of support which reduces the amount of work the users foot muscles must exert in order to maintain proper posture and balance while standing.

A further biomechanical consideration for footwear is the flexibility of the forefoot, midfoot and hindfoot portions of the footwear. A natural motion of the foot requires significant flexing and bending in a longitudinal direction as well as some complex lateral and torsional motion. While some types of inflexibility may be important for certain performance enhancement objectives, most footwear applications require a range of flexibility in each major section of the footwear. For example, undue amounts of torsional flexibility about a transverse axis of the footwear in the area of the arch of the foot may result in inadequate guiding and holding of the foot if the footwear bottom also provides too much longitudinal flexibility in that region of the footwear.

One known attempt at an "all day comfort" footwear that addresses shock attenuation, stability, support and flexibility includes a firm lasting insole that is layered in the footwear just above the midsole and extends along the hind of the footwear up to the midfoot of the footwear. This plate-like structure provides support and diffuses forces in the heel. In an effort to attenuate shock forces, the footwear may include a gel or other type of insert material at the outsole or within the midsole of the footwear. Although the plate structure may distribute pressure, the heel strike and other significant shock forces are not dissipated very well. Furthermore, because there is no support structure in the forefoot of the footwear, the footwear may be entirely too flexible for a given application and fails to provide the torsional rigidity that is necessary for support and stability of the footwear.

Another known footwear design that attempts to address the biomechanical issues described above includes a sole structure that has multiple horizontal and/or vertical layers of foam materials that each have different properties. The outsole may also include certain structures that provide some lateral support. This type of design is difficult to alter for the support, stability and shock attenuation needs of different applications while concurrently providing necessary flexibility along the length of the footwear.

The cost and feasibility of a footwear design is a further consideration when designing a footwear that addresses the above-mentioned biomechanical issues. Some footwear designs may include materials or structures that are not conducive to cost effective manufacturing and assembly of the footwear.

SUMMARY OF THE INVENTION

The present invention relates to a support structure for use in a footwear that can be altered to meet the shock attenuation, stability, support and flexibility needs for a given footwear application. One aspect of the invention relates to a footwear support structure that includes an elongate member and a plurality of lateral supports coupled to the elongate member. In some embodiments, the elongate member may be more flexible than the lateral supports by using, for example, different materials or different cross-sectional shapes for the elongate member verses the lateral supports. In other embodiments, the support structure may have different flexibility properties in the forefoot, midfoot and hindfoot sections of the support structure. The support structure may be positioned at various locations within a footwear sole assembly between various layers of the sole assembly. The support structure may also be coupled to a carrier or base member and used as an insert piece in the sole assembly.

Another aspect of the invention relates to a footwear sole structure that includes a sole member having a heel portion defining a void, and a spine structure that includes an elongate spine extending along a first axis and a plurality of laterally extending support ribs secured to the elongate spine at spaced apart locations along a length of the spine. The spine structure is at least partially positioned over the void and supported by the heel portion of the midsole member, and a portion of the spine structure is movable into the void. In other embodiments, the void is positioned in other portions of the midsole or another sole member of a footwear sole assembly. The void may be filled with a material different properties from the material that defines the void.

Another aspect of the invention relates to a footwear construction that includes a midsole member having a heel section that includes first and second portions having different properties, an upper member coupled to the midsole, and a spine support structure that includes an elongate spine member and a plurality of laterally extending supports coupled to the elongate spine member. The first portion of the heel section supports the laterally extending supports and the second portion of the heel section supports the elongate spine member.

A further aspect of the invention relates to a method of manufacturing a footwear that includes an upper, a sole, and a spine support structure that includes an elongate spine member and a plurality of transverse supports. The method includes positioning the spine support structure in a mold and positioning the upper adjacent to the mold, filling the mold with a moldable material to form the sole, and curing the moldable material to secure the sole and the spine support structure to the upper.

Another aspect of the invention relates to a method of forming a footwear support structure that includes forming an elongate member along a first axis, and forming a plurality of support members that are secured to the elongate member and that extend in a lateral direction relative to the first axis.

Another aspect of the invention relates to a method of assembling a footwear support structure that includes an elongate member extending along a first axis and a support member. The method may include the steps of securing the support member to the elongate member, and aligning the support members in a substantially lateral direction relative to the first axis.

A further aspect of the invention relates to a footwear support structure that includes a longitudinal spine structure and a plurality of support members secured to the spine and that extend in a generally lateral direction relative to a direction of extension of the spine structure. The support structure may include separate segments having different stiffening properties unique for certain areas of the footwear.

Another aspect of the invention relates to a footwear that includes a midsole, an outsole, a lasting insole, an upper, and a support structure positioned between lasting insole and the outsole. The support structure may include an elongate member and a plurality of spaced apart laterally extending supports.

A further aspect of the invention relates to a method of supporting a footwear that includes an upper, a midsole, an outsole, and a support structure having a longitudinally extending spine and a plurality of laterally extending supports secured to the spine at spaced apart locations along a length of the spine. The steps of the method may include positioning the support structure in the midsole and securing the midsole to the upper and the outsole.

A further aspect of the invention relates to a method of supporting a footwear having a outsole, a midsole, an upper, and a support structure having an elongate spine and a plurality of laterally extending supports secured to the spine at spaced apart locations along a length of the spine. The method may include positioning the support structure within the upper and above the outsole, and resisting lateral movement in the footwear with the support structure.

BRIEF DESCRIPTION OF THE DRAWINGS

FIG. 10 is a perspective view of a portion of one example support structure according to principles of the invention.

FIG. 11 is a lateral cross-sectional view taken along cross-sectional indicator 11-11 shown in FIG. 10.

FIG. 21 is a top view of anther example support structure that is configured as a blocker unit with connecting webbing between lateral supports of the support structure.

FIG. 21A is a side view of the blocker unit configuration shown in FIG. 21.

FIG. 21B is a side view of another example blocker unit configuration that includes a layer of connecting webbing above and below the support structure.

FIG. 22 is a side cross-sectional view of one example support structure according to principles of the present invention mounted in a footwear having a continuous flat outsole.

FIG. 32 is a lateral cross-sectional view of an example footwear that includes a support structure that includes upward and downward extending lateral supports.

FIG. 32A is a top perspective view of support structure shown in FIG. 32.

FIG. 33 is a top perspective view of another example support structure that includes upward, downward and horizontally extending lateral supports.

FIG. 33A is an end view of the support structure shown in FIG. 33.

FIG. 34 is a top perspective view of a portion of the support structure shown in FIG. 16.

FIG. 35 is lateral cross-sectional view of another support structure in which the longitudinal support and the lateral support have a coplanar top surface and the longitudinal support includes a curved cross-section.

FIG. 36 is lateral cross-sectional view of another support structure in which the longitudinal support and the lateral support have a coplanar top surface and the longitudinal support includes a rectangular cross-section.

FIG. 37 is lateral cross-sectional view of another support structure in which the longitudinal support extends above a top surface of the lateral support and the longitudinal support has a circular cross-section.

FIG. 38 is lateral cross-sectional view of another support structure in which the longitudinal support extends across atop surface of the lateral support.

FIG. 39 is a side view of a portion of an example support structure in which the lateral support extends continuously along the longitudinal axis and the longitudinal support extends between the lateral supports.

FIG. 39A is a side cross-sectional view of the support structure shown in FIG. 39 taken along cross-sectional indicator 39A-39A.

FIG. 40 is a side view of a portion of another example support structure in which the longitudinal support extends continuously along the longitudinal axis and the lateral supports are mounted to the longitudinal support.

FIG. 40A is a cross-sectional view of the support structure shown in FIG. 40 taken along cross-sectional indicator 40A-40A and further supported in a mold.

FIG. 41 is a perspective view of one example support structure according to principles of the invention integrated into a padded footwear insert.

FIG. 42A is a top view of forefoot or toe portion of a support structure according to principles of the invention.

FIG. 42B is a top view of midfoot portion of a support structure according to principles of the invention.

FIG. 42C is a top view of hindfoot or heel portion of a support structure according to principles of the invention.

FIG. 43 is a top view of another example support structure according to principles of the invention that supports midfoot and hindfoot portions of a footwear.

FIG. 44 is a top view of another example support structure according to principles of the invention that supports forefoot and midfoot portions of a footwear.

FIG. 49 is a top view of a footwear that includes another example support structure according to principles of the invention that extends along a partial length of the footwear.

FIG. 50 is a side cross-sectional view of the footwear shown in FIG. 45 taken along cross-sectional indicators 50-50.

FIG. 55 is a side cross-sectional view of an example footwear sole that includes the insert member shown in FIG. 54.

FIG. 55A is lateral cross-sectional view of the footwear sole shown in FIG. 55.

FIG. 56 is a side cross-sectional view of an example footwear sole that includes separate forefoot and heel sections of the insert member shown in FIG. 54 positioned as outsole members.

FIG. 56A is a lateral cross-sectional view of the footwear sole shown in FIG. 56.

FIG. 57 is a side cross-sectional view of an example footwear sole that includes separate forefoot and heel sections of the insert member shown in FIG. 54 positioned respectively adjacent to a midsole and as a portion of the outsole.

FIG. 58 is a side cross-sectional view of an example footwear sole that includes separate forefoot and heel sections of the insert member shown in FIG. 54 positioned adjacent to a midsole of the footwear sole.

FIG. 60 is a side cross-sectional view of an example footwear sole that includes a support structure secured to an underside of a lasting insole of lasting sole construction.

FIG. 61 is a side cross-sectional view of an example footwear sole that includes a support structure completely embedded in an sole insert member that is positioned as a portion of the footwear outsole.

FIG. 61A is a lateral cross-sectional view of the footwear sole shown in FIG. 61.

DETAILED DESCRIPTION OF THE PREFERRED EMBODIMENT

The present invention generally relates to a support structure for footwear. The support structure includes a longitudinally extending member to which a plurality of laterally extending supports members are secured at spaced apart locations along a length of the longitudinal member. The support structure may extend along the entire length of a footwear or may be specifically designed for the forefoot, midfoot, or hindfoot areas of a footwear. The support structure may be combined with plate-like structures or may include a plurality of longitudinally extending members. The lateral supports may extend in a generally horizontal plane or may extend in an upward or downward direction, or combination of upward, downward, horizontal or generally curved upward or downward directions. Furthermore, the longitudinal and lateral members may be made of different materials, or each may be made of a plurality of different materials to provide the desired characteristics of the support structure at a given location in the footwear. In some embodiments, the longitudinal member is more flexible than the lateral supports. The term "flexible" or "flexibility" is defined as the ability of a member to flex in various direction under different loads, such as flexibility in bending or in torsion, wherein the member at least temporarily changes shape or size. The invention may be more completely understood with reference to the above descriptions and the following examples. The examples included herein are given for illustrative purposes only and should not be construed as limiting the scope of the invention to what is illustrated and described herein.

Figure 1:
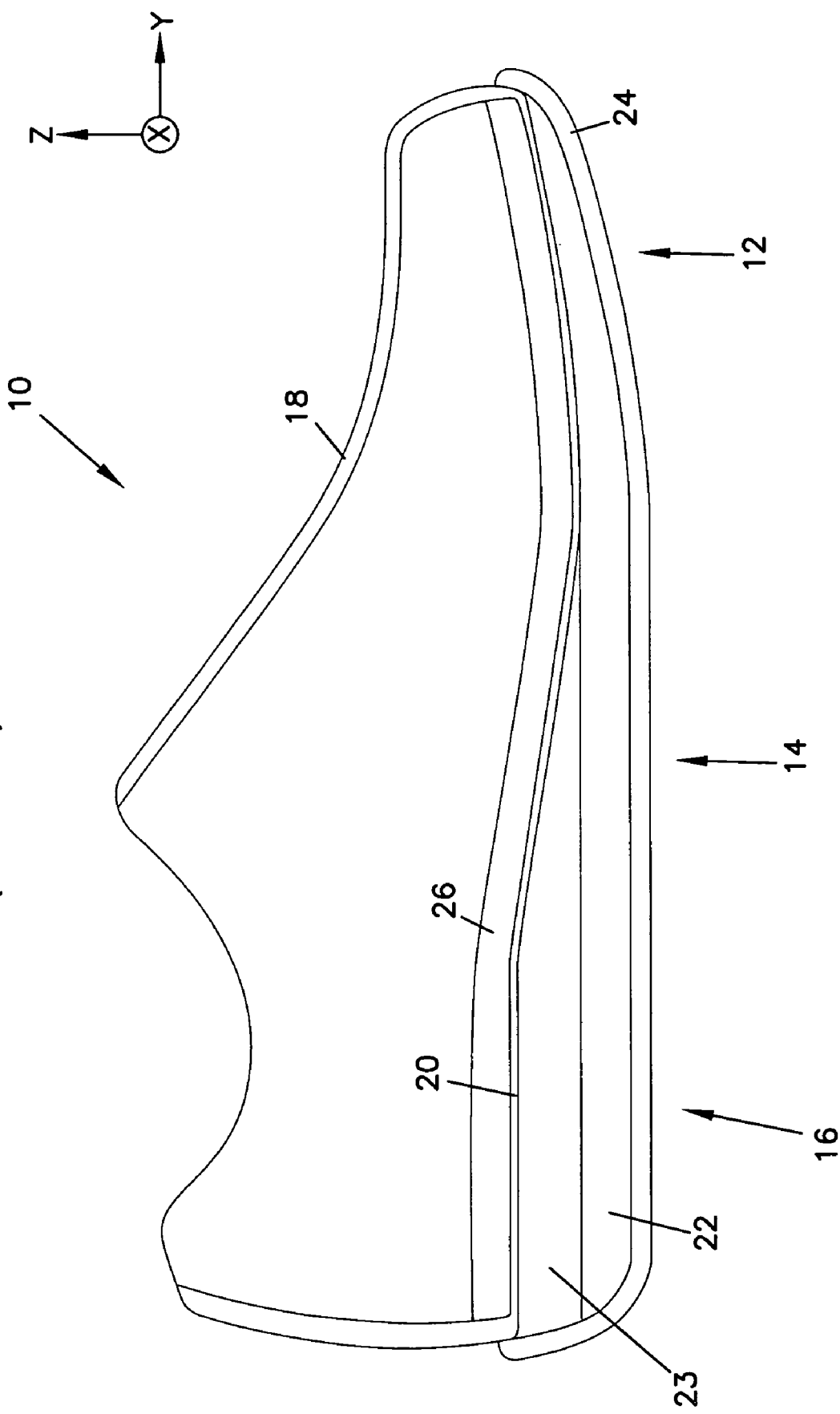
FIG. 1 is a side cross-sectional view of a footwear known in the art.
Figure 2:
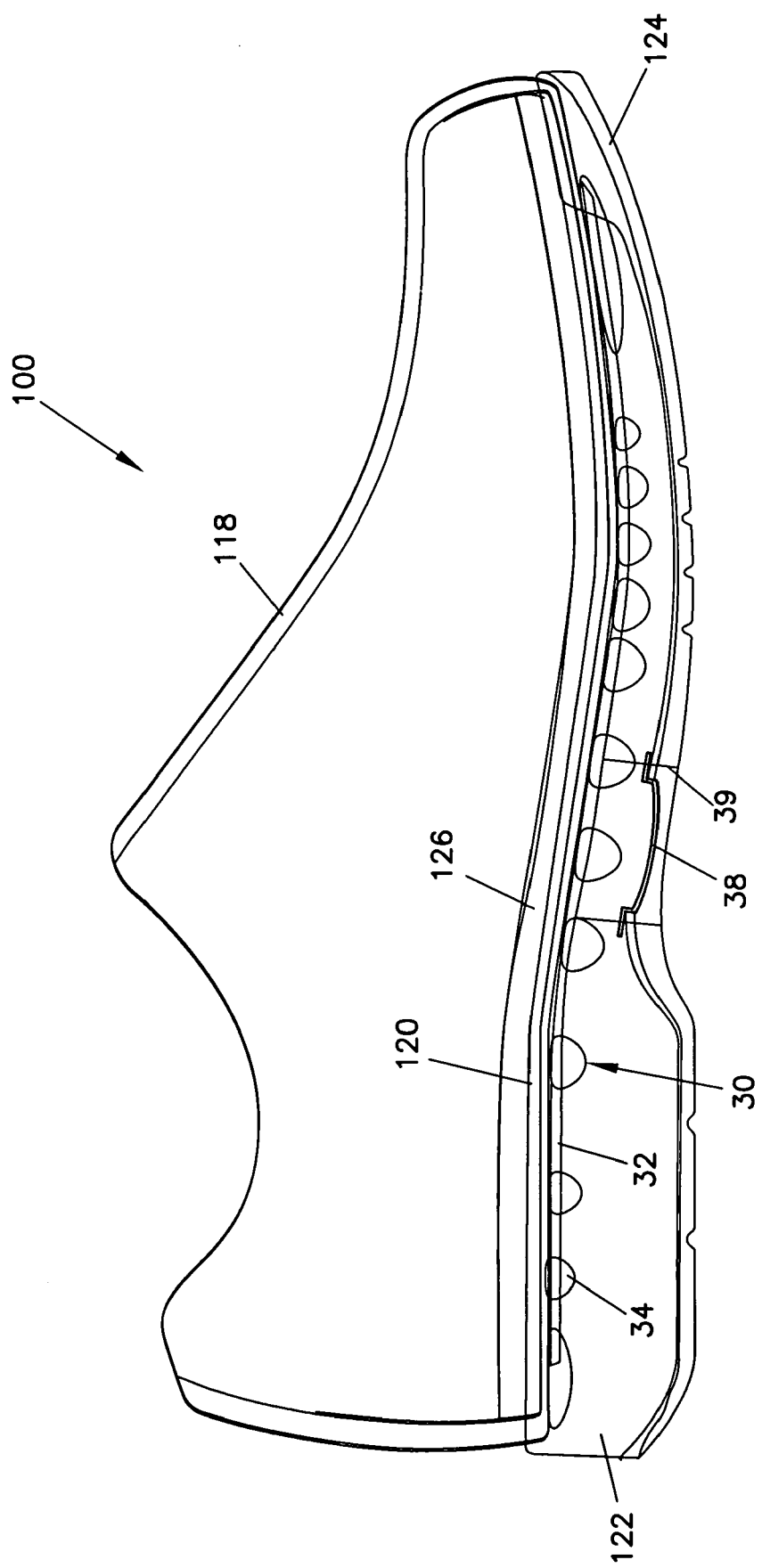
FIG. 2 is a side cross-sectional view of a footwear having an embedded support structure according to principles of the invention.
Figure 3:
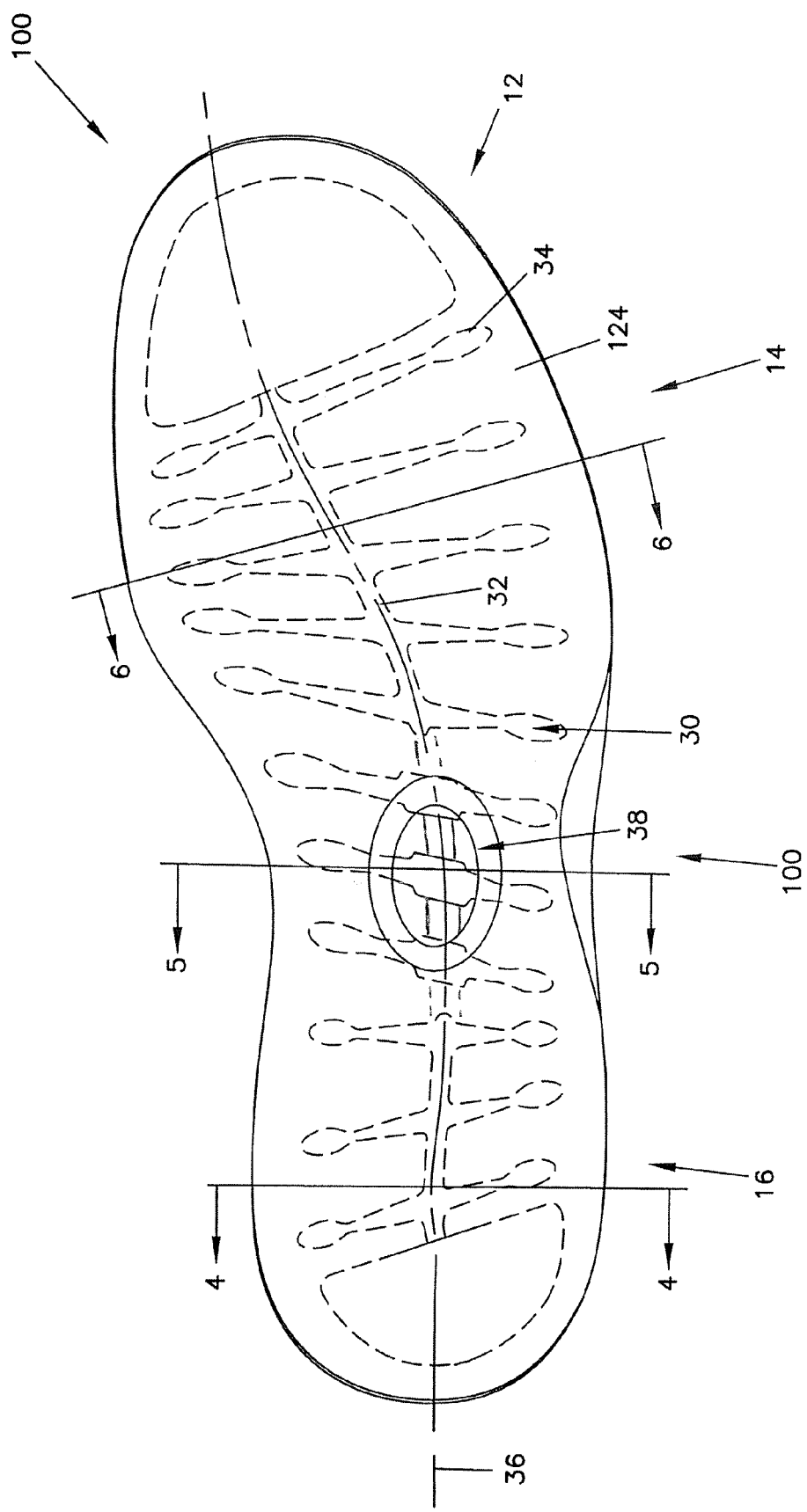
FIG. 3 is a bottom plan view of the footwear of FIG. 2.

An example footwear 10 known in the art is shown in FIG. 1. Footwear 10 includes a forefoot section 12, a midfoot section 14, and a hindfoot section 16, and further includes an upper 18, a lasting insole 20, a midsole 22, an upper midsole 23, an outsole 24, and a padded insert 26. The outsole 24 may include a variety of different materials, but is typically made from rubber or a rubber composite material compression molded into a given shape. The outsole 24 may be cupped upward, as shown in FIG. 1, so as to extend upward at edges of the outsole to cover those parts of the footwear that may otherwise contact the ground. The midsoles 22, 23 are typically the primary cushioning and shock attenuation components of the footwear and may be one of two types of construction. A first type of construction includes a molded EDA material or polyurethane (typically known as foam or a foam product), as shown in FIG. 1. This type of construction is common in athletic and casual footwear but also has a wide variety of other uses. The second type of construction is a masting design in which the midsole is hard and relatively thin. This type of construction is common for dress footwear and some types of boots and other work footwear. A padded insole 26 may be removable from the footwear, or in other instances may be bonded to the lasting insole 20.

Footwear 10 is generally orientated along an XYZ coordinate system wherein the direction along a length of the footwear is the Y direction, the direction transverse across a width of the footwear is the X direction, and a direction vertical upward relative to the outsole 24 is the Z direction. The same or similar reference numbers used to describe features of footwear 10 will be used for like components in the following examples.

An example footwear 100 having a support structure 30 according to principles of the invention is illustrated with reference to FIGS. 2-6. Footwear 100 includes forefoot, midfoot and hindfoot sections 12, 14, 16; an upper 118, a lasting insole 120, a midsole 122, an outsole 124 and a padded insert 126. The support structure 30 may include a longitudinally extending support 32 (referred to herein as a "spine", "elongate spine", "longitudinal spine", or "longitudinal member") and a plurality of laterally extending supports 34 (referred to herein as "ribs", "support ribs", "rib supports", "lateral supports", or "lateral ribs"), and may further include a window 38 that provides viewing into a void 39 in midsole 122 and outsole 124. The window 38 provides viewing of a portion of support structure 30 after footwear 100 is assembled. Spine 32 may extend along an axis 36 that defines a spatial centerline or a pressure centerline of footwear 100.

Figure 5:
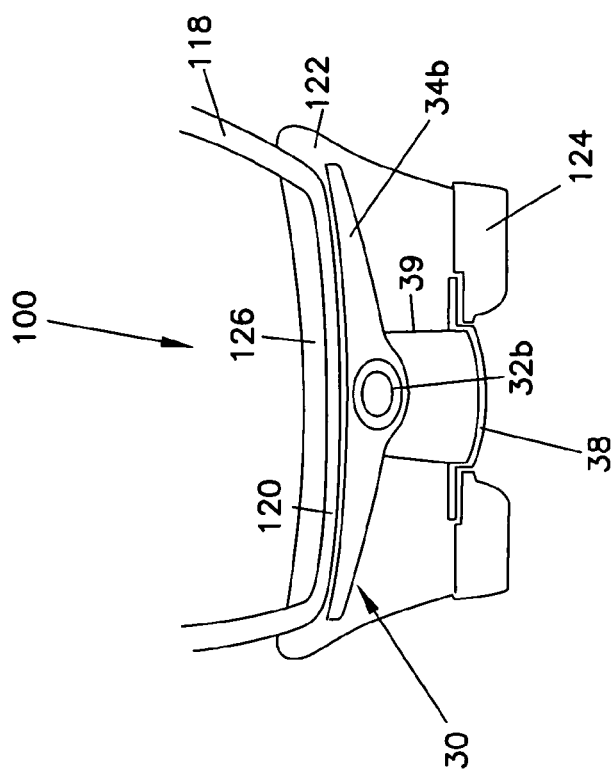
FIG. 5 is a lateral cross-sectional view of the footwear of FIG. 3 taken along cross-sectional indicators 5-5.
Figure 6:
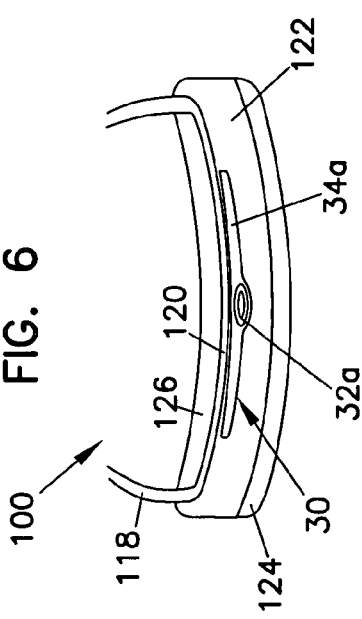
FIG. 6 is a lateral cross-sectional view of the footwear of FIG. 3 taken along cross-sectional indicators 6-6.
Figure 4:
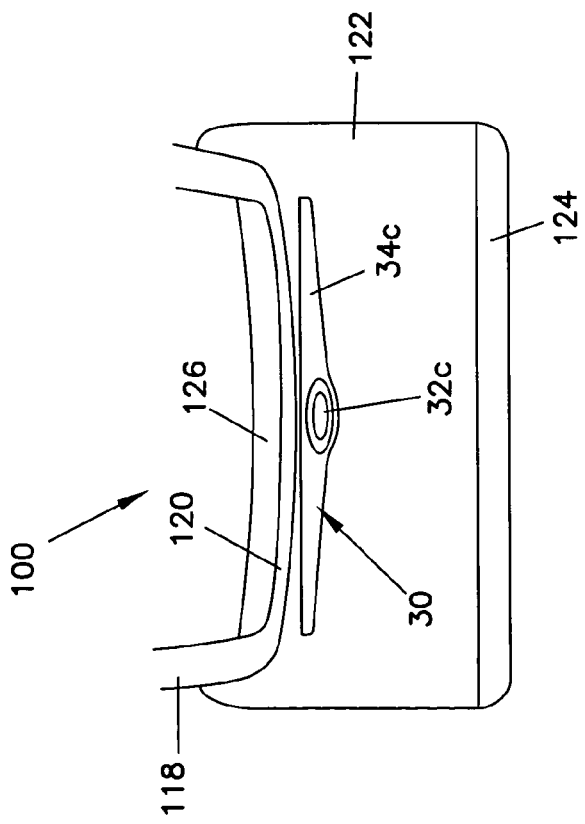
FIG. 4 is a lateral cross-sectional view of the footwear of FIG. 3 taken along cross-sectional indicators 4-4.

Referring to FIGS. 4-6, a cross-section taken in each of sections 12, 14, 16 of footwear 100 illustrate example shapes and configurations for the spine 32 and ribs 34. The section of spine 32 that corresponds to the forefoot, midfoot and hindfoot sections of footwear 100 are referred to as spine section 32a, 32b, 32c, respectively. Likewise, groups of ribs 34 corresponding with the forefoot, midfoot and hindfoot sections of footwear 100 are referred to as ribs 34a, 34b, 34c, respectively. FIGS. 4-6 illustrate that the ribs and spine may have different shapes and sizes at various locations along a length a support structure 30 in order to provide the needed support, stability and shock attenuation of footwear 100 at each section of the footwear. Some of these variations will be described in the further example that follows.

Spine 32 may include first and second ends 48, 50 and extend along different "centerlines" of a footwear. In one example embodiment shown in FIG. 7, first end 48 is aligned with a toe centerline 42 and second end 50 is aligned with a heel centerline 40. The axis 36 of spine 32 may change direction in the midfoot section 32b. Another example embodiment shown in FIG. 8 includes a spine 32 that follows an axis 36 that corresponds to a pressure centerline. of a footwear. In this configuration, first end 48 aligns with a centerline 46 of toe push off pressure and second end 50 aligns with a centerline 44 of heel strike pressure. The curvature of axis 36 shown in FIG. 8 may be altered for different footwear designs depending on the footwear structure and the intended use of the footwear.

Figure 8:
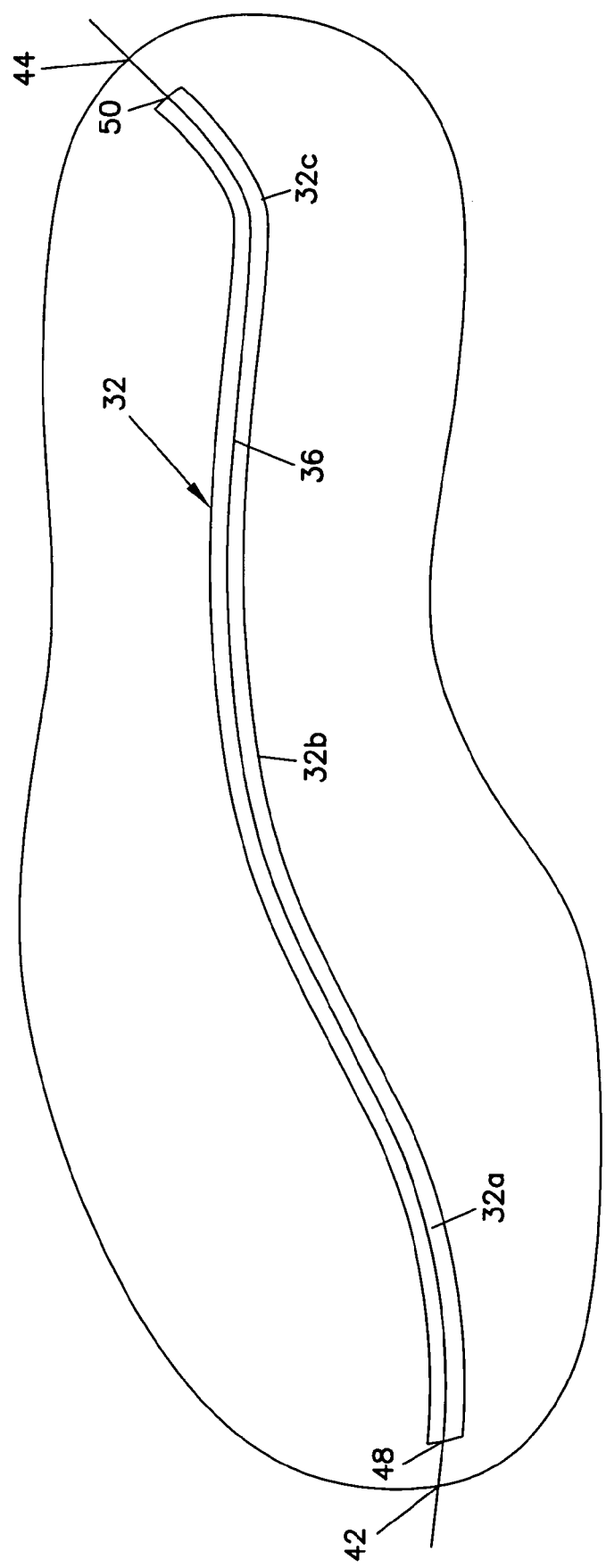
FIG. 8 is a top view illustrating another example longitudinal member according to principles of the invention that follows a pressure line for a footwear.
Figure 9:
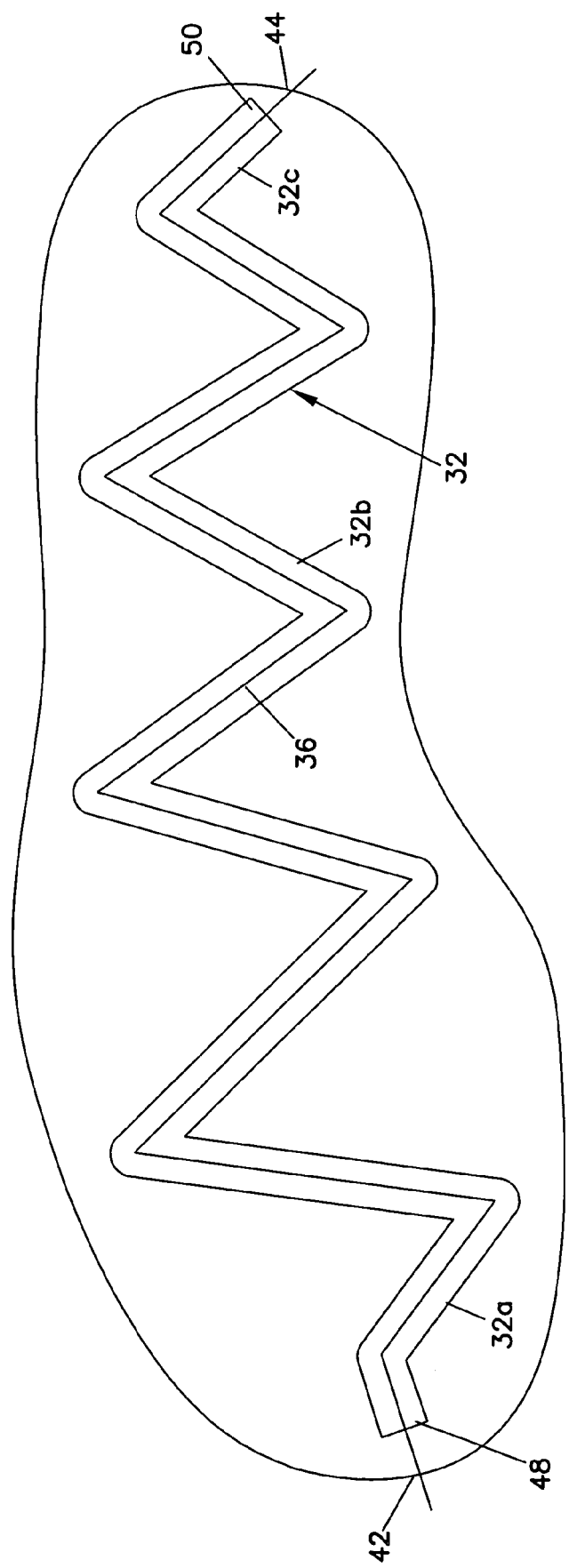
FIG. 9 is a top view illustrating a further example longitudinal member according to principles of the invention that follows a random line in a footwear.

A further example embodiment shown in FIG. 9 includes a spine 32 that follows a complex centerline pattern. First end 48 in this configuration aligns with a centerline 42 of a footwear toe while the second end 50 aligns with a centerline 44 of heel strike pressure. In other embodiments, the first and second ends 48, 50 may be aligned differently or in different combinations of pressure centerlines and feature centerlines of a footwear than shown in FIGS. 7-9. Furthermore, spine 32 may extend along an axis that is offset from the axis 36 shown in FIGS. 7-9, or there may be two or more spine members that extend along different portions of a footwear or that extend across only certain sections of the footwear.

FIG. 10 provides an example support structure 30 that illustrates some of the features and benefits of a support structure disclosed herein. Support structure 30 includes spine 32 and a plurality of ribs 34. Each rib 34 includes first and second sides 52, 54, a mid section 56 and a cut-out portion 58 sized to engage spine 32. Rib 34 may also include a turned-up portion 60 or a turned-down portion 61 at ends of the ribs. Spine 32 and ribs 34 may be made of the same or different materials depending on the application for the support structure 30. In one example embodiment, ribs 34 are made from a material having less flexibility than the material of spine 32. In other embodiments, the structure of spine 32 compared to that of the ribs 34 alone may provide greater flexibility in the spine than in the ribs. In some applications it is preferred to have greater flexibility in the spine than in the ribs so as to allow flexibility along a length of the footwear at certain areas of the footwear while providing desired amounts of lateral support with the ribs. In other embodiments it is desired to have a spine that has the same flexibility characteristics or being less flexible than ribs 34 if the intended purpose is to reduce longitudinal flexibility at certain sections in the footwear.

The support structure 30 shown in FIG. 10 illustrates direction of motion of ribs 34 about the X, Y and Z-axis. Arrow 66 illustrates rotational motion about the Y-axis, which generally corresponds to an axis of spine 32, arrow 68 illustrates rotational motion of rib 34 about the Z-axis, and arrow 70 illustrates rotational motion about the X-axis, which axis is generally aligned in a lateral direction across a width of the footwear. The amount of movement of ribs 34 about the X, Y and Z-axis may be controlled by both the structure and materials used for ribs 34 and spine 32. For example, spine 32 may include different materials in different "zones" of support structure 30 to provide varying amounts of movement of ribs 34 in each zone. In other embodiments, the cross-section of spine 32 may be such that there is little flexibility for a given material that would otherwise provide greater flexibility if using a smaller cross-section.

FIGS. 10 and 11 further illustrate features related to an optional method of mounting ribs 34 to spine 32. Although support structure 30 may be most easily generated using a co-molding process in which the spine and ribs are secured together during the molding process, the spine 32 and ribs 34 may be separately formed and then individually mounted to each other. One example of such a separate mounting includes the use of position fins 72, 74 that extend outward from spine 32 and corresponding locking recesses 76, 78 formed in rib 34. In this configuration, spine 32 may be inserted into opening 58 in the rib until position fin 72, 74 engage locking recesses 76, 78 to hold the rib 34 in a fixed position relative to spine 32. In other embodiments (not shown), spine 32 may include at least one recess formed around a circumference of the spine and the rib may include positioning fins extending radially inward from aperture 58 of the rib so that the positioning fins of the rib engage the recesses formed in the spine to lock the rib into a predetermined position.

Figure 7:
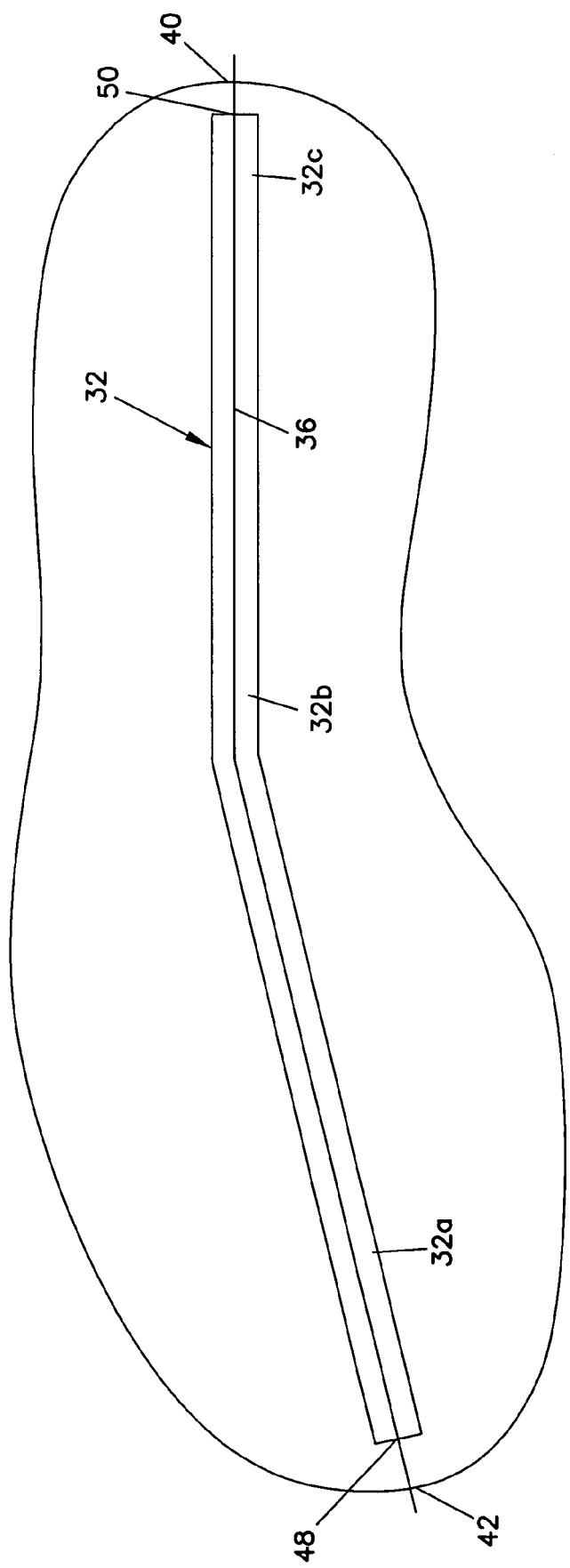
FIG. 7 is a top view illustrating one example longitudinal member according to principles of the invention that follows a centerline a footwear through the toe and heel centerlines.
Figure 12:
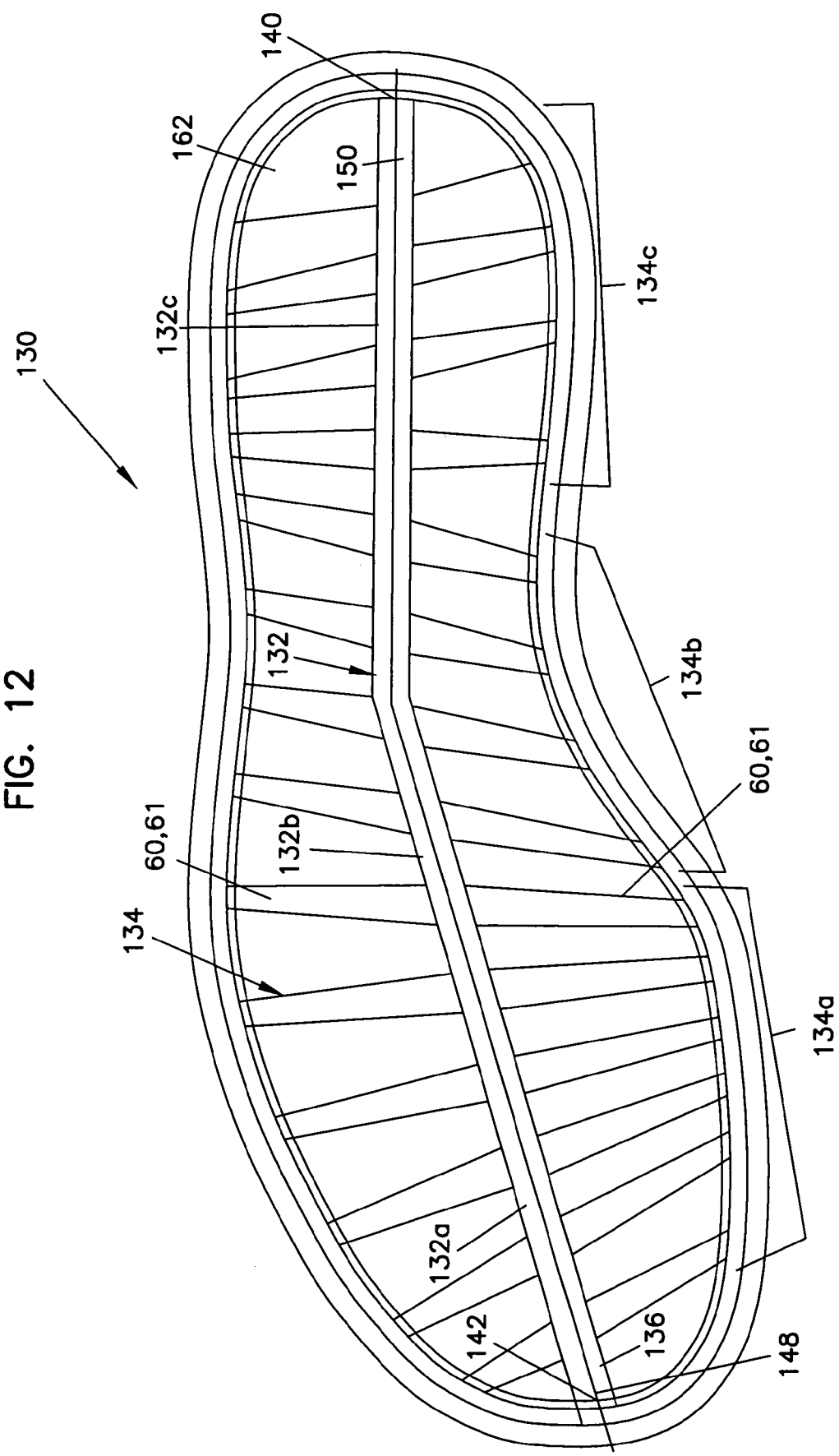
FIG. 12 is a top view of one example support structure that includes the longitudinal member of FIG. 7.

FIG. 12 illustrates another support structure 130 that includes a spine 132 corresponding to the spine arrangement shown in FIG. 7. First and second ends 148, 150 of spine 132 are aligned with respective toe and heel centerlines 142, 140. An axis 136 of spine 132 changes direction in an area corresponding to a midfoot of a footwear and includes generally linear sections between the first and second ends 148, 150 and the point at which direction changes. Spine 132 includes forefoot, midfoot and hindfoot sections 132a, 132b, 132c that correspond to groups of ribs 134a, 134b, 134c. Support structure 130 may also include a heel plate 162 secured at second end 150.

Figure 13:
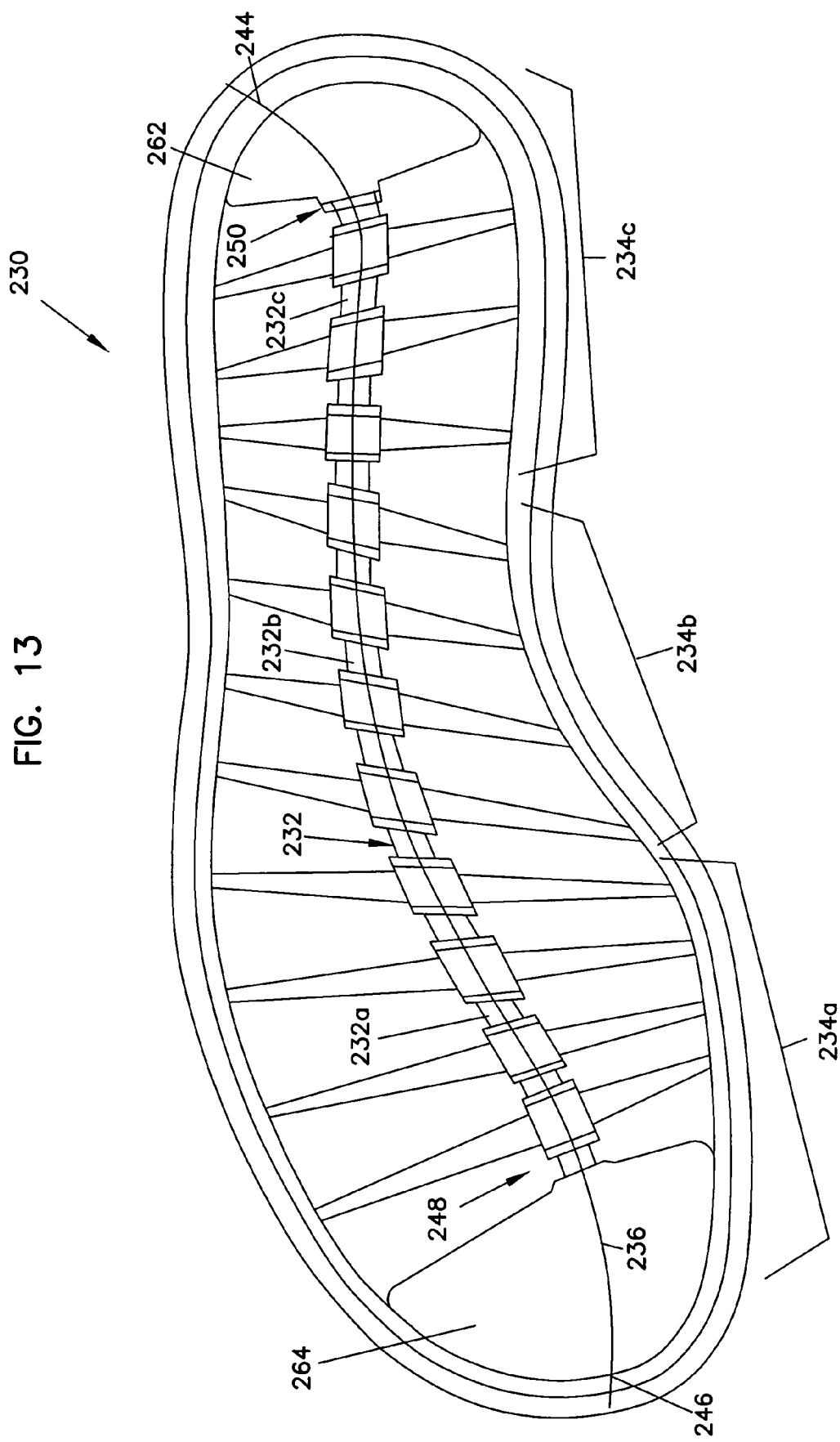
FIG. 13 is a top view of another example support structure that includes the longitudinal member of FIG. 8.

FIG. 13 illustrates a support structure 230 that includes a spine 232 extending along an axis 236 that is similar to the configuration shown in FIG. 8. First and second ends 248, 250 of spine 232 align with respective centerlines of toe push-off pressure and heel strike pressure 246, 244, and axis 236 follows a pressure centerline of a given footwear. Ribs 234 are separated into groups 234a, 234b, 234c corresponding to the forefoot, midfoot and hindfoot sections of a footwear. Spine 232 includes corresponding zones 232a, 232b, 232c. Support structure 230 may also include a heel plate 262 secured at end 250 and a toe plate 264 secured at first end 248.

Figure 14:
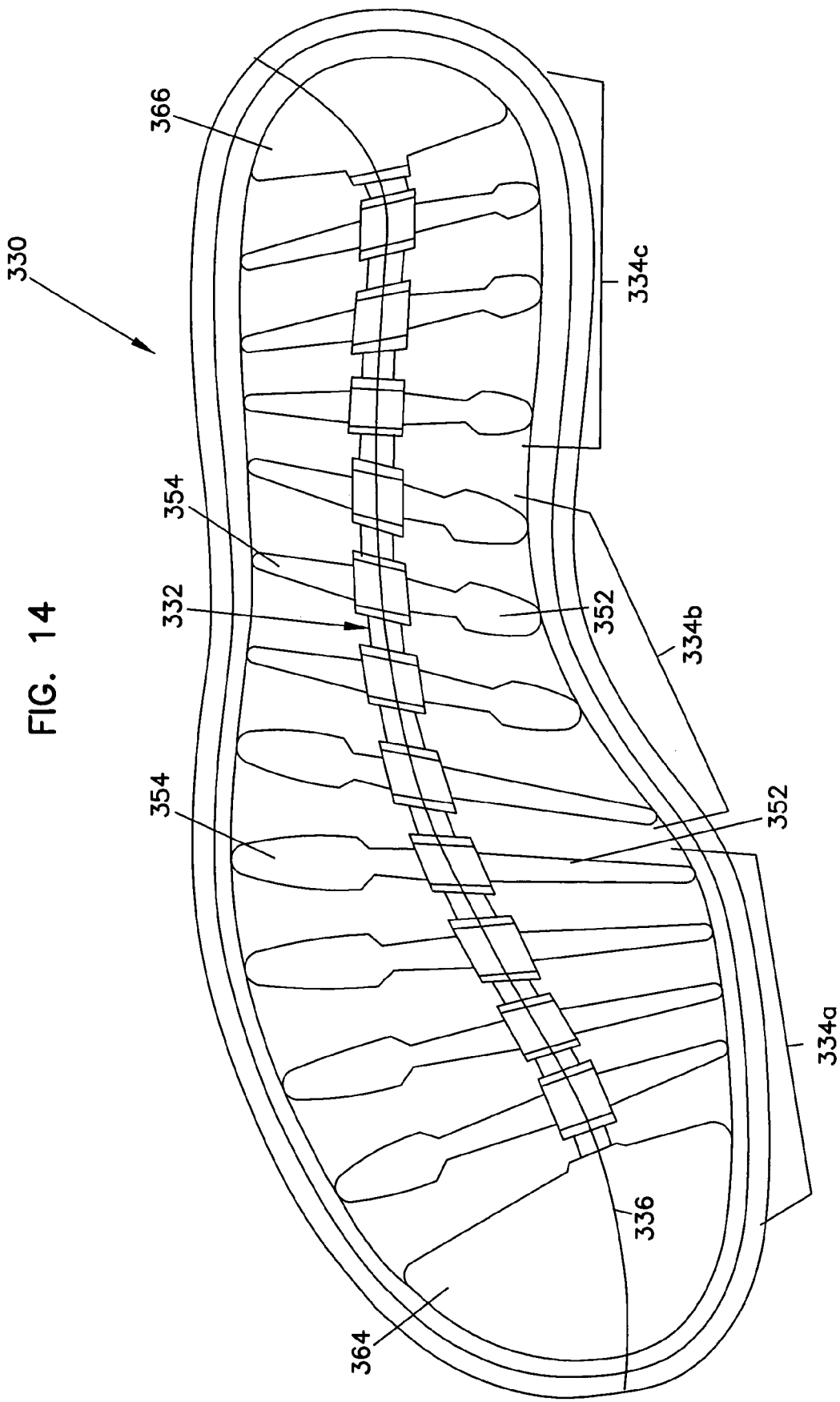
FIG. 14 is a top view of anther example support structure that includes lateral supports with a single flared end.

FIG. 14 illustrates another example support structure 330 that is a variation of support structure 230. The first side 352 of some of the ribs in zones 334b, 334c include a flared, wider top profile than the second side 354 of those same ribs. In addition, the second side 354 of some of the ribs 334a, 334b are flared so as to have a wider top profile than the first side 352 of those same ribs. In other embodiments, different combinations of ribs in various sections of the support structure may include flared ends at the first or second sides, or both the first and second sides may include flared ends as shown by support structure 430 in FIG. 15. The first and second sides 452, 454 of support structure 430 are flared in a generally oval shape, but may, in other embodiments, have other shapes and different sizes from those flares shown in FIGS. 14 and 15.

Figure 15:
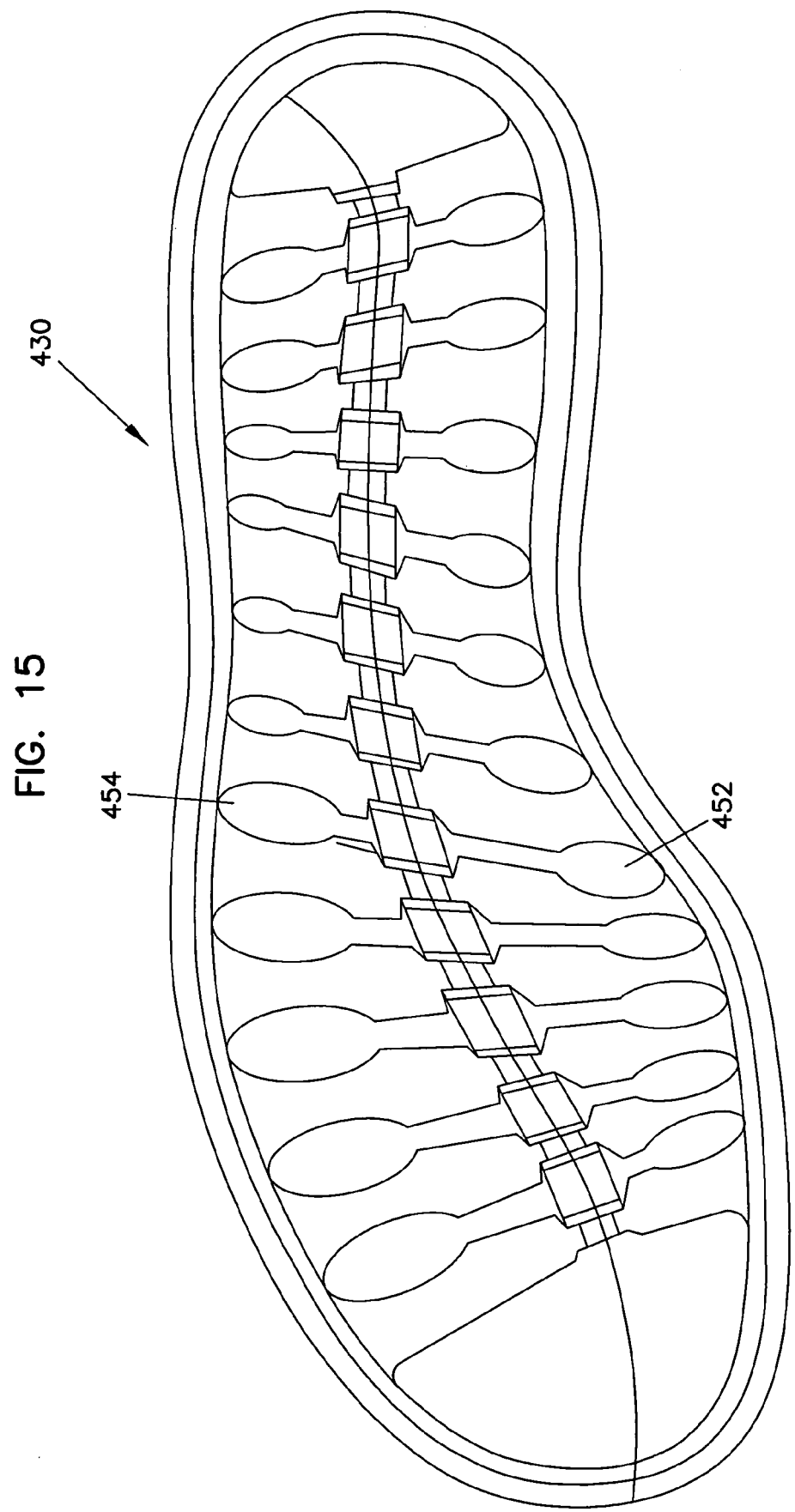
FIG. 15 is a top view of anther example support structure that includes lateral supports with two flared ends.

FIGS. 14 and 15 illustrate support structures 330, 430 in which the spine 332, 432 extends through an internal cavity of each of the ribs 334, 434. Support structure 530 shown in FIG. 16 includes a connection between spine 532 and ribs 534 in which the spine 532 is exposed as it passes through and connects to each of ribs 534. Spine 532 includes a pair of position fins 572, 574 at the location where each rib 534 is to be secured to spine 532, and a corresponding recess 558 is formed in midsection 556 of each rib. In one embodiment shown in FIG. 34, a top surface of spine 532 is coplanar with a top primary surface of rib 534. This type of flush mounting of the top surfaces of the spine and ribs may be advantageous for supporting the lasting insole directly or for directly engaging an outsole of a footwear (if the support structure 530 is turned upside down). A similar configuration may be useful for securing the toe plate 564 and heel plate 562 to the spine 532 at respective first and second ends 548, 550. Further example configurations for securing the spine and ribs are shown and described with reference to FIGS. 34-38.

Figure 17:
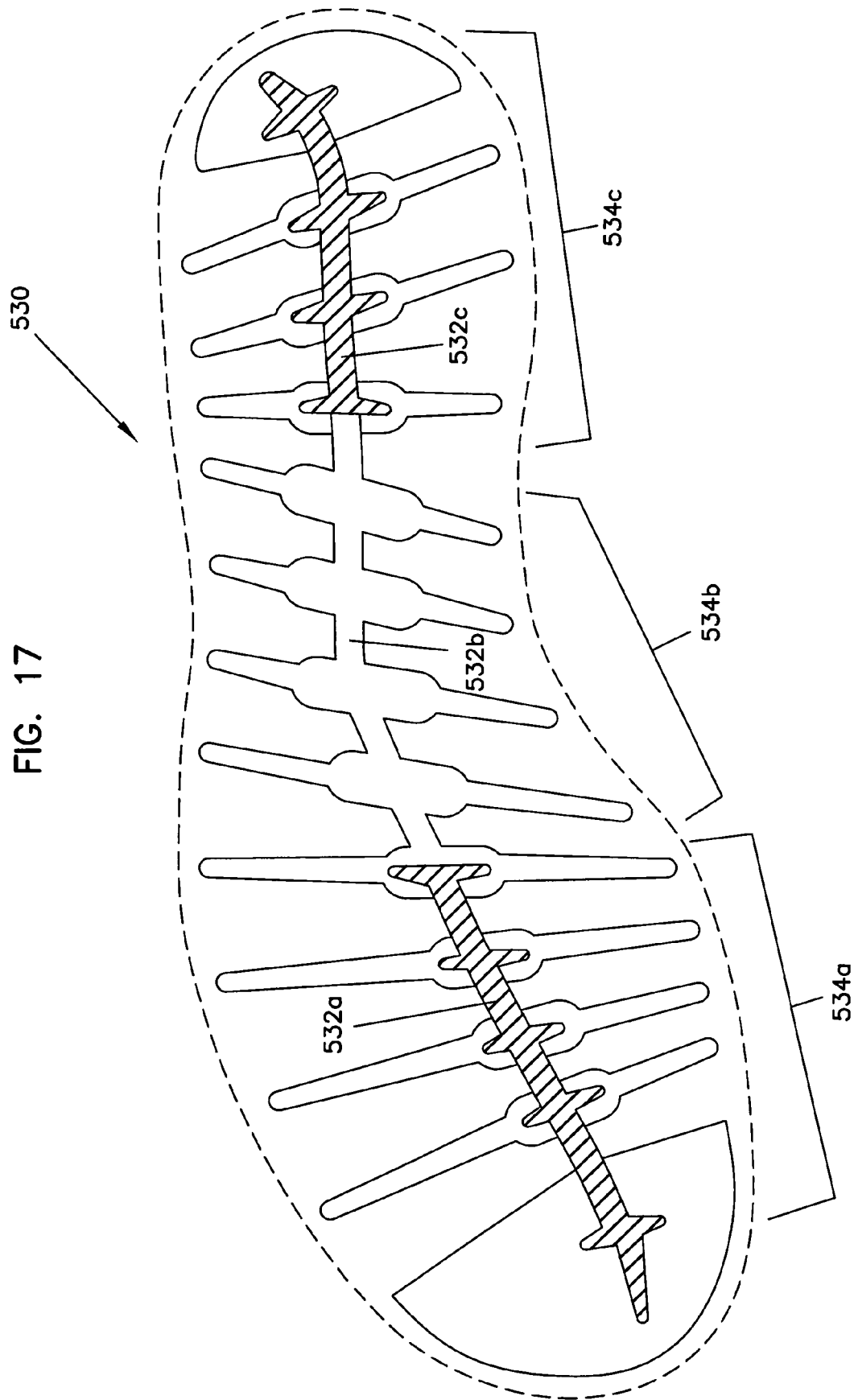
FIG. 17 is a top view of anther example support structure that includes lateral supports at a mid section that act as shank for a footwear.

FIG. 17 illustrates a variation of support structure 530 in which the spine 532b associated with ribs 534b is formed of the same material as the ribs of that section. Thus, if ribs 534c include a material that has little flexibility and spine 532b includes the same low flexibility material, the section of support structure 530 associated with the midfoot of a footwear would have less flexibility than those sections of support structure 530 at the forefoot and the hindfoot areas of the footwear. As a result, the midfoot "zone" of the support structure 530 has a low flexibility, which may be useful for replacing a shank element that would otherwise be required in the footwear.

Figure 18:
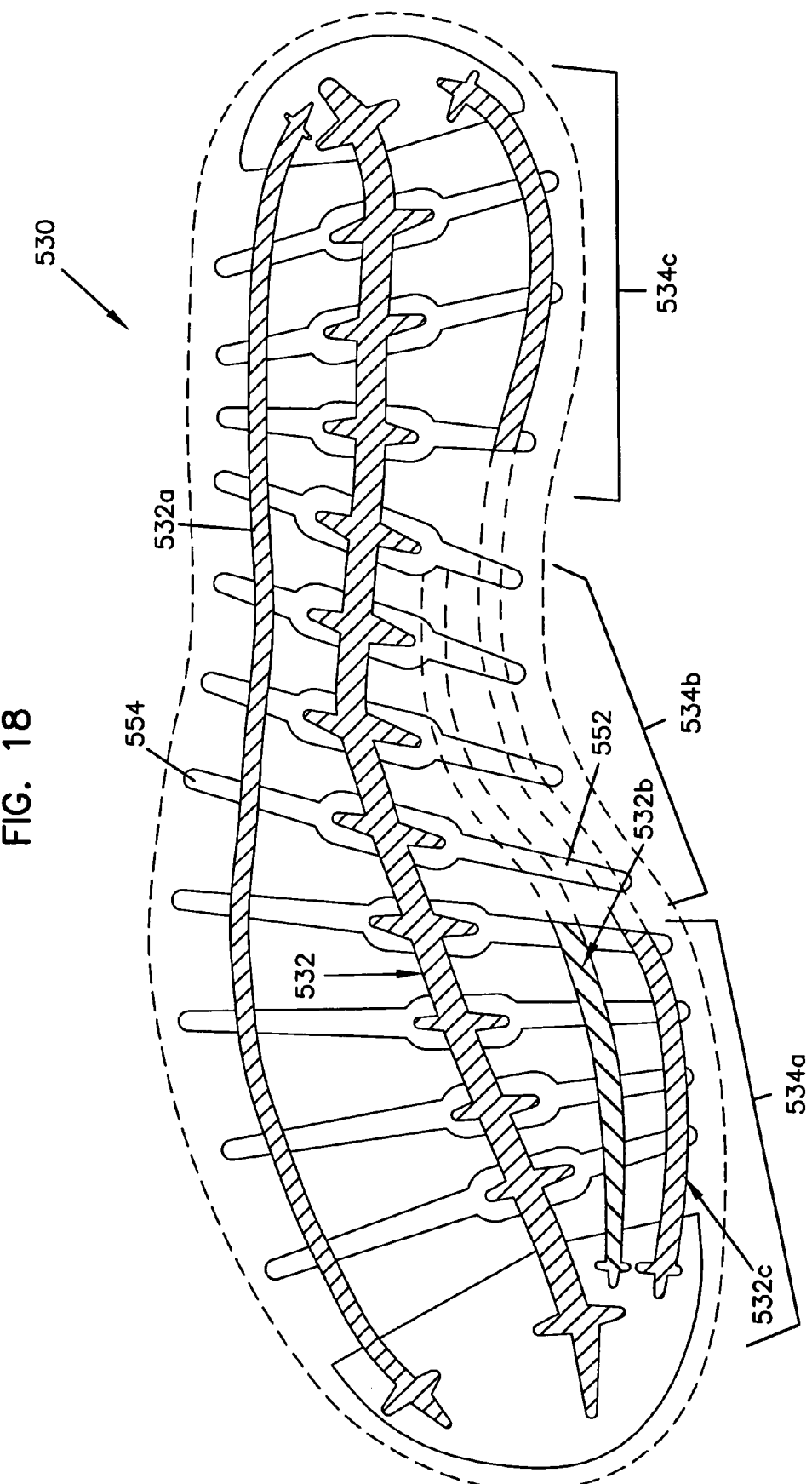
FIG. 18 is a top view of anther example support structure that includes multiple longitudinal supports.

FIG. 18 illustrates a yet further variation of support structure 530 that includes multiple longitudinally extending spine members 532*a*, 532*b*, 532*c* in addition to spine 532. Each of the additional spine members 532*a*, 532*b*, 532*c* may have a different curvature and may extend along different sections of support structure 530. For example, spine member 532*c* is secured at a first side 552 of ribs 534 between the ribs 534*a*, while spine member 532*a* is secured at second side 554 and connects ribs along all sections 532*a*, 532*b*, 532*c*. The additional spine members 532*a*, 532*b*, 532*c* may be made of the same material as spine 532, or may be made of different materials having different properties from spine 532, and may in some instances completely eliminate the need for spine 532.

Figure 19:
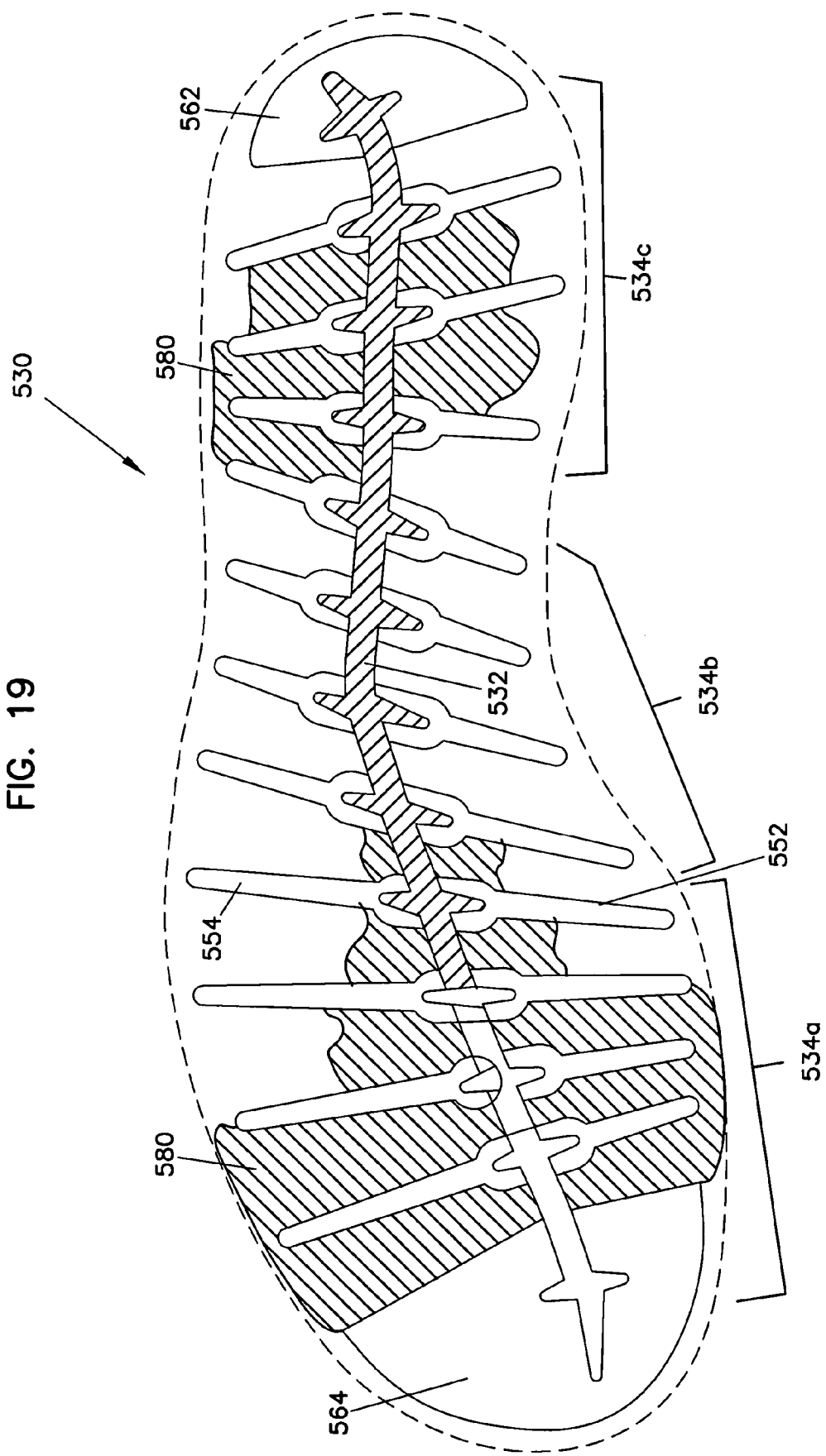
FIG. 19 is a top view of anther example support structure that includes webbing material that extends between some of the lateral supports.

A yet further variation of support structure 530 is shown in FIG. 19 and includes a webbing material 580 interposed between and connecting various ribs 534 in sections 532*a*, 532*b*, 532*c*. Such a webbing member may limit movement of the ribs 534 about the Z-axis while still permitting movement of the ribs about the X and Y-axis. In some embodiments, webbing 580 may extend between only the second sides of ribs 534, while in other embodiments webbing 580 may extend between only the first sides of the ribs 534. A yet further embodiment may include the configuration shown in FIG. 38 in which webbing 580 further extends across a top or a bottom, or both a top and a bottom surface of each of the ribs 534.

Figure 20:
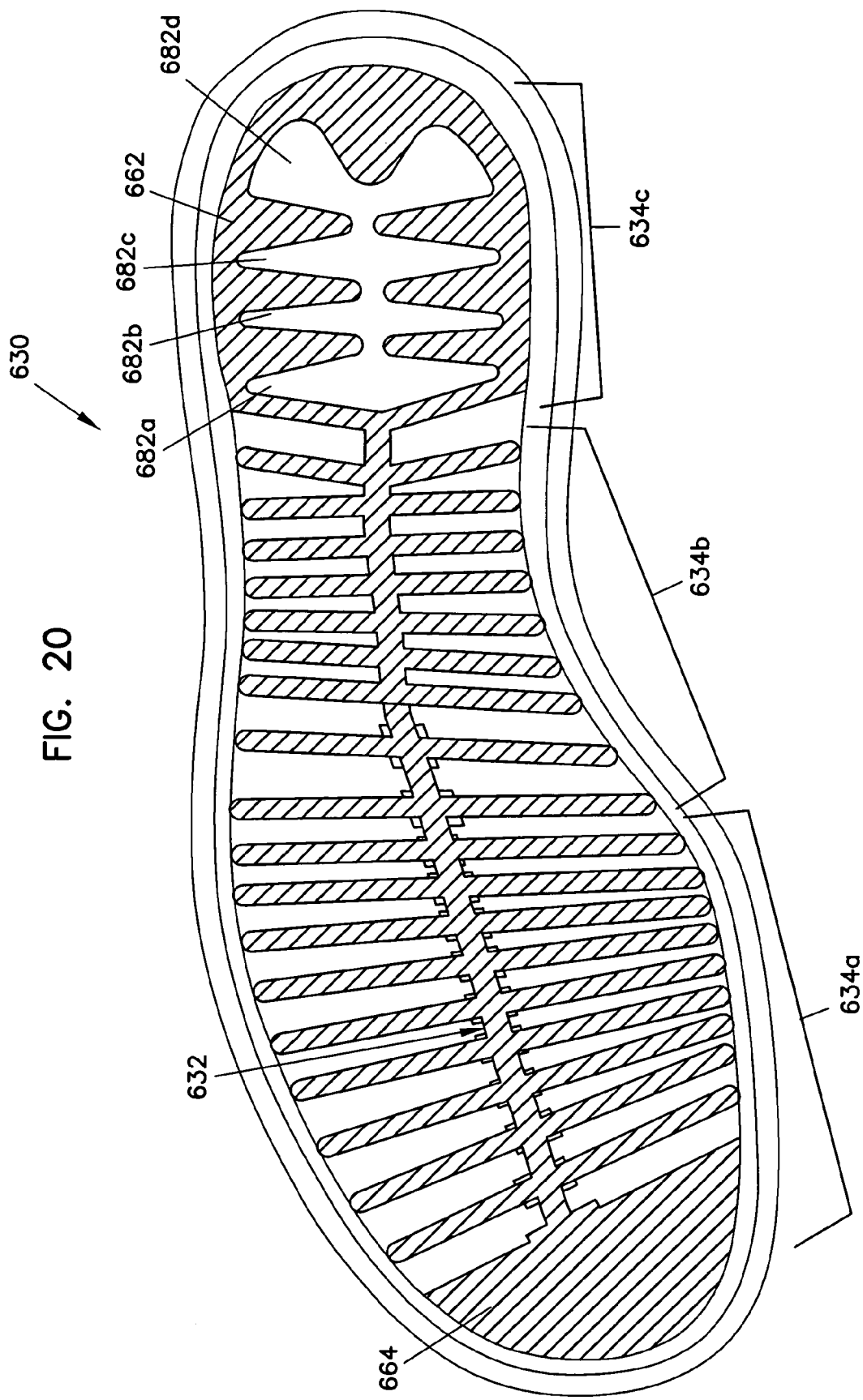
FIG. 20 is a top view of anther example support structure that includes a heel plate.

FIG. 20 illustrates another support structure 630 that includes a greater number of ribs in zones 634*a*, 634*b* than in those embodiments shown previously. Support structure 630 includes a heel plate 662 that takes the place of ribs 634*c*. Heel plate 662 includes recesses 682*a-d* to increase the flexibility in the heel plate 662. Support structure 630 also includes a toe plate 664. In yet further embodiments, rib 634*a* and 634*b* may be even narrower and closely spaced apart than the configuration shown in FIG. 20, or such ribs may replace the heel plate 662 within zone 634*c* and plate 662 may replace ribs 634*a* or ribs 634*b*.

Another example support structure 730 shown in FIG. 21 may be used as a blocker unit that can be cut or otherwise formed for use in multiple footwear sizes. For example, an outer periphery 784 of support structure 730 may be used for one footwear size, or the support structure 730 may be cut or otherwise formed to have the smaller outer periphery 786 such that support structure 730 may fit in a smaller footwear size. The relatively simple design of spine 732 and ribs 734 may be advantageous for providing consistent performance of support structure 730 in any of several sizes.

FIGS. 21A and 21B illustrate side views of possible configurations for support structure 730 when using a webbing 780 between and/or around ribs 734. FIG. 21A illustrates rib 734 encapsulated between layers of webbing 780 and connected together with spine 32. As discussed above, webbing 780 may be made of the same or different materials from spine 732. FIG. 21*b* shows webbing 780 between ribs 734. In some embodiments, the webbing and spine may be colored differently than each other and different from ribs 734 so that a side view of the footwear provides a visual indicator of certain features of support structure 730.

FIGS. 22-31 are cross-sectional views taken along a length of an example footwear and illustrate various example footwear and support structure embodiments. In any of these examples or other embodiments using the principles disclosed herein, the support structure may be secured to a footwear in a number of ways. One example securing method includes molding a portion of the footwear around the support structure and then securing that portion of the footwear to the remaining portions of the footwear. Another method may include forming a portion of the footwear with recessed areas sized to receive the support structure such that the support structure may be "dropped in" to the recess. In a yet further method, the support structure may be configured as a complete layer that can be added as a separate layer during construction of a footwear.

Each of the examples shown in FIGS. 22-31 include forefoot, midfoot and hindfoot sections 12, 14, 16, an upper 18, a lasting insole 20, a midsole 22, an outsole 24, and a support structure 30 having a spine 32 and ribs 34. Some of the examples further include an upper midsole 23. These features have been referenced in each figure. Of further note, many of the layers and features shown in FIGS. 22-31 are not shown with complete cross-section hatching so as to more clearly illustrate the various features shown in those figures.

An example footwear 200 having a generally flat outsole 24 is shown in FIG. 22. Outsole 24 is generally flat and extends along forefoot, midfoot and hindfoot sections 12, 14, 16. Support structure 30 is mounted in midsole 22 along an upper portion of the midsole 22 adjacent the lasting upper 20 and further includes toe and heel plates 64, 62 at opposing first and second ends 48, 50 of spine 32.

Figure 23:
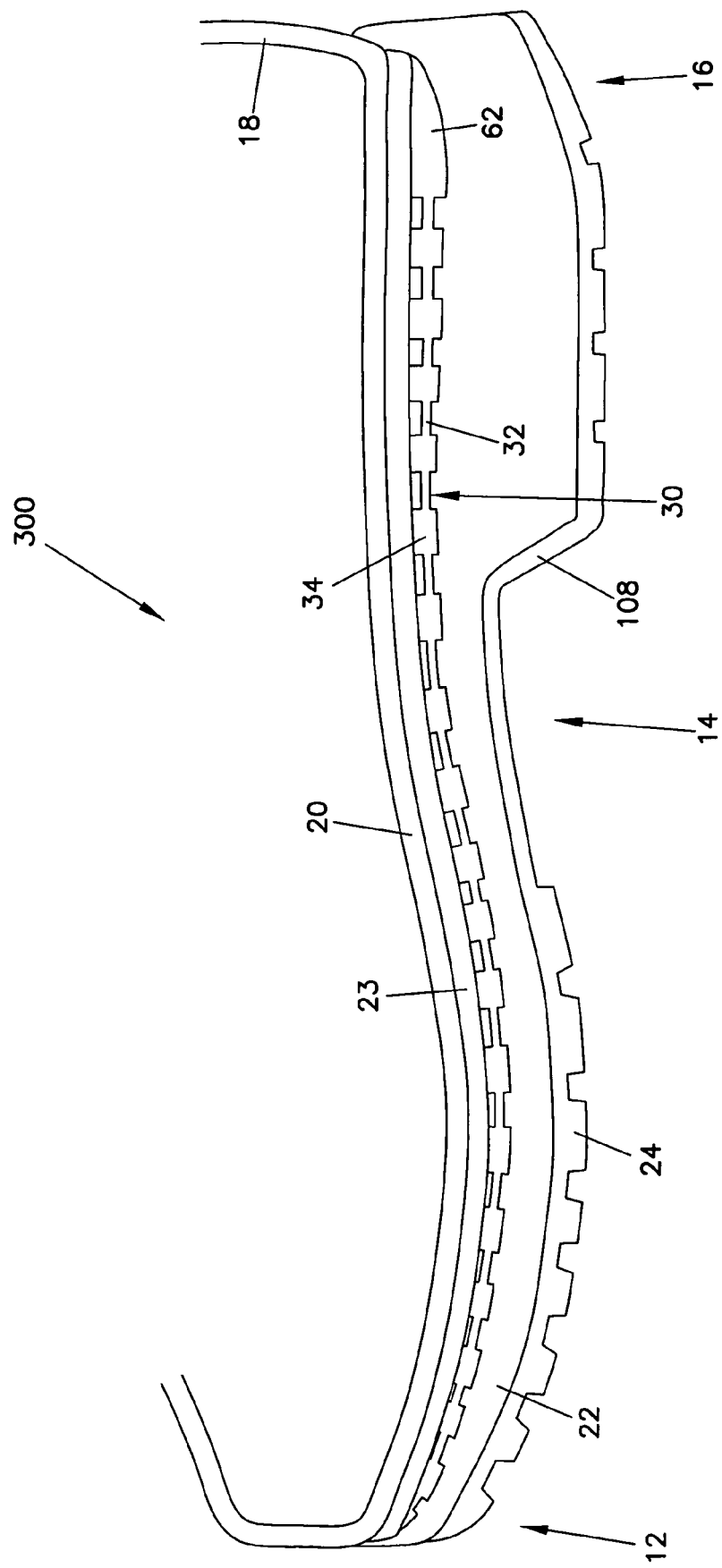
FIG. 23 is a side cross-sectional view of one example support structure according to principles of the present invention mounted in a footwear having a cut out arch section of the footwear.

Another example footwear 300 having a heel breast 108 shown in FIG. 23. Footwear 300 includes a support structure 30 that has a longitudinally extending spine 32, lateral support structures or ribs 34, at a heel plate 62. The outsole 24 and midsole 22 are recessed in the area of midsole 14 so as to create a heel portion of the footwear defined by heel breast 108. The upper midsole 23 may be co-molded with midsole 22 or may be a separate midsole member made of a different material having different properties than midsole 22. For example, upper midsole 23 may be a firm, plate-like layer or a foam having little flexibility while midsole 22 includes a foam having greater flexibility. Support structure 30 is positioned along an upper part of midsole 22 adjacent to upper midsole 23, but may in other embodiments be positioned above the upper midsole 23 or within other areas of midsole 22.

Figure 24:
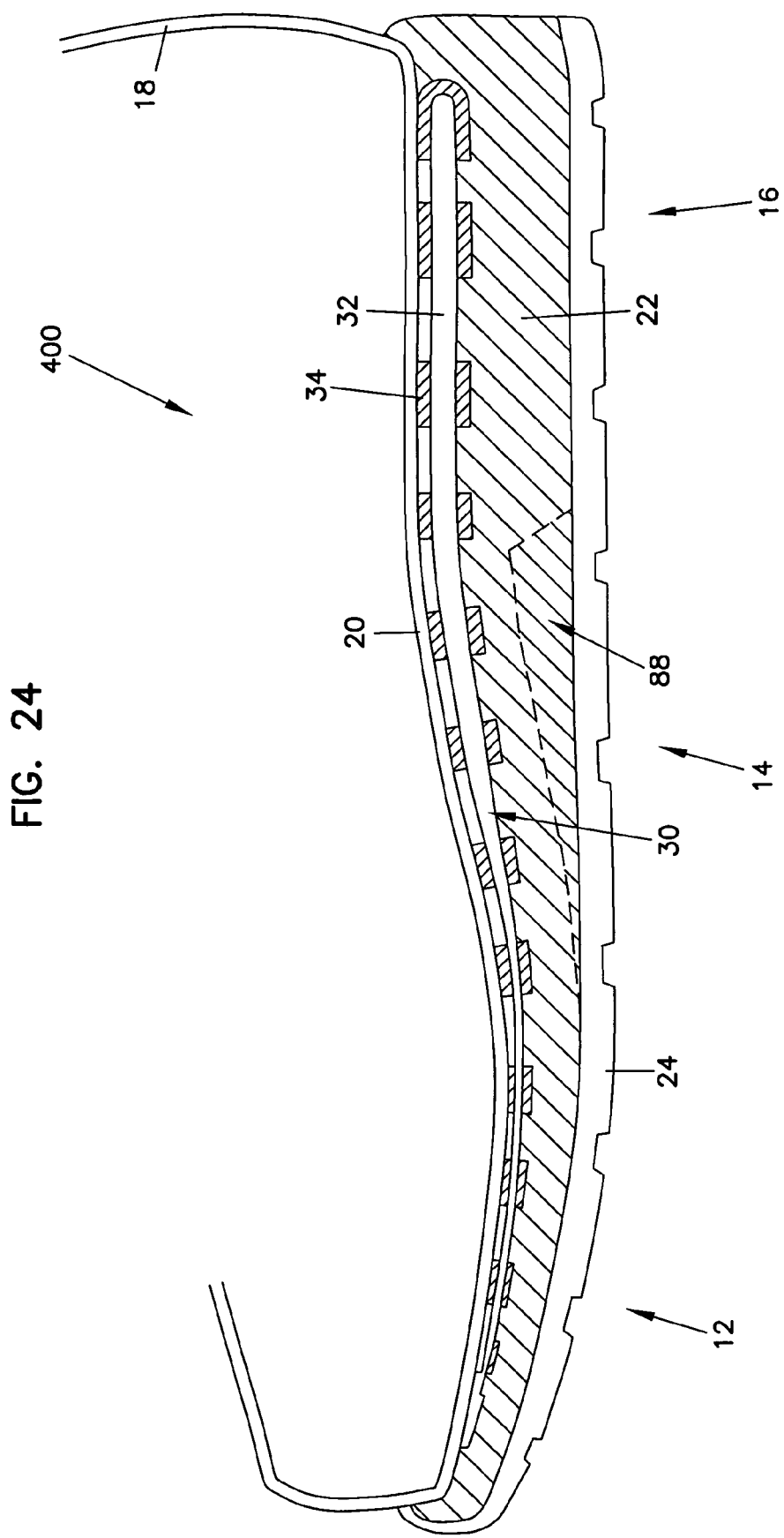
FIG. 24 is a side cross-sectional view of one example support structure according to principles of the present invention mounted in a footwear having a partial cut out arch section of the footwear.

Example footwear 400 shown in FIG. 24 includes a "fiddle" shank 88. A fiddle shank is constructed such that the midfoot region 14 includes recesses in the midsole and outsole portions, but includes a shank-like feature made from the midsole and outsole that extends downward to be supported by the ground in the area of midfoot 14. In some embodiments, the recessed portion of the fiddle shank area may be recessed completely in a vertical direction so as to expose a portion of support structure 30, or may include a window feature so as to view a portion of the support structure either from a side or a bottom view of footwear 400.

Figure 25:
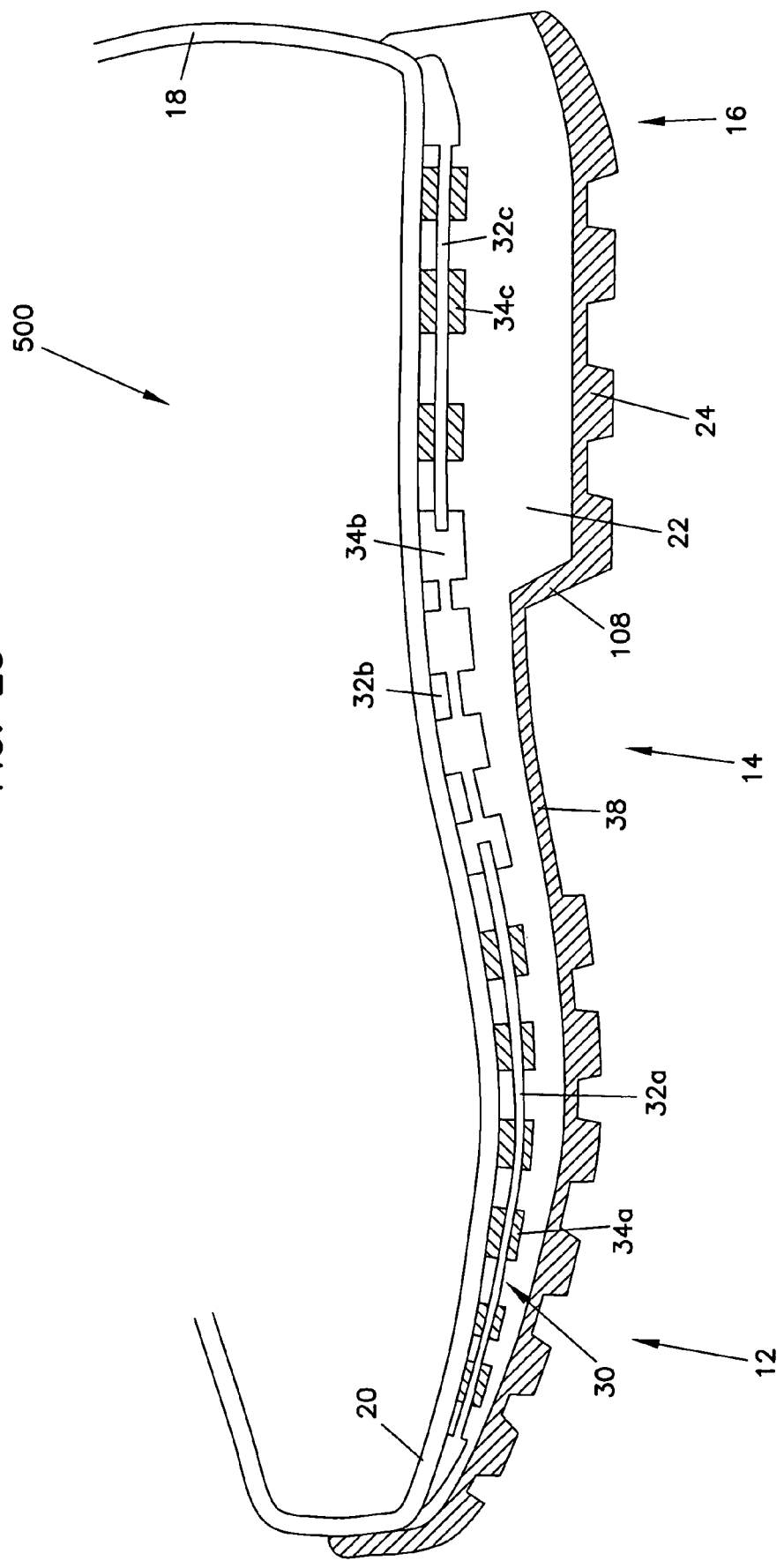
FIG. 25 is a side cross-sectional view of one example support structure wherein the mid section of the support structure is a continuous piece of material and acts as a shank for the footwear.

A yet further example footwear 500 shown in FIG. 25 includes a support structure 30 having a section of the support structure acting as a shank. Support structure 30 includes a plurality of ribs 34*a* and a spine 32*a* in the region of forefoot 12, ribs 34*b* and spine 32*b* in the area of midfoot 14, and ribs 34*c* and spine 32*c* in the area of hindfoot section 16. Another example support structure having similar features is shown as support structure 530 in FIG. 17. Spine 32*b* and ribs 34*b* may be made of the same or similar materials so as to have a reduced flexibility in the midfoot section 14 where additional support is typically desired because of the recesses in midsole 22 and outsole 24 that define the heel breast 108. Footwear 500 may also include a window 38 through outsole 24 for viewing a portion of support structure 30 from a bottom side of the footwear.

Figure 26:
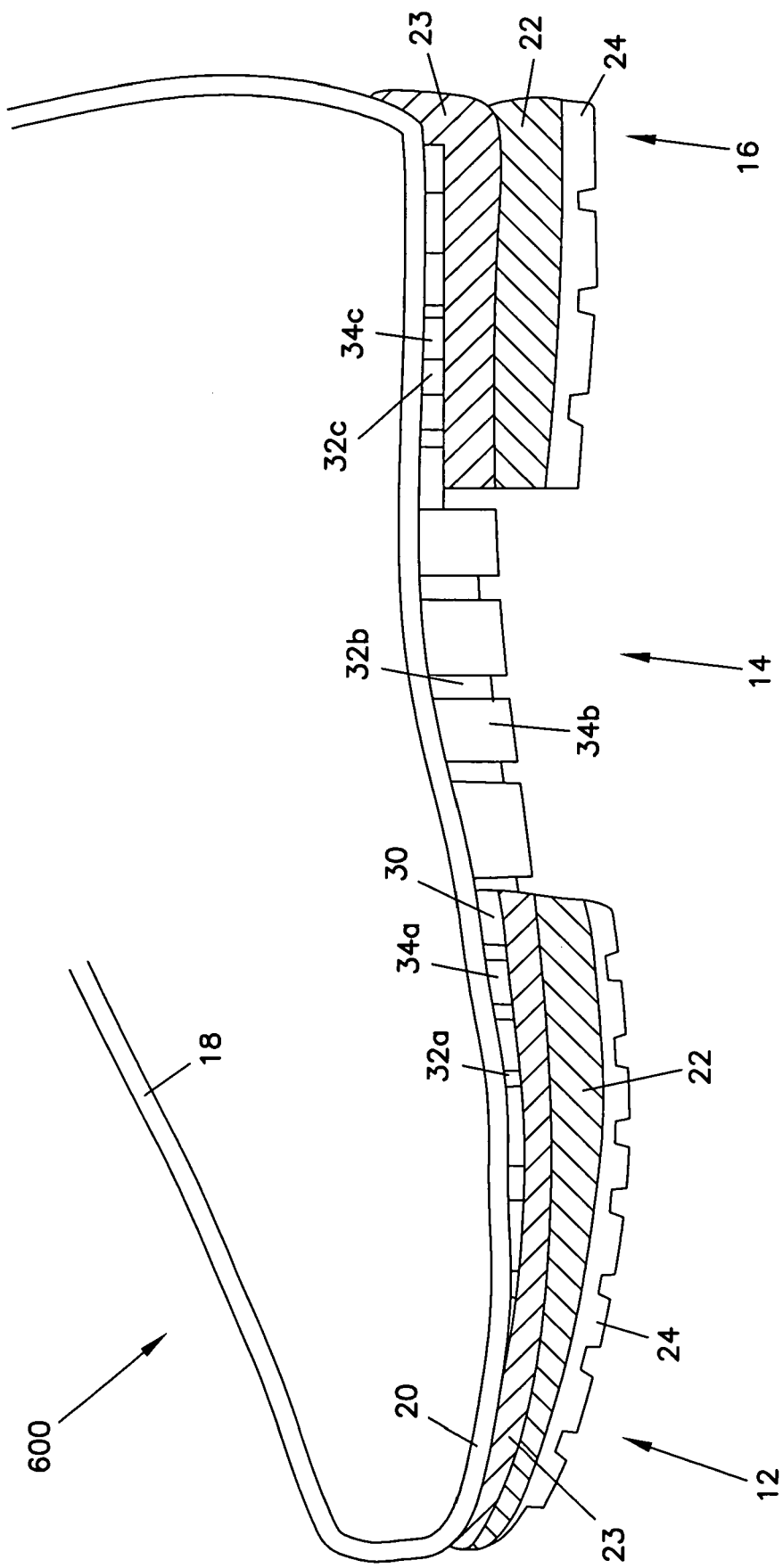
FIG. 26 is a side cross-sectional view of another example support structure wherein the mid section of the support structure is exposed at the outsole of the footwear.

A further example of footwear 600 having a portion of a support structure 30 exposed at a bottom side of the footwear is shown in FIG. 26. Support structure 30 includes separate zones or sections along a length of the footwear, which include a spine 32a and ribs 34a at the forefoot 12, spine 32b and ribs 34b at midfoot 14 and spine 32c and ribs 34c at hindfoot section 16. The spine 32b and ribs 34b may have significantly larger cross-sectional sizes as compared to the spine and ribs in other sections of the footwear, and may be made of material that has a greater resistance to wear and increased resistance to deformation because of its exposure outside of the footwear. The material in this section of support structure 32 may also have less flexibility, or may be the same material as the other sections of the support structure, but have less flexibility as a whole because of the larger cross-section of that section. In other embodiments, there may be additional or fewer layers that midsole 22 and upper midsole 23, or there may be layers of midsole between the lasting insole 20 and the support structure features 34b, 34b. The ribs 34b may be covered by a protective coating such as a clear polyurethane material to protect the ribs 34b from damage.

Figure 27:
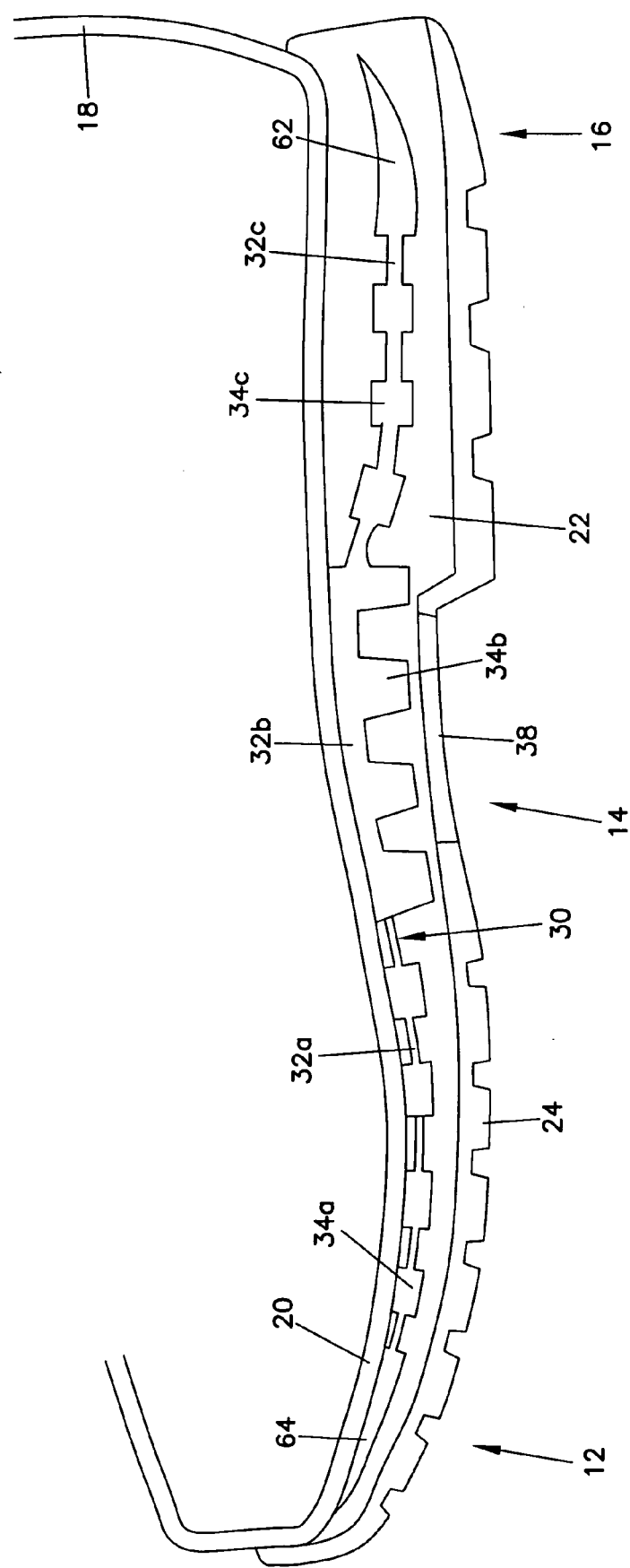
FIG. 27 is a side cross-sectional view of another example support structure wherein the hindfoot section of the support structure extends through a midsection of the midsole.

An example footwear 700 having a portion of the support structure 30 that extends into a midsection of the midsole 22 is shown in FIG. 27. Support structure 30 has at least three sections or zones that align with the forefoot, midfoot or hindfoot sections 12, 14, 16. A forefoot section of support 30 includes spine 32a and a plurality of ribs in 34a that extend along an upper portion of midsole 22 adjacent the lasting insole. A second section or zone includes a spine 32b and a plurality of ribs 34b that are enlarged in comparison to features of the other support structure sections, and extend along an upper area of midsole 22 adjacent the lasting insole 20. A third section includes a spine 32c and a plurality of ribs 34c at the hindfoot section of the footwear that extend into a midsection of midsole 22 between the lasting insole 20 and outsole 24. Support structure 30 may also include a heel plate 62 and a toe plate 64. Further, footwear 700 may include a window 38 in the midfoot section 14 of the footwear for viewing the support structure from a bottom side of the footwear.

Figure 28A:
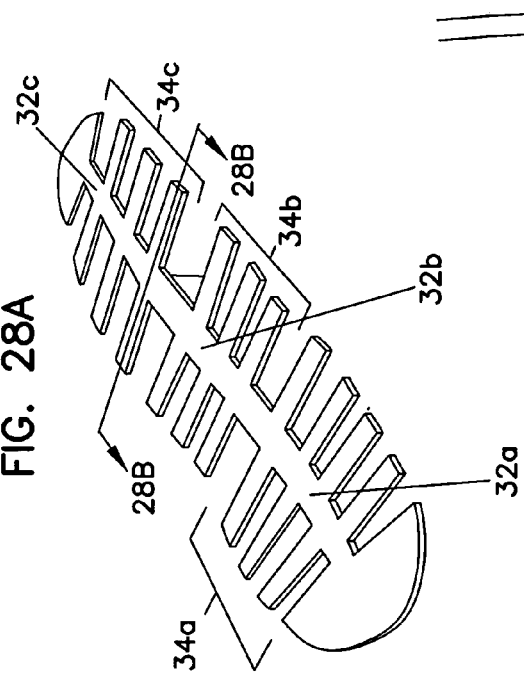
FIG. 28A is a top perspective view of the support structure shown in FIG. 28.
Figure 28B:
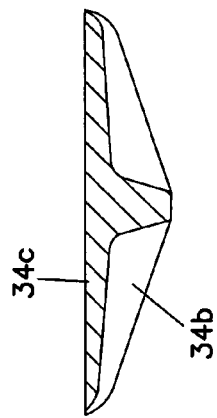
FIG. 28B is a lateral cross-sectional view taken along cross-sectional indicator 28B-28B shown in FIG. 28A.
Figure 28:
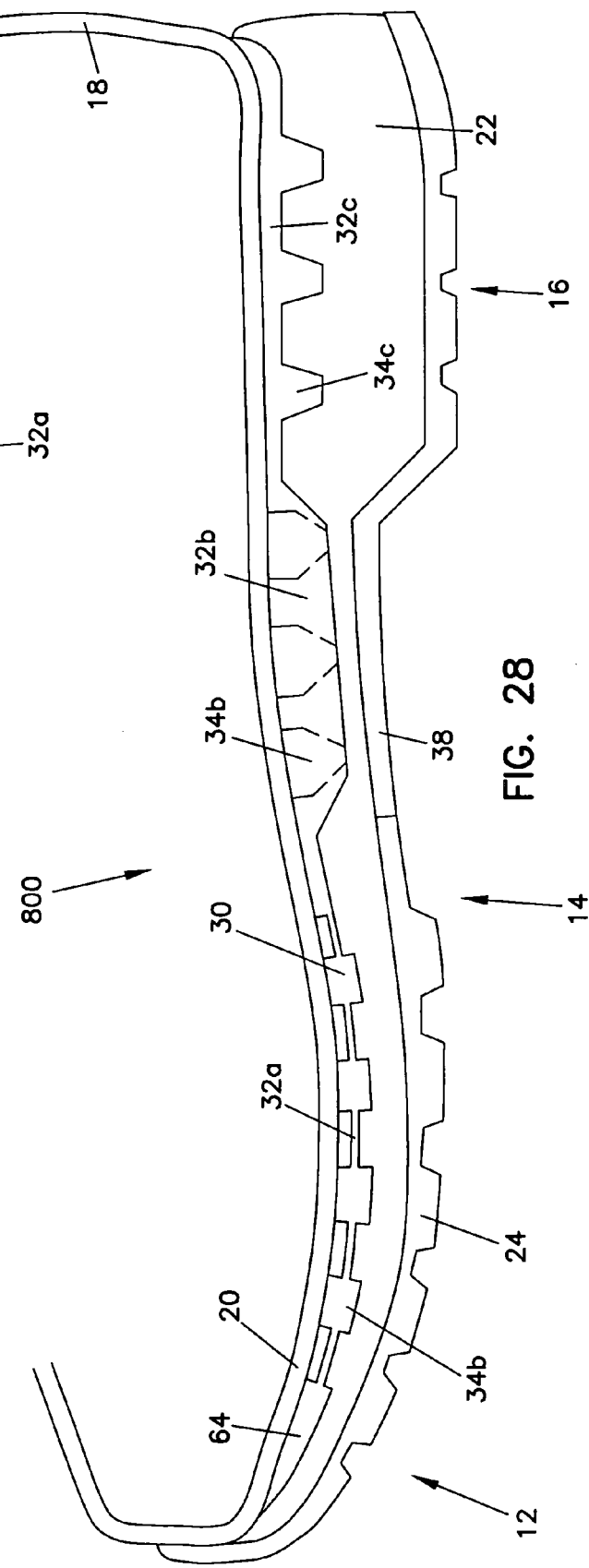
FIG. 28 is a side cross-sectional view of one example support structure wherein the mid section of the support structure includes a continuous piece of material having a longitudinal support with an increased cross-section.

An example footwear 800 that includes an alternative shank-like feature in the support structure 30 is shown in FIGS. 28, 28a and 28B. Support structure 30 may include at least three separate zones or sections that are align with the forefoot, midfoot and hindfoot sections of the footwear. A forefoot section of the support structure includes a spine 32a and a plurality of ribs 34b along with a toe plate 64. A midfoot section of the support structure may include a spine 32b with a substantial height and width along with a plurality of ribs 34b. The size and materials of spine 32b and ribs 34b they provide a shank-like feature for footwear 800. A hindfoot section of the support structure may include spine 32c and a plurality of ribs 34c have a different cross-section and shape than the other sections of the support structure. As with many of the other examples described herein, the features of support structure 30 may be turned upside down and mounted at a bottom side of midsole 22 so as to extend the long outsole 24 rather than extending along lasting insole 20.

Figure 29:
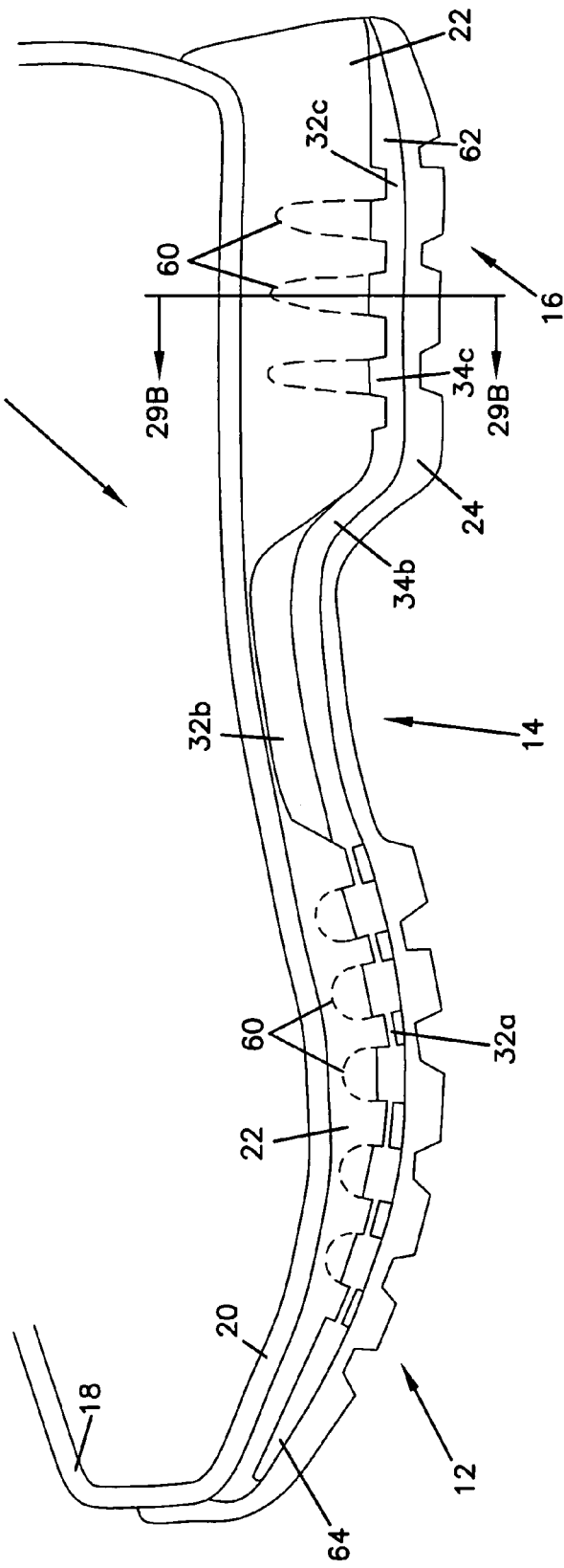
FIG. 29 is a side cross-sectional view of one example support structure wherein the support structure extends along the outsole of the footwear.
Figure 29A:
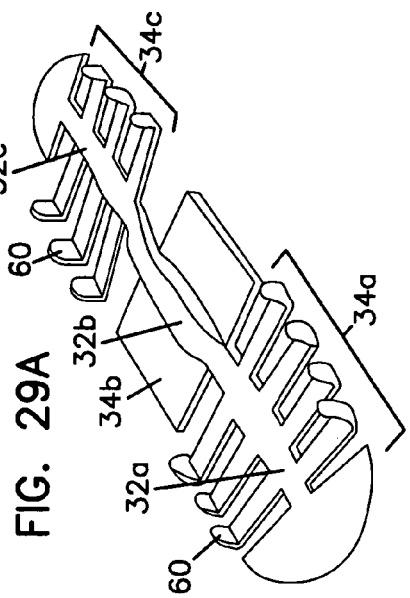
FIG. 29A is a top perspective view of the support structure shown in FIG. 29.
Figure 29B:
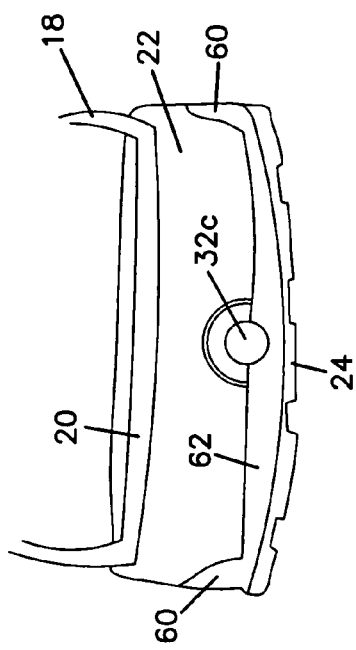
FIG. 29B is an lateral cross-sectional view of the footwear shown in FIG. 29 taken along cross-sectional indicators 29B-29B.

An example footwear 900 that includes a support structure 30 with features facing upward such that the support structure extends along an outsole of footwear (as mentioned above) is shown in FIGS. 29, 29A and 29B. The support structure 30 extends along midsole 22 adjacent to outsole 24 and further includes upward extending support structures 60 at opposing ends of the ribs 34a and 34c. The spine 32b extends through midfoot section 14 and may be configured to extend along the lasting insole 20 as well as the outsole 24. The ribs 34b in midfoot section 14 may be a single plate as shown in FIG. 29A or maybe a plurality of ribs similar to ribs 34a and 34c. Support structure 30 may also include a heel plate 62 and a toe plate 64.

Figure 30:
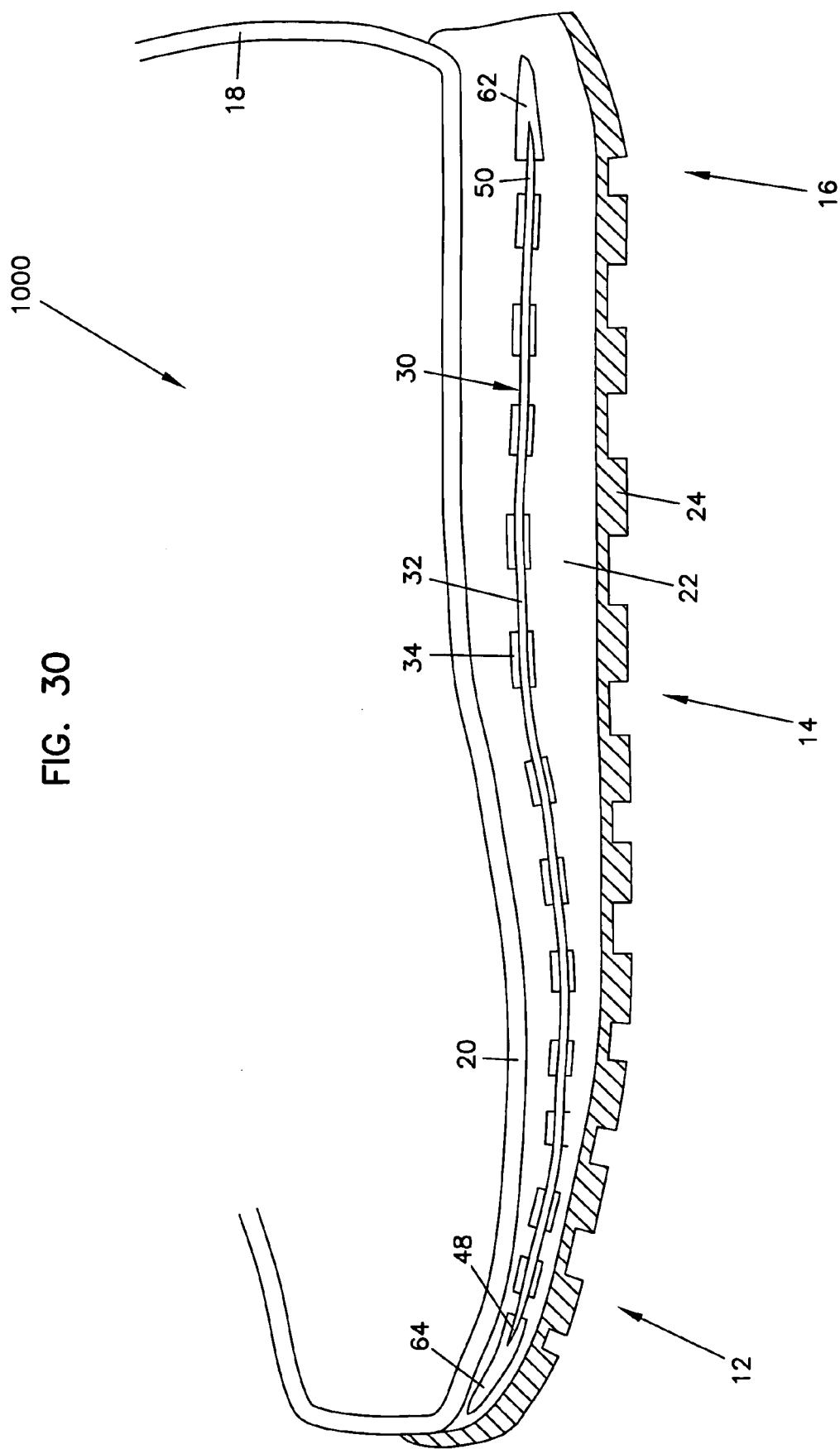
FIG. 30 a side cross-sectional view of one example support structure wherein the support structure extends in the middle of the midsole of the footwear.

A further example of footwear 1000 that includes a support structure extending through a midportion of midsole 22 is shown in FIG. 30. The support structure 30 includes a spine 32 and a plurality of ribs 34, and may further include a heel plate 62 and a toe plate 64. A support structure 30 may extend through a mid portion of midsole 22 so as to be spaced between the lasting insole 20 and the outsole 24 along the entire length of support structure 30 from a first end 48 to a second end 50, or may in other embodiments extend along the outsole and the lasting insole, or both the lasting insole and the outsole at various locations along a length of the support structure.

Figures 31, 31A:
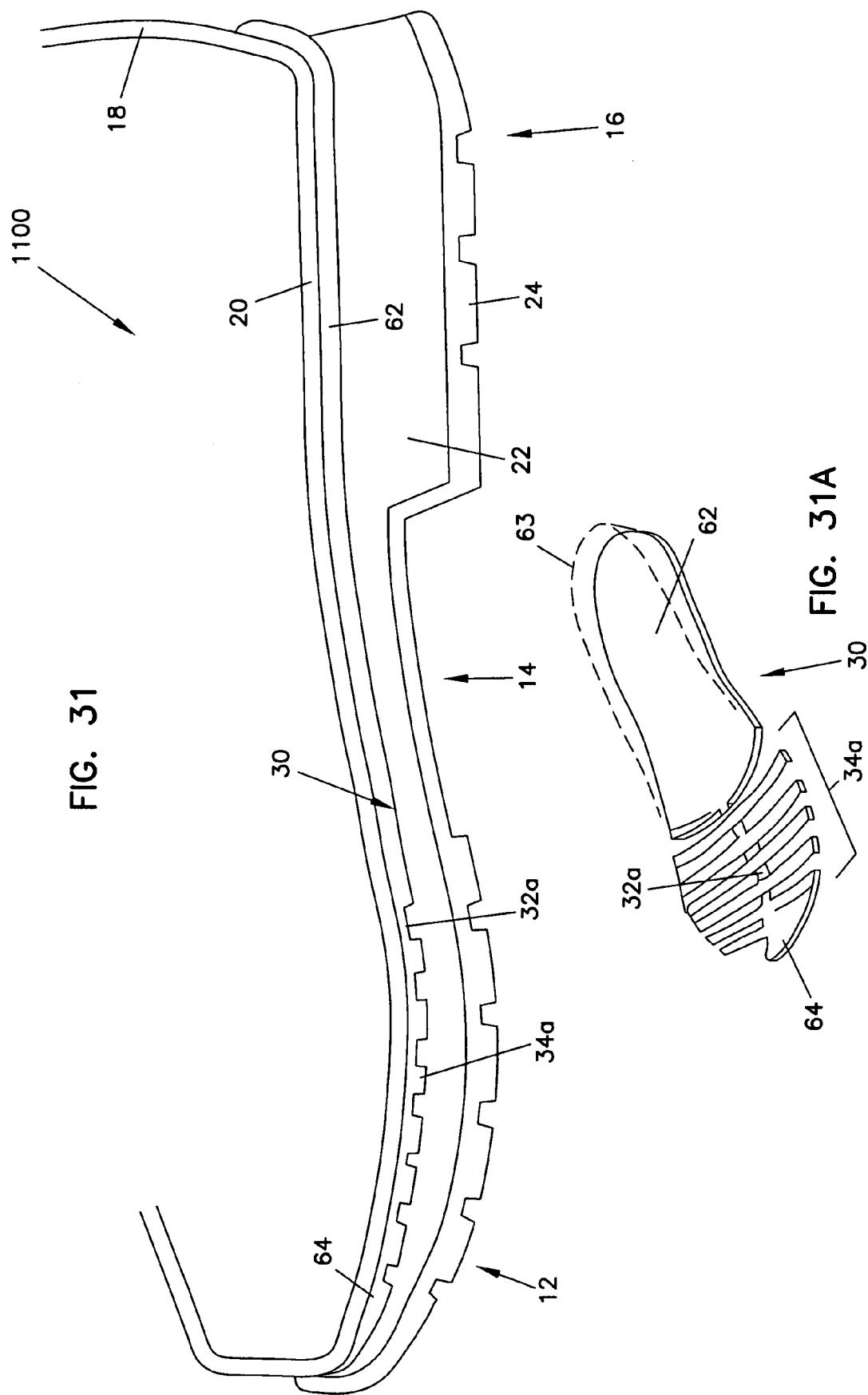
FIG. 31 a side cross-sectional view of one example support structure wherein the support structure includes lateral supports in the toe section and a plate support in the mid section and heel section.
FIG. 31A is a top perspective view of the support structure shown in FIG. 31.

An example footwear 1100 that includes a support structure 30 having an extended plate feature in combination with a spine and plurality of ribs is shown in FIG. 31. The support structure 30 includes a plate-like structure similar to heel plate 62 that extends along the hindfoot and midfoot sections 16, 14, and further includes a forefoot section having a spine 32a and a plurality of ribs 34a, including a toe plate 64. This particular embodiment may be useful for providing lateral support and additional pressure dissipation in high impact areas in the hindfoot and midfoot sections of the footwear while providing necessary flexibility with limited lateral support through the forefoot section of the footwear. FIG. 31A illustrates one example support structure 30 that includes features illustrated in FIG. 31. The heel plate 62 may include a cupping fin or wall 63 that extend upward or downward (not shown) that can be used to engage portions of the midsole 22, outsole 24, upper 18, or other portions of the footwear 1100.

FIGS. 32-38 illustrate several further example support structure embodiments, any of which may be included in the above listed examples. One example support structure 830 that includes upward and downward extending ribs 90, 92 is shown in FIGS. 32, 32A. Support structure 830 includes a longitudinally extending spine member 32 and a plurality of upward extending lateral supports or ribs 92 as well as a plurality of downward extending lateral supports or ribs 90. Each of the ribs 90, 92 may further include generally vertically extending tabs or supports 60 at ends of the ribs. As shown in FIG. 32A, the vertical support 60 may extend along an exterior side wall of the midsole or extend upward to support a vertically extending portion of an upper 18 of a footwear 1200. A footwear 1200 may include a window 38 that is viewable through either lasting insole 20 and midsole 22 from a top of the footwear, or from a bottom of the footwear through outsole 24 and midsole 22. In further embodiments, a window may be positioned along a sidewall of the midsole so as to view the support structure 30 from a side or back of the footwear.

The upward extending tabs 60 may be configured to extend outside of the sole structure of footwear 1200 and around the upper 18 as a strap feature 65 in FIG. 32. The strap 65 may be integrally coupled to one of the ribs 90, 92, or any other portion of the support structure 830. The strap 65 may be detachable for optional use, or may extend only partially around the upper 18 such that strap 65 includes multiple pieces that are separately coupled to portions of the upper 18.

Another support structure example embodiment 930 is shown in FIGS. 33 and 33a. Support structure 930 includes a longitudinally extending spine 32, at least one horizontally extending lateral support or rib 34, at least one downward supporting lateral support or rib 34, at least one downward extending lateral support or rib 90, and at least one upward extending lateral support or rib 92. Each of ribs 34, 90, 92 may include a vertical tab or extension 60, or a vertically downward extending tab, such as tab 61 shown in the following FIG. 36.

Figure 16:
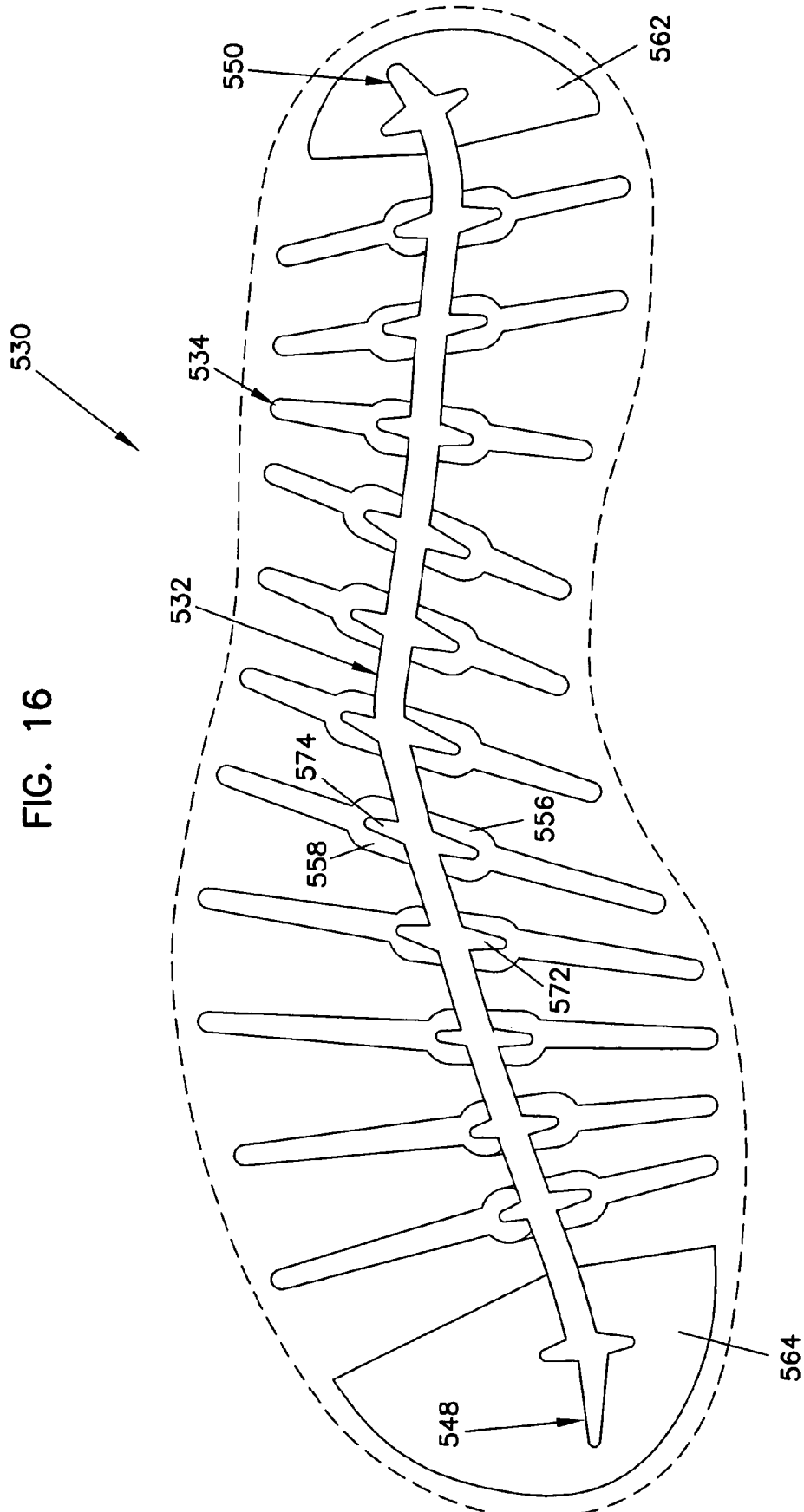
FIG. 16 is a top view of anther example support structure that includes a longitudinal support that is exposed where attached to the lateral supports.

FIG. 34 illustrates a close-up perspective view of a portion of the support structure 530 shown in FIG. 16. As discussed above related to FIG. 16, spine 32 includes a top surface that is generally coplanar with a top surface of rib 34, and includes position fins 72, 74 that engage rib 34 to hold rib 34 in position relative to the spine 32. This type of configuration could be either upward (as shown) or downward facing depending on whether the support structure 530 is aligned adjacent a lasting insole of the footwear or against the outsole of the footwear.

The spine 32 shown in FIG. 34 has a partial cylindrical cross-section and rib 34 is generally flat between first and second sides 52, 54. In other embodiments shown in FIGS. 35-38, spine 32 may have a parabolic, cylindrical, rectangular, or combination of cylindrical and rectangular cross-sections. Furthermore, a top surface of the rib 34 may have a generally upwardly sloping curvature (to mirror the curvature of the lasting insole) that may further include vertically upward or vertically downward extending tabs 60, 61.

Support structure 1030 shown in FIG. 35 includes one example spine 32 with a parabolic cross-section and a top surface that is flush with a top surface of rib 34. A midsection 56 of rib 34 in support structure 1030 generally outlines the parabolic shape of the spine 32. Support structure 1130 shown in FIG. 36 includes a spine with a rectangular cross-section and the midsection 56 has a shape that is unrelated to the shape of the spine. The top surface of spine 32 is coplanar with the top surface of the rib 34. Support structure 1230 shown in FIG. 37 includes a spine with a cylindrical cross-section that extends above an upper surface of rib 34. This configuration may be useful when the support structure 1230 is embedded in a midsole rather than being flush against an outsole or a lasting insole of a footwear. Support structure 1330 shown in FIG. 38 includes a spine 32 with a partial cylindrical cross-section and further includes an extension 32d that extends across at least a portion of rib 34 beyond midsection 56. In some embodiments, the spine material 32d may extend across the entire upper surface of rib 34 and may further extend in between a plurality of ribs positioned along a length of the spine to act as a webbing between the ribs.

The support structure shown in FIGS. 34-38 may be especially useful for co-molding the support structure or for creating a configuration in which the ribs 34 can be snap fit or otherwise separately secured to spine 32 using methods other than co-molding.

FIGS. 39-40 illustrate two examples of co-molding arrangements. Support structure 1430 shown in FIGS. 39 and 39A include a spine 32, ribs 34, and right and left flex sections 94, 96 of rib 34. Each rib 34 is connected via a longitudinal connector 98 such that the ribs 34 are connected together in a continuous string. Once the string of ribs 34 is molded, the spine 32 may be co-molded using around longitudinal connector 98 and to flex sections 94, 96 using mold 100. This type of molding may provide advantages of strength and performance when using the support structure 1430, as well making it easier to handle the ribs during manufacture of the support structure.

A support 1530 is shown in FIGS. 40 and 40A having a continual longitudinal extending spine 32 that is held in a mold 101 and co-molded with ribs 34 having flex sections 94, 96 around the spine 32. This type of construction may also provide certain performance and manufacturing advantages over other support structure designs. A molded structure manufactured using the examples shown in FIGS. 39 and 40 may be very cost effective for both initial tool and die preparation and ongoing production of parts over time.

A support structure as disclosed herein may be integrated into various portions of the sole of a footwear (described above), or may be integrated into a padded insert 126 for a footwear, as shown in FIG. 41. Insert 126 includes a support structure 30 that includes a longitudinally extending spine 32 and a plurality of laterally extending supports or ribs 34 that are secured to the spine 32. Support structure 30 may also include a heel plate 62 and a toe plate 64 and may also include vertically extending tabs 60 formed at ends of the ribs 34. Support structure 30 is encapsulated within a padding 27 that provides a comfortable interface between support structure 30 and a user foot, and further provide an proper interface between the support structure 30 and a lasting insole or other feature of the footwear.

Any of the above examples, including the padded insert 126 show in FIG. 1 may include one or multiple sections of a support structure at various location along a length of a footwear. For example, FIGS. 42A, 42B, 42C illustrate separate support structure sections that may be used for certain forefoot, midfoot or hindfoot sections of a footwear. Forefoot insert 102 shown in FIG. 42A includes a spine 32a that extends along a pressure centerline and further includes a plurality of laterally extending supports or ribs 34a and a toe plate 64. Midfoot insert 103 includes a longitudinally extending spine 32b and a plurality of laterally extending supports or ribs 34b. Hindfoot insert 104 shown in FIG. 42C includes a longitudinally extending spine 32c and a plurality of laterally extending support or ribs 34c as well as a heel plate 62. Spine sections 32a, 32b, 32c shown in FIGS. 42A-C may extend along a pressure centerline of a footwear or may be aligned with an actual centerline of the footwear. Furthermore, the ribs 34a, 34b, 34c may have a variety of different shapes and sizes and be aligned relative to the respective spine member at a variety of different angles.

A yet further example embodiment may include a combined hindfoot and midfoot insert 105 shown in FIG. 43, or a combined forefoot and midfoot insert 106 shown in FIG. 44. Insert 105 includes spine sections 32b and 32c as well as groups of ribs 34b and 34c. Likewise, insert 106 includes spine sections 32a, 32b as well as ribs 34a, 34b.

In addition to the separate "zones" or sections of the spine or groups of ribs discussed above, the spine material between each individual rib may also vary along the length of the support structure. In one embodiment, the spine material between every rib member may have a different composition or set of physical characteristics. In another example, the spine material beginning at the toe and heel areas is very flexible and the spine material becomes less flexible between every rib or between every few ribs leading toward the midfoot region of the support structure.

In a yet further embodiment, the support structure may include a plurality of wire or hair-like laterally or vertically extending support structures that extend from either the ribs or the spine for specialized support in certain areas of a footwear.

Referring now to FIGS. 45-48, an example footwear sole assembly 1601 that includes a support structure 1630 is shown and described. The support structure 1630 is shown extending along substantially the entire length of the footwear sole assembly 1601. The support structure includes a longitudinal spine 1632 and lateral support 1634 that extend in only the midfoot section 1603 and hind foot section 1604. The forefoot section 1602 includes a plate-like structure 1662 that may include a plurality of recesses 1635 to increase flexibility of the plate structure. Various features of the support structure 1630 cooperate with features of the midsole 1622 and outsole 1624 of the footwear sole assembly 1601, as described below.

The longitudinal spine 1632 and lateral supports 1634 may have different configurations along the length of the footwear to provide desired results in the footwear sole assembly 1601. In many cases, it is preferable to provide high shock absorption and shock attenuation in the hindfoot portion of a footwear. To address these criteria, the hindfoot portion 1632c of the longitudinal spine is relatively small in cross section and may include a recessed portion to increase flexibility of the spine where the spine attaches to the lateral supports 1634c in the hindfoot portion 1604. A spine insert piece 1633 may be inserted in the recessed portion (see FIGS. 46 and 47), wherein the insert piece 1633 may include different flexibility properties or other characteristics to help "fine tune" the support structure characteristics for a given footwear. The longitudinal spine 1632c may also include different materials from the lateral supports 1634c that also promotes increased flexibility spine and movement of the lateral supports relative to the spine.

Figure 45:
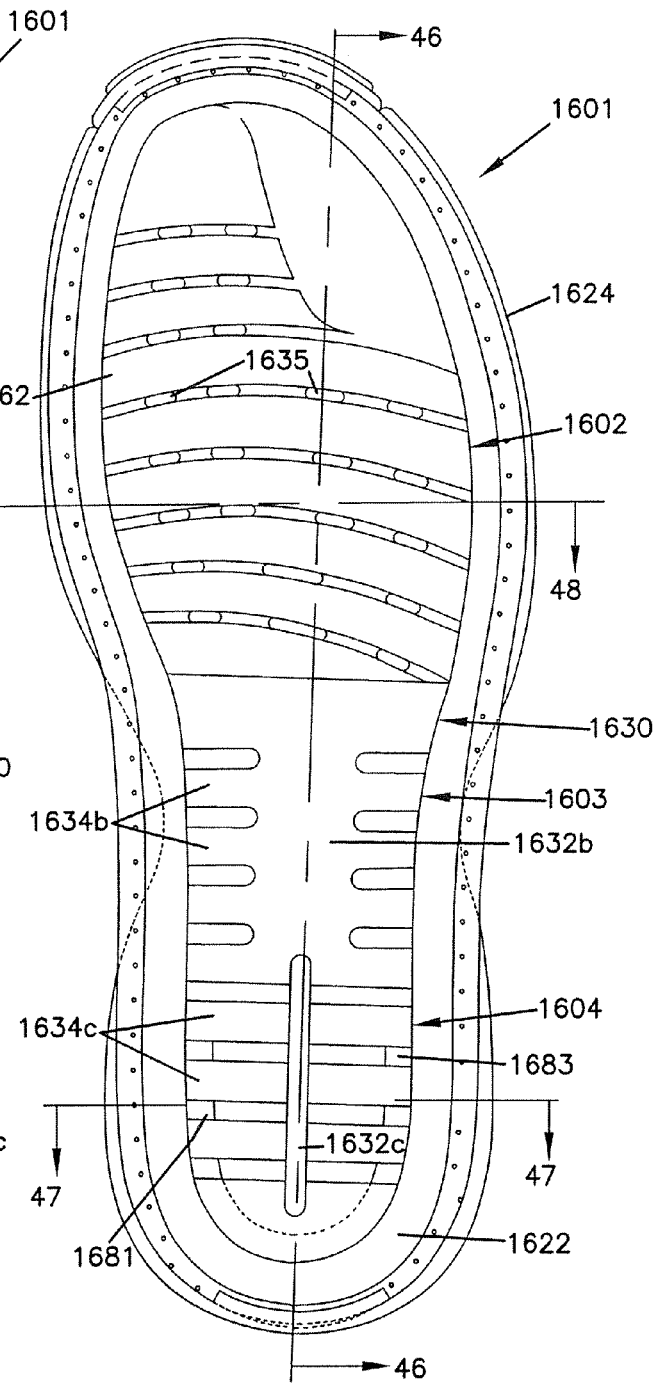
FIG. 45 is a top view of a footwear that includes another example support structure according to principles of the invention that extends the entire length of the footwear.
Figure 47:
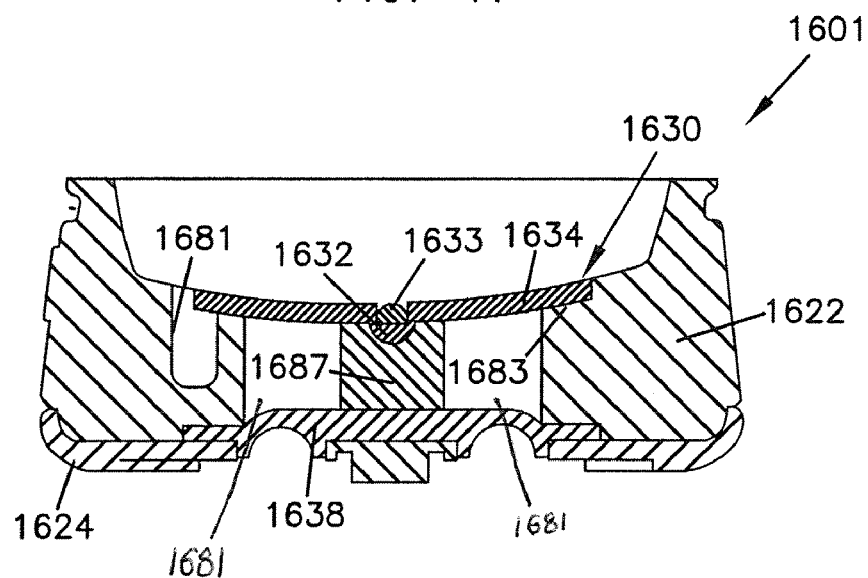
FIG. 47 is a lateral cross-sectional view of the footwear shown in FIG. 45 taken along cross-sectional indicators 47-47.
Figure 48:
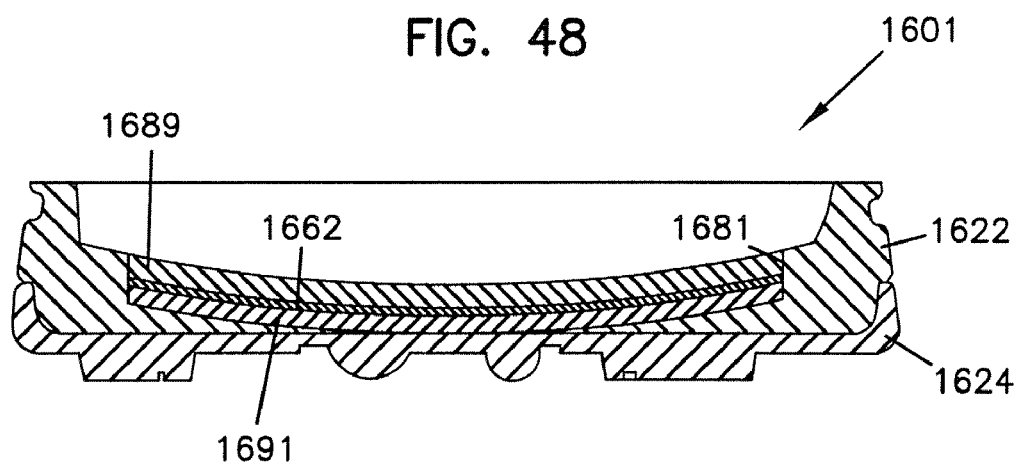
FIG. 48 is a lateral cross-sectional view of the footwear shown in FIG. 45 taken along cross-sectional indicators 48-48
Figure 51:
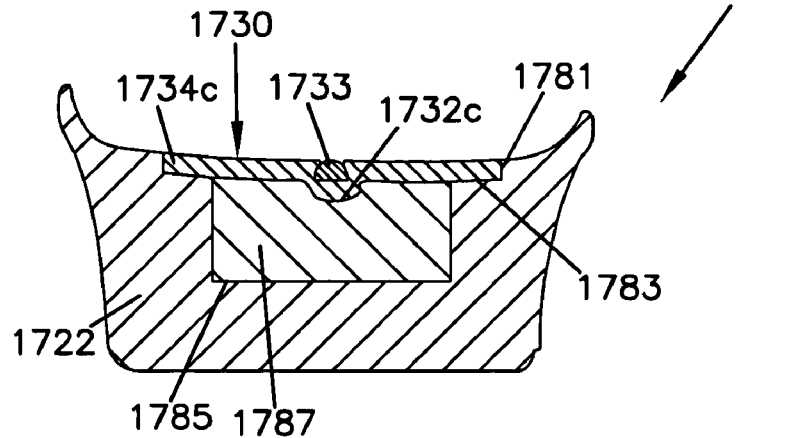
FIG. 51 is a lateral cross-sectional view of the footwear shown in FIG. 45 taken along cross-sectional indicators 51-51.
Figure 52:
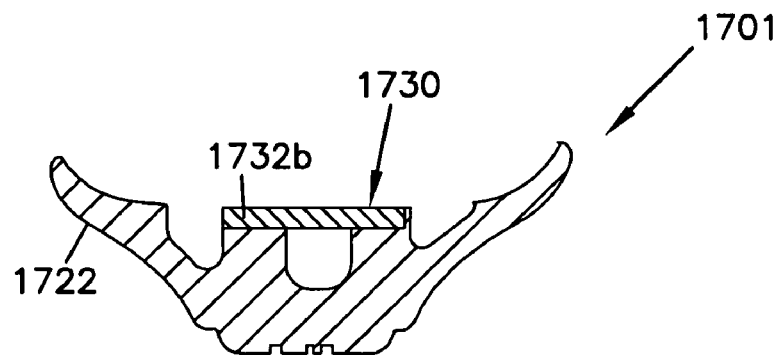
FIG. 52 is a lateral cross-sectional view of the footwear shown in FIG. 45 taken along cross-sectional indicators 52-52.
Figure 53:
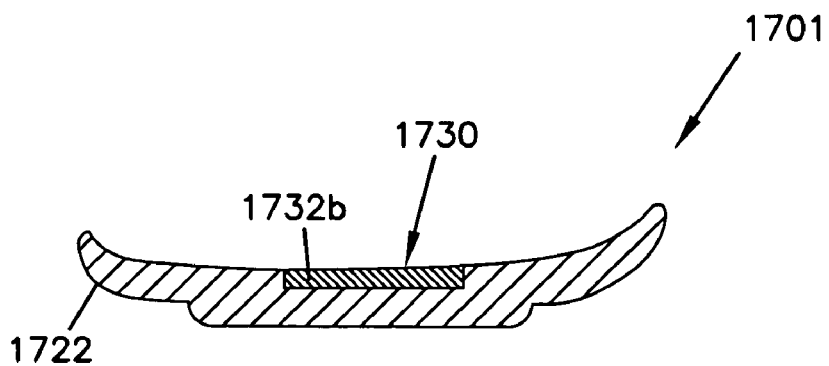
FIG. 53 a lateral cross-sectional view of the footwear shown in FIG. 45 taken along cross-sectional indicators 53-53.

The lateral support 1634c may be relatively long and narrow as shown in FIG. 45 or may be relatively short and wide depending on the desired result. Ends of the lateral supports 1634c opposite the longitudinal spine 1632c may be supported on a support shelf 1683 defined by a recess 1681 in the midsole 1622. A separate void 1685 formed in the midsole 1622 beneath the remaining portions of the lateral support 1634c and the longitudinal spine portion 1632c establish a trampoline-like design that provides the desired shock attenuation and shock absorption benefits while still providing sufficient support due to the remaining relatively firm midsole material around a periphery of the hindfoot section of the footwear sole assembly 1601.

A separate spine support member 1687 may be positioned within the void 1685 in a further effort to "fine tune" overall performance of the support structure 1630. This member 1687 may either partially or completely fill the void 1685, and preferably is position in alignment the longitudinal spine section 1632c (see FIG. 47) to provide engagement of the spine when a load is applied to the spine structure 1630.

The midfoot section of a footwear typically requires greater stiffness to support the arch of a users foot. In many footwear constructions, a shank member is required to bridge between the forefoot of the footwear and the heel portion of the footwear defined by a heel breast. The support structure 1630 may be modified to include different materials or a different structure to provide the desired support and stiffness. The longitudinal spine portion 1632b includes a greater cross sectional area, which in combination with the shorter length of lateral support 1632b and the absence of a recess or void beneath the support structure in the midfoot portion of the footwear, results in a shank-like structure or effect. An alternative embodiment of a support structure that includes a shank-like structure is shown with reference to FIGS. 49-53.

Figure 46:
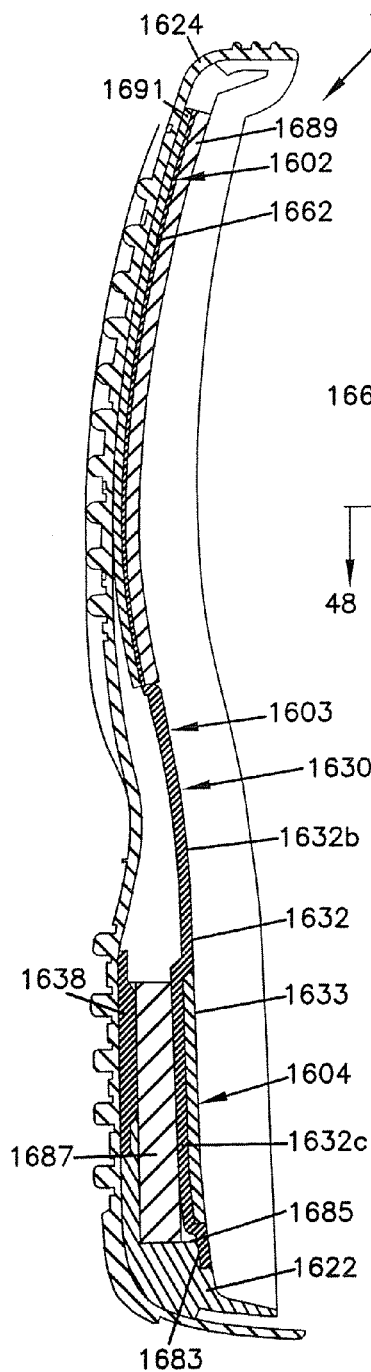
FIG. 46 is a side cross-sectional view of the footwear shown in FIG. 45 taken along cross-sectional indicators 46-46.

In many types of footwear, the forefoot area is relatively thin for purposes of aesthetics and styling. The preferred reduced thickness in the forefoot is in conflict with another objective to provide additional support, shock absorption, and shock attenuation in the forefoot to balance toe off forces and the like when the footwear is used for walking, which objective typically requires additional thickness in the forefoot area. The support structure 1630 is modified in the forefoot area 1602 to eliminate the lateral supports 1634 and a defined longitudinal spine 1632 and to include a plate-like structure 1662 that is surrounded by first and second forefoot padding layer 1689, 1691. The forefoot section 1602 may be configured such that the first padding layer 1689 may be flush with a top surface of the midfoot and hindfoot sections 1603, 1604 as shown in FIG. 46. Other embodiments may use a single padding layer in the forefoot or may replace the plate-like structure with a material or member that includes more flexibility and/or padding.

The footwear sole assembly 1601 may also include a viewing window 1638 that is positioned vertically below the hindfoot section 1604 to provide viewing of some of the support structure features. The window 1638 may be embedded in the outsole 1634 and may include a clear polymer material or other material that provides the desired viewing. Multiple viewing windows may be provided at different locations along a length of the support structure 1630 (e.g., see viewing window 38 in FIGS. 27 and 28). Preferably, the window 1638 is aligned with an open portion of the void 1685, the materials of the midsole 1322 and support member 1687 between the window 1638 and the support structure 1630 must be clear as well in order for viewing to occur. In other embodiments in which the support structure is positioned at a bottom side of the midsole rather than at a top side of the midsole, a window through the outsole alone may provide viewing of the support structure. Other embodiments may include a viewing window from a top side of the support structure, such as through a lasting insole or mast layer of the footwear sole assembly.

Referring now to FIGS. 49-53, another footwear sole assembly 1701 is shown and described. Assembly 1701 includes a support structure 1730 having midfoot and hindfoot longitudinal spine portions 1732b, 1732c and a plurality of lateral supports 1734, and a midsole 1722. The midsole 1722 includes a void 1785, a recess 1781 that defines a shelf 1783, and a spine support member 1787 positioned in the void 1785. A midfoot section 1703 of the support structure 1730 includes a longitudinal spine section 1732b having a greater cross-sectional area than spine portion 1732c in the heel section 1704 thereby providing a shank-like function. Because of the relatively narrow width of the midsole 1722 as compared to midsole 1622 shown in FIG. 45, the addition of lateral supports small enough to fit with the relatively wide spine portion 1732c within that width may not be as useful in providing additional support, shock absorption, and shock attenuation.

The spine support member 1787 completely fills the void 1785 and maintains contact with the spine portion 1732c. Other embodiments may include a reduced size spine support member or no spine support member at all, wherein the void 1785 is left completely open for free movement of the spine structure within the void 1785 (movement of the spine structure in void 1785 being restricted by at least the support of lateral supports 1743c on shelf 1783).

In the embodiments shown and described with reference to FIGS. 45-53, the hindfoot portion of the support structures may be generally described as being able to move within a void portion in the midsole when a load is applied to the support structure. More specifically, the longitudinal spine portion in the hindfoot section of the footwear sole assembly may be capable of moving within the voided portion or against a compression or shock absorbing member positioned within the void. The same or similar structure may be added in other portions of a footwear sole assembly such as in the forefoot of the assembly if sufficient thickness is provided in the midsole to establish such a void and movement of the support structure within the void or against a material positioned in the void. Using a first material to support ends of the lateral support members and a second material to support at least a portion of the longitudinal spine or the remaining portions of the lateral supports may be particularly useful to meet the demands of shock absorption and shock attenuation while providing desired support in a footwear assembly.

Figure 54:
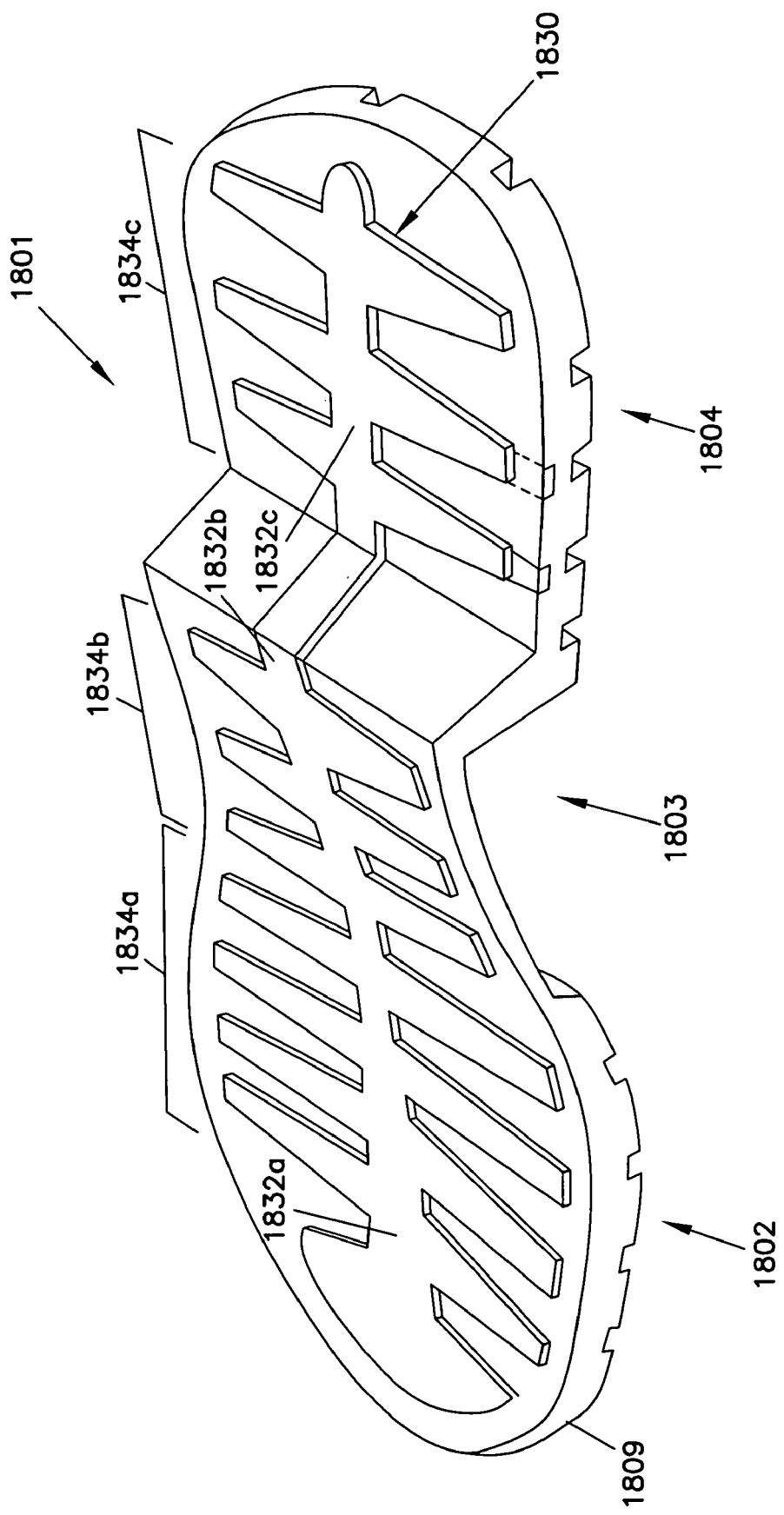
FIG. 54 is a top perspective view of an example footwear sole insert according to principles of the present invention.

FIG. 54 illustrates a footwear sole insert 1807 that includes a support structure 1830 coupled to a base portion 1809. The insert includes forefoot, midfoot and hindfoot sections 1802, 1803, 1804. The support structure 1830 includes a portion of the longitudinal member 1832 and multiple lateral supports 1834 in each of the forefoot, midfoot and hindfoot portions of the insert 1807. The insert 1807 may be particularly useful when assembling a footwear sole assembly such as the sole assembly shown in FIGS. 55 and 55A. When the base portion 1809 is configured as an outsole member, the insert 1807 may be secured to an under side of an outsole portion 1824, which is in turn coupled to a midsole 1822 and further coupled to an upper of a footwear (not shown). The base portion 1809 may include any desired material with any desired shape, such as, for example, a material having slip resistant properties that is formed in shapes that enhance resistance to the footwear slipping.

When using molding processes to generate a footwear assembly such as assembly 1801, the insert 1807 may first be separately formed by coupling the base member 1809 to the support structure 1830 using such methods as, for example, molding, heat or sound welding, or adhesives to provide a single insert member. The insert may be placed within a mold cavity and the outsole 1824 and midsole 1822 are molded around the insert 1807 in separate steps. The outsole and insole members 1824, 1822 may be separately molded or formed and later coupled to other components of the footwear sole assembly 1801 rather than using direct molding on top of the insert 1807.

Figure 59A:
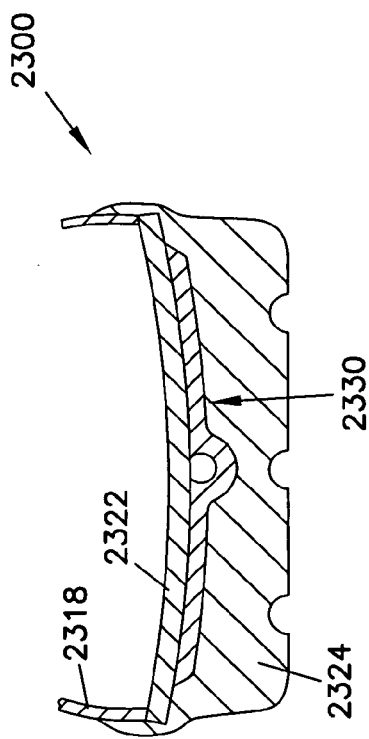
FIG. 59A is a lateral cross-sectional view of the footwear sole shown in FIG. 59.
Figure 59:
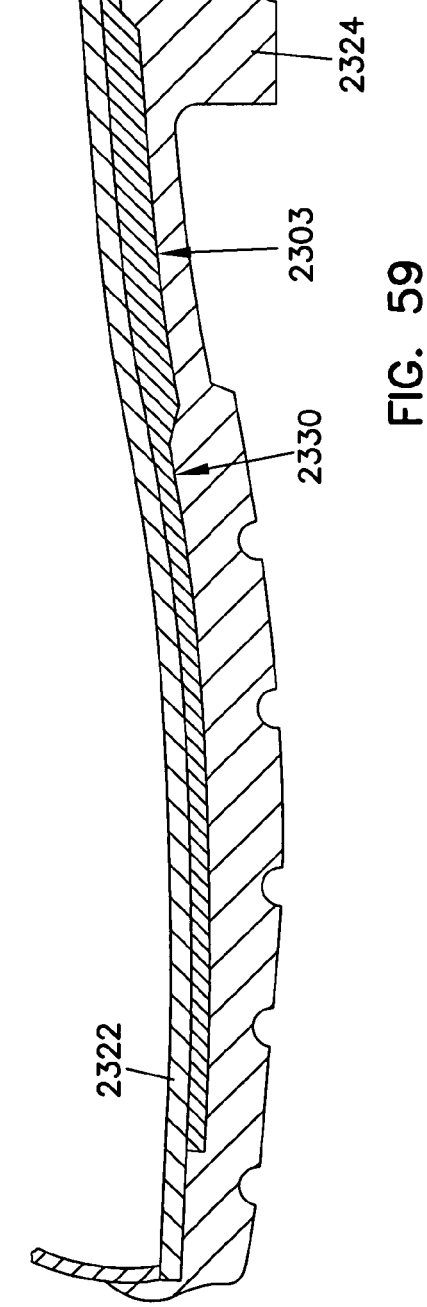
FIG. 59 is a side cross-sectional view of an example footwear sole that includes a support structure secured to an underside of a midsole of a welt sole construction.

The insert 1807 may have a width that is narrower than a total width of the outsole 1824 as shown in FIG. 55A, or may extend across an entire width of the footwear sole assembly as shown in the embodiment illustrated in FIG. 56A. The insert 1807 may also have a length that extends along an entire length of the footwear sole assembly and may further extend upward to engage an upper of the footwear if desired (see, for example, the dotted line numbered 99 in FIG. 55). Referring to FIGS. 59 and 59A, the footwear 2300 includes an outsole 2324 and a support structure 2330 that could be formed as an insert member, a portion of which extends an entire length of the footwear 2300 and engages the upper 2318.

The insert sections 1802, 1803, 1804 may be divided into separate pieces that are individually insertable into different portions of a footwear sole assembly. For example, FIG. 56 illustrates a footwear sole assembly 1901 that include forefoot and hindfoot insert sections 1902, 1904 that are positioned in an outsole 1924 at respective forefoot and hindfoot sections of the assembly. The base member 1909 may be configured as an outsole member wherein base member 1909 couples the support structure 1930 against the outsole 1924. A midsole 1922 may be molded or otherwise coupled to the outsole 1924 to complete the footwear sole assembly.

FIGS. 57 and 58 illustrate footwear sole assemblies 2001, 2101 that each include insert sections positioned at alternative positions with respect to the outsole. Assembly 2001 includes a forefoot section 2002 positioned between the outsole 2024 and the midsole 2022, and a hindfoot section 2004 positioned at a bottom side of the outsole 2024. Assembly 2101 includes forefoot and hindfoot sections 2102, 2104 that are positioned at a top side of the outsole 2124 along an underside of the midsole 2122. Other embodiments may include insert segments at other locations within a footwear sole assembly such as on a top side of a midsole or completely embedded within an outsole or insole member.

Figure 62A:
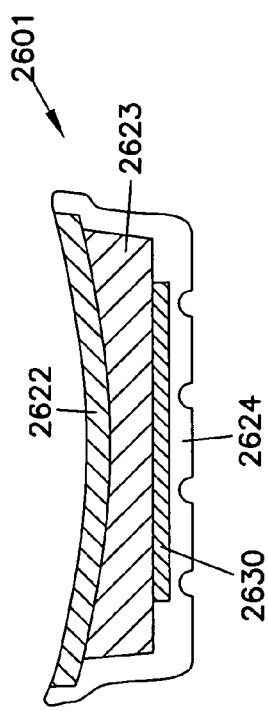
FIG. 62A is a lateral cross-sectional view of the footwear sole shown in FIG. 62.
Figure 62:
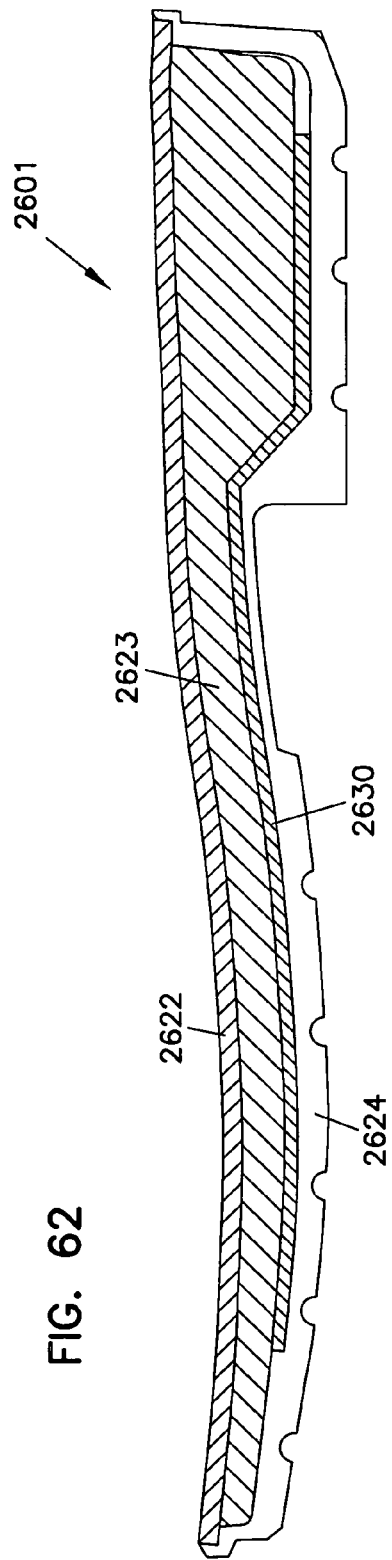
FIG. 62 is a side cross-sectional view of example footwear sole that includes a support structure molded in the footwear sole in a welt sole construction.

Referring again to FIGS. 59 and 59A, the footwear 2300 may be well suited for a welt type molding or forming process in one method, the support structure 2330 is positioned in a mold cavity with stand-off members (not shown) that hold the support structure vertically above a floor of the mold cavity. The mold cavity is then filled underneath and around the support structure using injection molding, casting, or other methods in which a material such as, for example, a polyurethane foam or a TPU elastomer, fills a portion of the mold cavity to form the outsole 2324. The midsole 2322 is either directly molded on top of the support structure 2330 and outsole 2324, or is formed separately and then coupled to the support structure 2330 and outsole 2324. In another method, the outsole 2324 is formed in a mold cavity with a dummy support structure in place to create a recess shaped like the actual support, wherein the dummy support structure is later replaced with the actual support structure 2330 before adding the midsole or other layers of the footwear 2300. In a still further embodiment, the support structure is combined with three or more sole layers as shown in the footwear sole assembly 2601 shown in FIGS. 62 and 62A. Assembly 2601 includes a support structure 2630 positioned between an outsole 2624, a first midsole 2622, and a second midsole 2633. The midsole layers 2622, 2633 (and any other midsole or outsole described herein) may include gels, air pockets, or specialized shock absorbing and shock attenuating materials that are sealed within the assembly 2601 to enhance performance of the footwear sole assembly.

These types of processes may be useful for interchanging support structures with a variety of different designs. For example, the midfoot portion 2303 of the support structure may include a longitudinal member and lateral supports configured to provide a shank-like function. Size and shape modifications to the support structure can be accounted for easily when using molding and related methods to form portions of a footwear sole as described above.

Referring now to FIG. 60, another example footwear 2400 is shown including an outsole 2424, a lasting insole 2422, and a support structure 2430. The lasting insole 2422 may be separately coupled to an upper 2418 before being secured to the outsole 2424 using any desired methods such as the molding methods described above. In one example method, the combined lasting insole 2422 and upper 2418 may be directly molded or otherwise coupled to the outsole 2424 using, for example, adhesives, cements, or other bonding materials.

Referring now to FIG. 61, another example footwear sole assembly 2501 is shown in which the support structure 2530 is completely embedded within the base member 2509 so as to provide an insert 2507 in which none of the support structure is exposed. Other embodiments may include exposed portions of the support structure along sides of the insert 2507, but not at top and bottom surfaces of the insert 2507. The insert 2507 may be combined within an outsole 2524 and midsole 2522 using any of the methods described above.

Any of the example inserts described above may be configured as a blocker unit that can be trimmed to fit any size footwear desired. When the insert is used as a blocker, end portions of the lateral supports may be removed as part of the trimming process.

Figure 63:
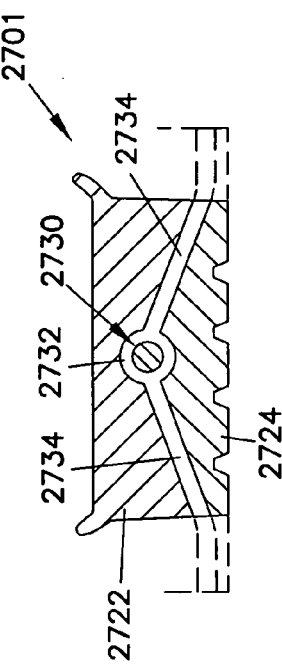
FIG. 63 is a lateral cross-sectional view of another example footwear sole that includes a support structure with lateral supports that extend vertically downward.

In an additional embodiment illustrated in FIG. 63, a footwear sole assembly 2701 includes a support structure 2730 having lateral supports 2734 that extend in a vertically downward direction from the longitudinal member 2732. The support structure 2730 is positioned between an outsole 2724 and a midsole 2722. The downward sloping lateral supports 2734 provide a configuration in which the support structure 2730 acts as a spring-like member, wherein ends of the lateral members 2734 at an outside edge of the assembly 2701 maintain a relatively fixed position due to the reduced amount of outsole material between the ground and the lateral support, and the longitudinal member 2732 is vertically movable due to compressibility of the larger amount of outsole material between longitudinal member 2732 and the ground beneath the outsole 2724. This type of configuration could also be modified into a blocker style unit in which the lateral members extend out to a further width as shown by the dash lines in FIG. 63, wherein the lateral members are preferably always covered by material of the outsole or insole 2722, 2724. With the lateral members at their maximum width, it may be possible to obtain a maximum "spring" effect, although a narrower configuration as shown by the solid lines in FIG. 63 may still provide a desired amount of shock absorption and shock attenuation while providing additional lateral support that may not otherwise be present if the support structure 2730 were removed from the assembly 2701.

Materials for the spine and ribs of the support structure may include, for example, metals and metal alloys, nylon, polyurethane, polypropylene, or any of a variety of other polymer and synthetic materials. The materials may include fillers such as glass that increase the hardness and reduce flexibility of the structures. In one example, the spine support structure material includes at least about 10% glass, and preferably includes about 30% or more glass.

The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A footwear sole structure, comprising:
    a sole member having a heel portion, the heel portion including an upper surface, a lower surface and opposing side surfaces, the heel portion having a width dimension measured between the opposing side surface, the heel portion defining a cavity that extends from the upper surface towards the lower surface and at least a portion of the cavity has a width dimension that is less than the width dimension of the heel portion; and
    a spine structure including an elongate spine extending along a first axis and a plurality of laterally extending support ribs secured to the elongate spine at spaced apart locations along a length of the spine, a portion of the spine structure being positioned over the cavity;
    wherein the spine structure is movable into the cavity relative to the sole portion.

2. The footwear sole structure of claim 1, further comprising a compressible material positioned in the cavity and configured to engage the spine structure.

3. The footwear sole structure of claim 1, wherein the sole member is a midsole of a footwear.

4. The footwear sole structure of claim 1, wherein the sole member includes a viewing window through which at least a portion of the spine structure is viewable from outside the footwear sole structure.

5. The footwear sole structure of claim 1, wherein the viewing window is positioned vertically above the spine structure.

6. The footwear sole structure of claim 1, wherein the viewing window is positioned vertically below the spine structure.

7. The footwear sole structure of claim 1, wherein the spine structure includes at least two different materials.

8. The footwear sole structure of claim 7, wherein the spine structure includes a first elongate portion that includes a first material, and a second elongate portion that includes a second material, the second elongate portion at least partially engaged within a recess defined in the first elongate portion.

9. The footwear sole structure of claim 8, wherein the second elongate portion is positioned in at least a heel portion of the spine structure.

10. The footwear sole structure of claim 1, wherein the cavity of the heel portion is defined by at least two parallel side walls of the heel portion.

11. The footwear sole structure of claim 10, wherein the sole member further includes a midfoot portion, and a portion of the spine structure is configured to include a shank member that extends into the midfoot portion of the sole member, the shank member being defined by a portion of the elongate spine having a greater width than the portion of the elongate spine positioned at the heel portion of the sole.

12. The footwear sole structure of claim 11, wherein the portion of the spine structure that extends into the midfoot portion includes a portion of the elongate spine member and at least one support rib.

13. The footwear sole structure of claim 11, wherein the portion of the spine structure that extends into the midfoot portion of the sole member has different flexibility properties than that portion of the spine structure positioned at the heel portion of the sole member.

14. The footwear sole structure of claim 11, further comprising a compressible material positioned in the cavity and configured to engage the spine structure.

15. The footwear sole structure of claim 1, wherein the sole member includes a forefoot section, and at least a portion of the spine structure extends into the forefoot section.

16. The footwear sole structure of claim 15, wherein that portion of the spine structure that extends into the forefoot section includes a plate-shaped member.

17. The footwear sole structure of claim 16, wherein the plate-shaped member includes a plurality of recessed portions.

18. The footwear sole structure of claim 16, wherein the plate-shaped member includes a portion of the elongate spine member and at least one support rib.

19. The footwear sole structure of claim 17, wherein at least some of the plurality of recessed portions define through holes.

20. The footwear sole structure of claim 15, further comprising a first forefoot padding layer arranged in engagement with an upper surface of the spine structure that extends into the forefoot section of the sole member.

21. The footwear sole structure of claim 20, further comprising a second forefoot padding layer arranged in engagement with a lower surface of the spine structure that extends into the forefoot section of the sole member.

22. The footwear sole structure of claim 20, wherein the first forefoot padding layer includes a plurality of recessed portions.

23. The footwear sole structure of claim 22, wherein at least some of the plurality of recessed portions in the first forefoot padding layer define through holes.

24. A footwear, comprising:
    a midsole member extending in a generally horizontal plane, the midsole member having a heel section that includes first and second portions having different cushioning properties, the first portion defining a cavity that extends from an upper surface towards a bottom surface of the midsole, the second portion positioned within the cavity;

an outsole member coupled to a bottom surface of the midsole member and defining an outer surface of the footwear configured to engage a ground surface;

a upper member coupled to the midsole; and a spine support structure that includes an elongate spine member and a plurality of laterally extending supports coupled to the spine portion;

wherein the first portion of the heel section supports the laterally extending supports and the second portion of the heel section supports the elongate spine member, and the spine support structure is movable within the cavity relative to the first portion of the heel section and the outsole member.

25. The footwear of claim 24, wherein the second portion of the heel section includes a recessed portion along the upper surface adjacent a periphery of the cavity that defines a support surface, and end portions of the laterally extending support are supported on the support surface.

26. The footwear of claim 24, wherein the first and second portions of the heel section have different compression properties.

27. The footwear of claim 24, wherein the elongate spine member and the laterally extending supports having different flexibility properties.

28. The footwear of claim 24, wherein the spine support structure includes different flexibility properties along a length of the spine support structure.

29. The footwear of claim 24, wherein at least a portion of the spine support structure is positioned between the midsole member and the upper member.

30. The footwear of claim 24, wherein at least a portion of the spine support structure is positioned below a bottom surface of the midsole member.

31. The footwear of claim 24, wherein a portion of the spine support structure is positioned above a top surface of the midsole member, and another portion of the spine support structure is positioned within the midsole member.

32. The footwear of claim 24, further comprising an outsole member coupled to a bottom side of the midsole member, and at least a portion of the spine support structure is positioned between a top surface of the midsole member and a bottom surface of the outsole member.

33. The footwear of claim 24, further comprising a viewing window through which at least a portion of the spine structure is viewable from outside of the footwear.

34. The footwear of claim 24, wherein at least one of the laterally extending support ribs includes a first portion extending in a generally horizontal plane and a second portion extending out of the horizontal plane.

* * * * *